US006254832B1

(12) United States Patent
Rainin et al.

(10) Patent No.: US 6,254,832 B1
(45) Date of Patent: Jul. 3, 2001

(54) BATTERY POWERED MICROPROCESSOR CONTROLLED HAND PORTABLE ELECTRONIC PIPETTE

(75) Inventors: Kenneth Rainin, Piedmont; Christopher Kelly, Larkspur; Haakon T. Magnujssen, Jr., Orinda; William D. Homberg, Oakland, all of CA (US)

(73) Assignee: Rainin Instrument Co., Inc., Emeryville, CA (US)

( * ) Notice: Subject to any disclaimer, the term of this patent is extended or adjusted under 35 U.S.C. 154(b) by 0 days.

(21) Appl. No.: 09/264,389

(22) Filed: Mar. 8, 1999

Related U.S. Application Data

(63) Continuation-in-part of application No. 09/263,132, filed on Mar. 5, 1999, now abandoned.

(51) Int. Cl.[7] .................................. B01L 3/02; G01N 1/14

(52) U.S. Cl. ............................ 422/100; 422/99; 436/179; 436/180; 73/864.01; 73/864.13; 73/864.16; 73/864.18

(58) Field of Search .............................. 422/99, 100, 922, 422/925, 926, 931, 932; 456/180, 179; 73/863.01, 864.01, 864.11, 864.13, 864.16, 864.18

(56) References Cited

U.S. PATENT DOCUMENTS

| | | | | |
|---|---|---|---|---|
| 3,915,651 | * | 10/1975 | Nishi | 23/259 |
| 4,369,665 | * | 1/1983 | Citrin | 73/864.18 |
| 4,475,666 | * | 10/1984 | Bilbrey et al. | 222/14 |
| 4,567,780 | * | 2/1986 | Oppenlander et al. | 73/864.16 |
| 4,671,123 | * | 6/1987 | Magnusssen, Jr. et al. | 73/864.16 |
| 4,757,437 | * | 7/1988 | Nishimura | 364/167 |
| 4,821,586 | * | 4/1989 | Scordato et al. | 73/864.18 |
| 4,905,526 | * | 3/1990 | Magnussen, Jr. et al. | 73/864.18 |
| 4,967,606 | * | 11/1990 | Wells et al. | 73/864.18 |
| 5,002,737 | * | 3/1991 | Tervamaki | 422/100 |
| 5,343,769 | * | 9/1994 | Srouvaniemi et al. | 73/864.18 |
| 5,389,341 | * | 2/1995 | Tuunanen et al. | 422/100 |
| 5,614,153 | * | 3/1997 | Homberg | 422/100 |
| 5,892,161 | * | 4/1999 | Conley et al. | 73/864.18 |
| 5,983,733 | * | 11/1999 | Strandberg et al. | 73/864.11 |

* cited by examiner

*Primary Examiner*—Jill Warden
*Assistant Examiner*—Kathryn Bex
(74) *Attorney, Agent, or Firm*—Robert R. Meads

(57) ABSTRACT

A battery powered, microprocessor controlled portable electronic pipette, comprising a hand holdable housing supporting a battery, a linear actuator for driving a plunger lengthwise in a cylinder to aspirate and dispense fluid into and from a pipette tip extending from the housing and a control circuit for the linear actuator. The linear actuator is powered by the battery and comprises a stepper motor with current receiving windings for electromagnetically driving a rotor to impart the lengthwise movement to the plunger. The control circuit includes (i) a user controllable microprocessor powered by the battery and programmed to generate drive signals for the stepper motor, (ii) a display supported by the housing and electrically connected to the microprocessor, (iii) user actuateable control keys supported by the housing and electrically connected to the microprocessor for generating within the microprocessor pipette mode of operation, liquid pick up volume, liquid dispense, pipette speed of operation and pipette reset signals for controlling operation of the pipette and alpha-numeric user readable displays on the display, (iv) a memory having tables of data stored therein and accessible and useable by the microprocessor to control operations of the pipette, and (v) user actuateable switches supported by the housing for triggering pipette operations selected by user actuation of the control keys.

39 Claims, 42 Drawing Sheets

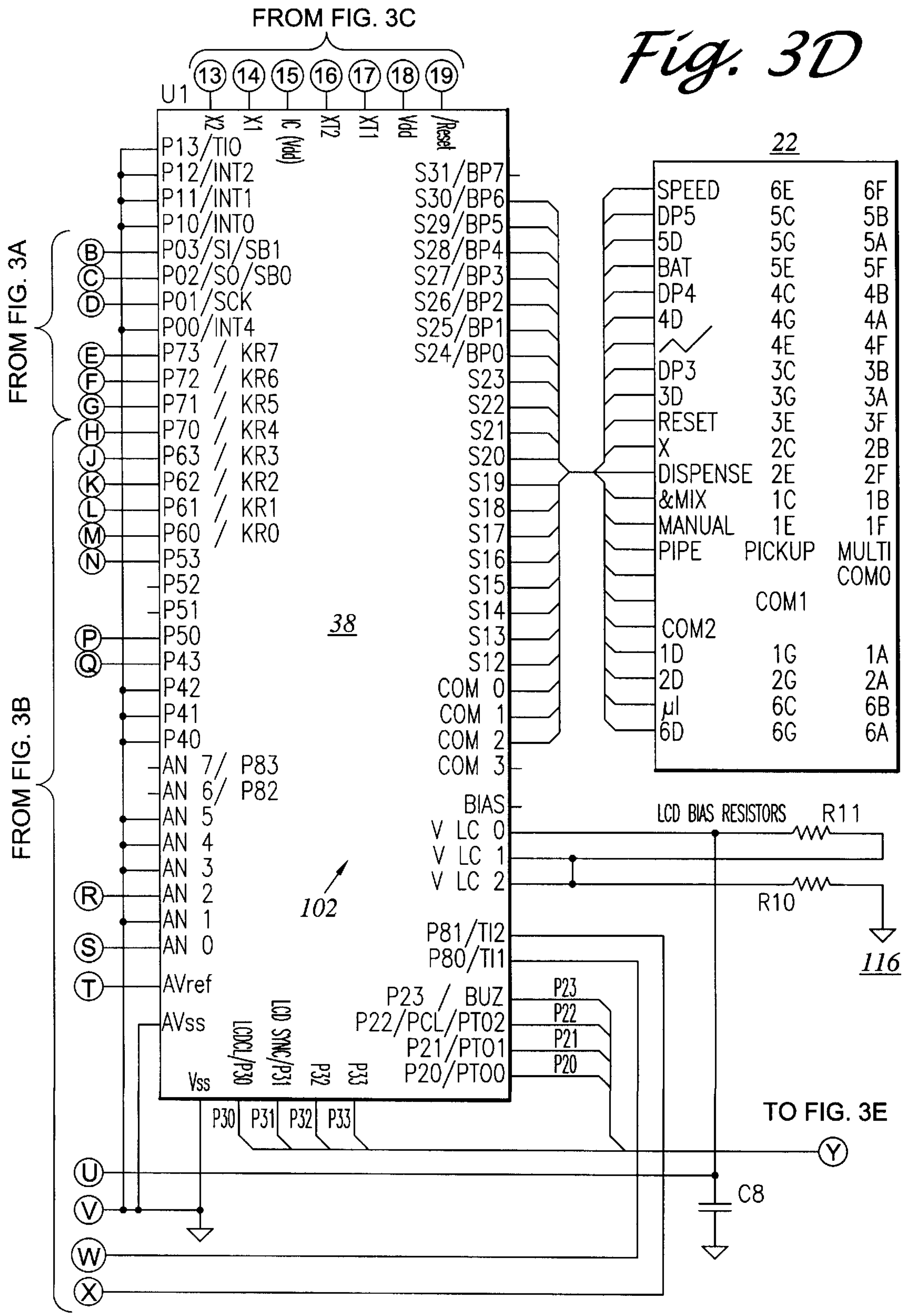

FROM FIG. 3C
Fig. 3D
U1
X2
X1
IC (Vdd)
XT2
XT1
Vdd
/Reset
P13/TI0
P12/INT2
P11/INT1
P10/INT0
P03/SI/SB1
P02/SO/SB0
P01/SCK
P00/INT4
P73 / KR7
P72 / KR6
P71 / KR5
P70 / KR4
P63 / KR3
P62 / KR2
P61 / KR1
P60 / KR0
P53
P52
P51
P50
P43
P42
P41
P40
AN 7/ P83
AN 6/ P82
AN 5
AN 4
AN 3
AN 2
AN 1
AN 0
AVref
AVss
Vss
LCDCL/P30
LCD SYNC/P31
P32
P33
S31/BP7
S30/BP6
S29/BP5
S28/BP4
S27/BP3
S26/BP2
S25/BP1
S24/BP0
S23
S22
S21
S20
S19
S18
S17
S16
S15
S14
S13
S12
COM 0
COM 1
COM 2
COM 3
BIAS
V LC 0
V LC 1
V LC 2
P81/TI2
P80/TI1
P23 / BUZ
P22/PCL/PT02
P21/PT01
P20/PT00
38
102
FROM FIG. 3A
FROM FIG. 3B
B
C
D
E
F
G
H
J
K
L
M
N
P
Q
R
S
T
U
V
W
X
13
14
15
16
17
18
19
22
SPEED 6E 6F
DP5 5C 5B
5D 5G 5A
BAT 5E 5F
DP4 4C 4B
4D 4G 4A
4E 4F
DP3 3C 3B
3D 3G 3A
RESET 3E 3F
X 2C 2B
DISPENSE 2E 2F
&MIX 1C 1B
MANUAL 1E 1F
PIPE PICKUP MULTI
COM0
COM1
COM2
1D 1G 1A
2D 2G 2A
µl 6C 6B
6D 6G 6A
LCD BIAS RESISTORS
R11
R10
116
P23
P22
P21
P20
P30
P31
P32
P33
TO FIG. 3E
Y
C8

| | | RANGE 1: 0.6 PEAK D.C. | | | RANGE 2: 0.574 PEAK D.C. | | | RANGE 3: 0.546 PEAK D.C. | | | RANGE 4: 0.41 PEAK D.C. | | |
|---|---|---|---|---|---|---|---|---|---|---|---|---|---|
| μ-STEP NUMBER | ANGLE (DEG.) | TICS: PORT 2 ON | PORT 3 ON | PORTS OFF | TICS: PORT 2 ON | PORT 3 ON | PORTS OFF | TICS: PORT 2 ON | PORT 3 ON | PORTS OFF | TICS: PORT 2 ON | PORT 3 ON | PORTS OFF |
| 0 | 0 | 42 | 0 | 28 | 40 | 0 | 30 | 38 | 0 | 32 | 29 | 0 | 41 |
| 1 | 6 | 42 | 4 | 24 | 40 | 4 | 26 | 38 | 4 | 28 | 29 | 3 | 39 |
| 2 | 11 | 41 | 8 | 21 | 39 | 8 | 23 | 37 | 7 | 25 | 28 | 6 | 36 |
| 3 | 17 | 40 | 12 | 18 | 38 | 12 | 20 | 37 | 11 | 22 | 27 | 8 | 34 |
| 4 | 23 | 39 | 16 | 15 | 37 | 15 | 18 | 35 | 15 | 20 | 27 | 11 | 33 |
| 5 | 28 | 37 | 20 | 13 | 35 | 19 | 16 | 34 | 18 | 18 | 25 | 14 | 31 |
| 6 | 34 | 35 | 23 | 12 | 33 | 22 | 14 | 32 | 21 | 17 | 24 | 16 | 30 |
| 7 | 39 | 32 | 27 | 11 | 31 | 25 | 13 | 30 | 24 | 16 | 22 | 18 | 30 |
| 8 | 45 | 30 | 30 | 11 | 28 | 28 | 13 | 27 | 27 | 16 | 20 | 20 | 29 |
| 9 | 51 | 27 | 32 | 11 | 25 | 31 | 13 | 24 | 30 | 16 | 18 | 22 | 30 |
| 10 | 56 | 23 | 35 | 12 | 22 | 33 | 14 | 21 | 32 | 17 | 16 | 24 | 30 |
| 11 | 62 | 20 | 37 | 13 | 19 | 35 | 16 | 18 | 34 | 18 | 14 | 25 | 31 |
| 12 | 68 | 16 | 39 | 15 | 15 | 37 | 18 | 15 | 35 | 20 | 11 | 27 | 33 |
| 13 | 73 | 12 | 40 | 18 | 12 | 38 | 20 | 11 | 37 | 22 | 8 | 27 | 34 |
| 14 | 79 | 8 | 41 | 21 | 8 | 39 | 23 | 7 | 37 | 25 | 6 | 28 | 35 |
| 15 | 84 | 4 | 42 | 24 | 4 | 40 | 26 | 4 | 38 | 28 | 3 | 29 | 39 |
| 16 | 90 | 0 | 42 | 28 | 0 | 40 | 30 | 0 | 38 | 32 | 0 | 29 | 40 |
| 17 | 96 | -4 | 42 | 24 | -4 | 40 | 26 | -4 | 38 | 28 | -3 | 29 | 39 |
| 18 | 101 | -8 | 41 | 21 | -8 | 39 | 23 | -7 | 37 | 25 | -6 | 28 | 36 |
| 19 | 107 | -12 | 40 | 18 | -12 | 38 | 20 | -11 | 37 | 22 | -8 | 27 | 34 |
| 20 | 113 | -16 | 39 | 15 | -15 | 37 | 18 | -15 | 35 | 20 | -11 | 27 | 33 |
| 21 | 118 | -20 | 37 | 13 | -19 | 35 | 16 | -18 | 34 | 18 | -14 | 25 | 31 |
| 22 | 124 | -23 | 35 | 12 | -22 | 33 | 14 | -21 | 32 | 17 | -16 | 24 | 30 |
| 23 | 129 | -27 | 32 | 11 | -25 | 31 | 13 | -24 | 30 | 16 | -18 | 22 | 30 |
| 24 | 135 | -30 | 30 | 11 | -28 | 28 | 13 | -27 | 27 | 16 | -20 | 20 | 29 |
| 25 | 141 | -32 | 27 | 11 | -31 | 25 | 13 | -30 | 24 | 16 | -22 | 18 | 30 |
| 26 | 146 | -35 | 23 | 12 | -33 | 22 | 14 | -32 | 21 | 17 | -24 | 16 | 30 |
| 27 | 152 | -37 | 20 | 13 | -35 | 19 | 16 | -34 | 18 | 18 | -25 | 14 | 31 |
| 28 | 158 | -39 | 16 | 15 | -37 | 15 | 18 | -35 | 15 | 20 | -27 | 11 | 33 |
| 29 | 163 | -40 | 12 | 18 | -38 | 12 | 20 | -37 | 11 | 22 | -27 | 8 | 34 |

Fig. 4B-1

| | | | | | | | | | | | | | |
|---|---|---|---|---|---|---|---|---|---|---|---|---|---|
| 30 | 169 | -41 | 8 | 21 | -39 | 8 | 23 | -37 | 7 | 25 | -28 | 6 | 36 |
| 31 | 174 | -42 | 4 | 24 | -40 | 4 | 26 | -38 | 4 | 28 | -29 | 3 | 39 |
| 32 | 180 | -42 | 0 | 28 | -40 | 0 | 30 | -38 | 0 | 32 | -29 | 0 | 41 |
| 33 | 186 | -42 | -4 | 24 | -40 | -4 | 26 | -38 | -4 | 28 | -29 | -3 | 39 |
| 34 | 191 | -41 | -8 | 21 | -39 | -8 | 23 | -37 | -7 | 25 | -28 | -6 | 36 |
| 35 | 197 | -40 | -12 | 18 | -38 | -12 | 20 | -37 | -11 | 22 | -27 | -8 | 34 |
| 36 | 203 | -39 | -16 | 15 | -37 | -15 | 18 | -35 | -15 | 20 | -27 | -11 | 33 |
| 37 | 208 | -37 | -20 | 13 | -35 | -19 | 16 | -34 | -18 | 18 | -25 | -14 | 31 |
| 38 | 214 | -35 | -23 | 12 | -33 | -22 | 14 | -32 | -21 | 17 | -24 | -16 | 30 |
| 39 | 219 | -32 | -27 | 11 | -31 | -25 | 13 | -30 | -24 | 16 | -22 | -18 | 30 |
| 40 | 225 | -30 | -30 | 11 | -28 | -28 | 13 | -27 | -27 | 16 | -20 | -20 | 29 |
| 41 | 231 | -27 | -32 | 11 | -25 | -31 | 13 | -24 | -30 | 16 | -18 | -22 | 30 |
| 42 | 236 | -23 | -35 | 12 | -22 | -33 | 14 | -21 | -32 | 17 | -16 | -24 | 30 |
| 43 | 242 | -20 | -37 | 13 | -19 | -35 | 16 | -18 | -34 | 18 | -14 | -25 | 31 |
| 44 | 248 | -16 | -39 | 15 | -15 | -37 | 18 | -15 | -35 | 20 | -11 | -27 | 33 |
| 45 | 253 | -12 | -40 | 18 | -12 | -38 | 20 | -11 | -37 | 22 | -8 | -27 | 34 |
| 46 | 259 | -8 | -41 | 21 | -8 | -39 | 23 | -7 | -37 | 25 | -6 | -28 | 36 |
| 47 | 264 | -4 | -42 | 24 | -4 | -40 | 26 | -4 | -38 | 28 | -3 | -29 | 39 |
| 48 | 270 | 0 | -42 | 28 | 0 | -40 | 30 | 0 | -38 | 32 | 0 | -29 | 41 |
| 49 | 276 | 4 | -42 | 24 | 4 | -40 | 26 | 4 | -38 | 28 | 3 | -29 | 39 |
| 50 | 281 | 8 | -41 | 21 | 8 | -39 | 23 | 7 | -37 | 25 | 6 | -28 | 36 |
| 51 | 287 | 12 | -40 | 18 | 12 | -38 | 20 | 11 | -37 | 22 | 8 | -27 | 34 |
| 52 | 293 | 16 | -39 | 15 | 15 | -37 | 18 | 15 | -35 | 20 | 11 | -27 | 33 |
| 53 | 298 | 20 | -37 | 13 | 19 | -35 | 16 | 18 | -34 | 18 | 14 | -25 | 31 |
| 54 | 304 | 23 | -35 | 12 | 22 | -33 | 14 | 21 | -32 | 17 | 16 | -24 | 30 |
| 55 | 309 | 27 | -32 | 11 | 25 | -31 | 13 | 24 | -30 | 16 | 18 | -22 | 30 |
| 56 | 315 | 30 | -30 | 11 | 28 | -28 | 13 | 27 | -27 | 16 | 20 | -20 | 29 |
| 57 | 321 | 32 | -27 | 11 | 31 | -25 | 13 | 30 | -24 | 16 | 22 | -18 | 30 |
| 58 | 326 | 35 | -23 | 12 | 33 | -22 | 14 | 32 | -21 | 17 | 24 | -16 | 30 |
| 59 | 332 | 37 | -20 | 13 | 35 | -19 | 16 | 34 | -18 | 18 | 25 | -14 | 31 |
| 60 | 338 | 39 | -16 | 15 | 37 | -15 | 18 | 35 | -15 | 20 | 27 | -11 | 33 |
| 61 | 343 | 40 | -12 | 18 | 38 | -12 | 20 | 37 | -11 | 22 | 27 | -8 | 34 |
| 62 | 349 | 41 | -8 | 21 | 39 | -8 | 23 | 37 | -7 | 25 | 28 | -6 | 36 |
| 63 | 354 | 42 | -4 | 24 | 40 | -4 | 26 | 38 | -4 | 28 | 29 | -3 | 39 |
| 64 | 360 | 42 | 0 | 28 | 40 | 0 | 30 | 38 | 0 | 32 | 29 | 0 | 41 |

Fig. 4B-2

| | NUMBER OF PWM PERIODS IN EACH u STEP FOR "PIPET" MODE SPEED | | | | | | | | | |
|---|---|---|---|---|---|---|---|---|---|---|
| u STEP | 1 | 2 | 3 | 4 | 5 | 6 | 7 | 8 | 9 | 10 |
| 0 | 9 | 7 | 6 | 5 | 5 | 4 | 3 | 3 | 2 | 1 |
| 1 | 8 | 7 | 6 | 5 | 4 | 4 | 3 | 2 | 1 | 1 |
| 2 | 9 | 7 | 6 | 5 | 5 | 4 | 3 | 2 | 2 | 1 |
| 3 | 8 | 7 | 6 | 5 | 4 | 3 | 3 | 2 | 1 | 1 |
| 4 | 9 | 7 | 6 | 5 | 5 | 4 | 3 | 3 | 2 | 1 |
| 5 | 8 | 7 | 6 | 5 | 4 | 4 | 3 | 2 | 1 | 1 |
| 6 | 8 | 7 | 6 | 5 | 4 | 4 | 3 | 2 | 2 | 1 |
| 7 | 8 | 7 | 6 | 5 | 4 | 3 | 3 | 2 | 1 | 1 |
| 8 | 9 | 7 | 6 | 5 | 5 | 4 | 3 | 3 | 2 | 1 |
| 9 | 8 | 7 | 6 | 5 | 4 | 4 | 3 | 2 | 1 | 1 |
| 10 | 8 | 7 | 6 | 5 | 5 | 4 | 3 | 2 | 2 | 1 |
| 11 | 8 | 7 | 6 | 5 | 4 | 3 | 3 | 2 | 1 | 1 |
| 12 | 9 | 7 | 6 | 5 | 5 | 4 | 3 | 3 | 2 | 1 |
| 13 | 8 | 7 | 6 | 5 | 4 | 4 | 3 | 2 | 1 | 1 |
| 14 | 8 | 7 | 6 | 5 | 4 | 4 | 3 | 2 | 2 | 1 |
| 15 | 8 | 7 | 6 | 5 | 4 | 3 | 3 | 2 | 1 | 1 |
| TOTAL PWM PERIODS/STEP: | 133 | 112 | 96 | 80 | 70 | 60 | 48 | 36 | 24 | 16 |
| TIME (ms/STEP): | 24.83 | 20.91 | 17.92 | 14.93 | 13.07 | 11.20 | 8.96 | 6.72 | 4.48 | 2.99 |
| 200 STEP MOVE (sec.) (W/O ACCELERATION RAMPS): | 4.97 | 4.18 | 3.58 | 2.99 | 2.61 | 2.24 | 1.79 | 1.34 | 0.90 | 0.60 |

Fig. 5

ACCELERATION REPETITION PATTERN FROM ZERO TO "SPEED 10"

| PWM PERIODS PER μ STEP | μ STEPS COMPLETED | CUMULATIVE PWM PERIODS | TOTAL LAPSED TIME (ms) |
|---|---|---|---|
| 11 | 0 | 11 | 2.05 |
| 9 | 1 | 20 | 3.73 |
| 4 | 2 | 24 | 4.48 |
| 4 | 3 | 28 | 5.23 |
| 4 | 4 | 32 | 5.97 |
| 3 | 5 | 35 | 6.53 |
| 3 | 6 | 38 | 7.09 |
| 2 | 7 | 40 | 7.47 |
| 2 | 8 | 42 | 7.84 |
| 3 | 9 | 45 | 8.40 |
| 2 | 10 | 47 | 8.77 |
| 2 | 11 | 49 | 9.15 |
| 2 | 12 | 51 | 9.52 |
| 2 | 13 | 53 | 9.89 |
| 2 | 14 | 55 | 10.27 |
| 2 | 15 | 57 | 10.64 |
| 2 | 16 | 59 | 11.01 |
| 1 | 17 | 60 | 11.20 |
| 2 | 18 | 62 | 11.57 |
| 1 | 19 | 63 | 11.76 |
| 2 | 20 | 65 | 12.13 |
| 1 | 21 | 66 | 12.32 |
| 2 | 22 | 68 | 12.69 |
| 1 | 23 | 69 | 12.88 |
| 2 | 24 | 71 | 13.25 |
| 1 | 25 | 72 | 13.44 |
| 2 | 26 | 74 | 13.81 |
| 1 | 27 | 75 | 14.00 |
| 1 | 28 | 76 | 14.19 |
| 2 | 29 | 78 | 14.56 |
| 1 | 30 | 79 | 14.75 |
| 1 | 31 | 80 | 14.93 |

Fig. 7A

| PWM PERIODS PER μ STEP | μ STEPS COMPLETED | CUMULATIVE PWM PERIODS | TOTAL LAPSED TIME (ms) |
|---|---|---|---|
| 1 | 32 | 81 | 15.12 |
| 2 | 33 | 83 | 15.49 |
| 1 | 34 | 84 | 15.68 |
| 1 | 35 | 85 | 15.87 |
| 1 | 36 | 86 | 16.05 |
| 2 | 37 | 88 | 16.43 |
| 1 | 38 | 89 | 16.61 |
| 1 | 39 | 90 | 16.80 |
| 1 | 40 | 91 | 16.99 |
| 2 | 41 | 93 | 17.36 |
| 1 | 42 | 94 | 17.55 |
| 1 | 43 | 95 | 17.73 |
| 1 | 44 | 96 | 17.92 |
| 1 | 45 | 97 | 18.11 |
| 2 | 46 | 99 | 18.48 |
| 1 | 47 | 100 | 18.67 |
| 1 | 48 | 101 | 18.85 |
| 1 | 49 | 102 | 19.04 |
| 1 | 50 | 103 | 19.23 |
| 1 | 51 | 104 | 19.41 |
| 1 | 52 | 105 | 19.60 |
| 1 | 53 | 106 | 19.79 |
| 1 | 54 | 107 | 19.97 |
| 1 | 55 | 108 | 20.16 |
| 1 | 56 | 109 | 20.35 |
| 2 | 57 | 111 | 20.72 |
| 1 | 58 | 112 | 20.91 |
| 1 | 59 | 113 | 21.09 |
| 1 | 60 | 114 | 21.28 |
| 1 | 61 | 115 | 21.47 |
| 1 | 62 | 116 | 21.65 |
| 1 | 63 | 117 | 21.84 |
| 1 | 64 | 118 | 22.03 |
| 1 | 65 | 119 | 22.21 |
| 1 | 66 | 120 | 22.40 |
| 1 | 67 | 121 | 22.59 |
| 1 | 68 | 122 | 22.77 |
| 1 | 69 | 123 | 22.96 |
| 1 | 70 | 124 | 23.15 |

Fig. 7B

| PWM PERIODS PER μ STEP | μ STEPS COMPLETED | CUMULATIVE PWM PERIODS | TOTAL LAPSED TIME (ms) |
|---|---|---|---|
| 1 | 71 | 125 | 23.33 |
| 1 | 72 | 126 | 23.52 |
| 1 | 73 | 127 | 23.71 |
| 1 | 74 | 128 | 23.89 |
| 1 | 75 | 129 | 24.08 |
| 1 | 76 | 130 | 24.27 |
| 1 | 77 | 131 | 24.45 |
| 1 | 78 | 132 | 24.64 |
| 1 | 79 | 133 | 24.83 |
| 1 | 80 | 134 | 25.01 |
| 1 | 81 | 135 | 25.20 |
| 1 | 82 | 136 | 23.39 |
| 1 | 83 | 137 | 25.57 |
| 1 | 84 | 138 | 25.76 |
| 1 | 85 | 139 | 25.95 |
| 1 | 86 | 140 | 26.13 |
| 1 | 87 | 141 | 26.32 |
| 1 | 88 | 142 | 26.51 |
| 1 | 89 | 143 | 26.69 |
| 1 | 90 | 144 | 26.88 |
| 1 | 91 | 145 | 27.07 |
| 1 | 92 | 146 | 27.25 |
| 1 | 93 | 147 | 27.44 |
| 1 | 94 | 148 | 27.63 |
| 1 | 95 | 149 | 27.81 |
| 1 | 96 | 150 | 28.00 |
| 1 | 97 | 151 | 28.19 |
| 1 | 98 | 152 | 28.37 |
| 1 | 99 | 153 | 28.56 |
| 1 | 100 | 154 | 28.75 |
| 1 | 101 | 155 | 28.93 |
| 1 | 102 | 156 | 29.12 |
| 1 | 103 | 157 | 29.31 |
| 1 | 104 | 158 | 29.49 |
| 1 | 105 | 159 | 29.68 |
| 1 | 106 | 160 | 29.87 |
| 1 | 107 | 161 | 30.05 |
| 1 | 108 | 162 | 30.24 |
| 1 | 109 | 163 | 30.43 |

*Fig. 7C*

| PWM PERIODS PER μ STEP | μ STEPS COMPLETED | CUMULATIVE PWM PERIODS | TOTAL LAPSED TIME (ms) |
|---|---|---|---|
| 1 | 110 | 164 | 30.61 |
| 1 | 111 | 165 | 30.80 |
| 1 | 112 | 166 | 30.99 |
| 1 | 113 | 167 | 31.17 |
| 1 | 114 | 168 | 31.36 |
| 1 | 115 | 169 | 31.55 |
| 1 | 116 | 170 | 31.73 |
| 1 | 117 | 171 | 31.92 |
| 1 | 118 | 172 | 32.11 |
| 1 | 119 | 173 | 32.29 |
| 1 | 120 | 174 | 32.48 |
| 1 | 121 | 175 | 32.67 |
| 1 | 122 | 176 | 32.85 |
| 1 | 123 | 177 | 33.04 |
| 1 | 124 | 178 | 33.23 |
| 1 | 125 | 179 | 33.41 |
| 1 | 126 | 180 | 33.60 |
| 1 | 127 | 181 | 33.79 |
| 1 | 128 | 182 | 33.97 |
| 1 | 129 | 183 | 34.16 |
| 1 | 130 | 184 | 34.35 |
| 1 | 131 | 185 | 34.53 |
| 1 | 132 | 186 | 34.72 |
| 1 | 133 | 187 | 34.91 |
| 1 | 134 | 188 | 35.09 |
| 1 | 135 | 189 | 35.28 |
| 1 | 136 | 190 | 35.47 |
| 1 | 137 | 191 | 35.65 |
| 1 | 138 | 192 | 35.84 |
| 1 | 139 | 193 | 36.03 |
| 1 | 140 | 194 | 36.21 |
| 1 | 141 | 195 | 36.40 |
| 1 | 142 | 196 | 36.59 |
| 1 | 143 | 197 | 36.77 |
| 1 | 144 | 198 | 36.96 |
| 1 | 145 | 199 | 37.15 |
| 1 | 146 | 200 | 37.33 |
| 1 | 147 | 201 | 37.52 |
| 1 | 148 | 202 | 37.71 |

Fig. 7D

| PWM PERIODS PER µ STEP | µ STEPS COMPLETED | CUMULATIVE PWM PERIODS | TOTAL LAPSED TIME (ms) |
|---|---|---|---|
| 1 | 149 | 203 | 37.89 |
| 1 | 150 | 204 | 38.08 |
| 1 | 151 | 205 | 38.27 |
| 1 | 152 | 206 | 38.45 |
| 1 | 153 | 207 | 38.64 |
| 1 | 154 | 208 | 38.83 |
| 1 | 155 | 209 | 39.01 |
| 1 | 156 | 210 | 39.20 |
| 1 | 157 | 211 | 39.39 |
| 1 | 158 | 212 | 39.57 |
| 1 | 159 | 213 | 39.76 |
| 1 | 160 | 214 | 39.95 |
| 1 | 161 | 215 | 40.13 |
| 1 | 162 | 216 | 40.32 |
| 1 | 163 | 217 | 40.51 |
| 1 | 164 | 218 | 40.69 |
| 1 | 165 | 219 | 40.88 |
| 1 | 166 | 220 | 41.07 |
| 1 | 167 | 221 | 41.25 |
| 1 | 168 | 222 | 41.44 |
| 1 | 169 | 223 | 41.63 |
| 1 | 170 | 224 | 41.81 |
| 1 | 171 | 225 | 42.00 |
| 1 | 172 | 226 | 42.19 |
| 1 | 173 | 227 | 42.37 |
| 1 | 174 | 228 | 42.56 |
| 1 | 175 | 229 | 42.75 |
| 1 | 176 | 230 | 42.93 |
| 1 | 177 | 231 | 43.12 |
| 1 | 178 | 232 | 43.31 |
| 1 | 179 | 233 | 43.49 |
| 1 | 180 | 234 | 43.68 |
| 1 | 181 | 235 | 43.87 |
| 1 | 182 | 236 | 44.05 |
| 1 | 183 | 237 | 44.24 |
| 1 | 184 | 238 | 44.43 |
| 1 | 185 | 239 | 44.61 |
| 1 | 186 | 240 | 44.80 |
| 1 | 187 | 241 | 44.99 |

Fig. 7E

| PWM PERIODS PER μ STEP | μ STEPS COMPLETED | CUMULATIVE PWM PERIODS | TOTAL LAPSED TIME (ms) |
|---|---|---|---|
| 1 | 188 | 242 | 45.17 |
| 1 | 189 | 243 | 45.36 |
| 1 | 190 | 244 | 45.55 |
| 1 | 191 | 245 | 45.73 |
| 1 | 192 | 246 | 45.92 |
| 1 | 193 | 247 | 46.11 |
| 1 | 194 | 248 | 46.29 |
| 1 | 195 | 249 | 46.48 |
| 1 | 196 | 250 | 46.67 |
| 1 | 197 | 251 | 46.85 |
| 1 | 198 | 252 | 47.04 |
| 1 | 199 | 253 | 47.23 |
| 1 | 200 | 254 | 47.41 |
| 1 | 201 | 255 | 47.60 |
| 1 | 202 | 256 | 47.79 |
| 1 | 203 | 257 | 47.97 |
| 1 | 204 | 258 | 48.16 |
| 1 | 205 | 259 | 48.35 |
| 1 | 206 | 260 | 48.53 |
| 1 | 207 | 261 | 48.72 |
| 1 | 208 | 262 | 48.91 |
| 1 | 209 | 263 | 49.09 |
| 1 | 210 | 264 | 49.28 |
| 1 | 211 | 265 | 49.47 |
| 1 | 212 | 266 | 49.65 |
| 1 | 213 | 267 | 49.84 |

Fig. 7F

OFFSET CORRECTION

| SET VOLUME | ERROR | CORRECTION |
|---|---|---|
| 0 | | |
| 0.5 | -0.383423 | 0.38342297 |
| 1 | -0.3996133 | 0.3996133 |
| 1.5 | -0.4150425 | 0.41504252 |
| 2 | -0.4297541 | 0.42975413 |
| 2.5 | -0.4437882 | 0.44378821 |
| 3 | -0.4571818 | 0.4571818 |
| 3.5 | -0.4699692 | 0.46996916 |
| 4 | -0.482182 | 0.48218201 |
| 4.5 | -0.4938498 | 0.49384983 |
| 5 | -0.505 | 0.505 |
| 5.5 | -0.515658 | 0.51565803 |
| 6 | -0.5258477 | 0.52584769 |
| 6.5 | -0.5355912 | 0.53559119 |
| 7 | -0.5449093 | 0.54490926 |
| 7.5 | -0.5538214 | 0.55382135 |
| 8 | -0.5623457 | 0.56234566 |
| 8.5 | -0.5704993 | 0.57049927 |
| 9 | -0.5782982 | 0.57829823 |
| 9.5 | -0.5857576 | 0.58575763 |
| 10 | -0.5928917 | 0.59289168 |
| 10.5 | -0.5997138 | 0.59971376 |
| 11 | -0.6062365 | 0.60623652 |
| 11.5 | -0.6124719 | 0.61247188 |
| 12 | -0.6184311 | 0.6184311 |
| 12.5 | -0.6241248 | 0.62412485 |
| 13 | -0.6295632 | 0.62956322 |
| 13.5 | -0.6347558 | 0.63475578 |
| 14 | -0.6397116 | 0.6397116 |
| 14.5 | -0.6444393 | 0.64443929 |
| 15 | -0.648947 | 0.64894702 |
| 15.5 | -0.6532426 | 0.65324257 |
| 16 | -0.6573333 | 0.65733333 |
| 16.5 | -0.6612263 | 0.66122634 |
| 17 | -0.6649283 | 0.6649283 |
| 17.5 | -0.6684456 | 0.66844561 |
| 18 | -0.6717843 | 0.67178435 |
| 18.5 | -0.6749503 | 0.67495034 |

Fig. 9A

| SET VOLUME | ERROR | CORRECTION |
|---|---|---|
| 19 | -0.6779491 | 0.67794914 |
| 19.5 | -0.6807861 | 0.68078605 |
| 20 | -0.6834662 | 0.68346616 |
| 20.5 | -0.6859943 | 0.68599431 |
| 21 | -0.6883752 | 0.68837515 |
| 21.5 | -0.6906131 | 0.69061314 |
| 22 | -0.6927125 | 0.69271253 |
| 22.5 | -0.6946774 | 0.69467742 |
| 23 | -0.6965117 | 0.69651172 |
| 23.5 | -0.6982192 | 0.69821921 |
| 24 | -0.6998035 | 0.69980349 |
| 24.5 | -0.701268 | 0.70126803 |
| 25 | -0.7026162 | 0.70261617 |
| 25.5 | -0.7038511 | 0.70385112 |
| 26 | -0.704976 | 0.70497596 |
| 26.5 | -0.7059937 | 0.70599366 |
| 27 | -0.7069071 | 0.70690707 |
| 27.5 | -0.7077189 | 0.70771895 |
| 28 | -0.7084319 | 0.70843195 |
| 28.5 | -0.7090486 | 0.70904862 |
| 29 | -0.7095714 | 0.70957143 |
| 29.5 | -0.7100028 | 0.71000275 |
| 30 | -0.7103449 | 0.71034488 |
| 30.5 | -0.7106 | 0.71060003 |
| 31 | -0.7107703 | 0.71077033 |
| 31.5 | -0.7108579 | 0.71085786 |
| 32 | -0.7108646 | 0.7108646 |
| 32.5 | -0.7107925 | 0.71079248 |
| 33 | -0.7106434 | 0.71064338 |
| 33.5 | -0.7104191 | 0.71041908 |
| 34 | -0.7101213 | 0.71012134 |
| 34.5 | -0.7097518 | 0.70975184 |
| 35 | -0.7093122 | 0.70931223 |
| 35.5 | -0.7088041 | 0.70880407 |
| 36 | -0.7082289 | 0.70822891 |
| 36.5 | -0.7075882 | 0.70758823 |
| 37 | -0.7068835 | 0.70688347 |

Fig. 9B

| SET VOLUME | ERROR | CORRECTION |
|---|---|---|
| 37.5 | -0.706116 | 0.70611602 |
| 38 | -0.7052873 | 0.70528725 |
| 38.5 | -0.7043985 | 0.70439846 |
| 39 | -0.7034509 | 0.70345093 |
| 39.5 | -0.7024459 | 0.70244589 |
| 40 | -0.7013846 | 0.70138455 |
| 40.5 | -0.7002681 | 0.70026807 |
| 41 | -0.6990976 | 0.69909758 |
| 41.5 | -0.6978742 | 0.69787419 |
| 42 | -0.696599 | 0.69659896 |
| 42.5 | -0.6952729 | 0.69527293 |
| 43 | -0.6938971 | 0.69389711 |
| 43.5 | -0.6924725 | 0.69247248 |
| 44 | -0.691 | 0.691 |
| 44.5 | -0.6894806 | 0.6894806 |
| 45 | -0.6879152 | 0.68791518 |
| 45.5 | -0.6863046 | 0.68630462 |
| 46 | -0.6846498 | 0.68464977 |
| 46.5 | -0.6829515 | 0.68295148 |
| 47 | -0.6812106 | 0.68121056 |
| 47.5 | -0.6794278 | 0.67942778 |
| 48 | -0.6776039 | 0.67760394 |
| 48.5 | -0.6757398 | 0.67573977 |
| 49 | -0.673836 | 0.673836 |
| 49.5 | -0.6718934 | 0.67189336 |
| 50 | -0.6699125 | 0.66991254 |
| 50.5 | -0.6678942 | 0.66789421 |
| 51 | -0.665839 | 0.66583904 |
| 51.5 | -0.6637477 | 0.66374767 |
| 52 | -0.6616207 | 0.66162073 |
| 52.5 | -0.6594588 | 0.65945884 |
| 53 | -0.6572626 | 0.65726259 |
| 53.5 | -0.6550326 | 0.65503258 |
| 54 | -0.6527694 | 0.65276936 |
| 54.5 | -0.6504735 | 0.65047351 |
| 55 | -0.6481456 | 0.64814556 |
| 55.5 | -0.645786 | 0.64578605 |
| 56 | -0.6433955 | 0.64339549 |
| 56.5 | -0.6409744 | 0.6409744 |

Fig. 9C

| SET VOLUME | ERROR | CORRECTION |
|---|---|---|
| 57 | -0.6385233 | 0.63852327 |
| 57.5 | -0.6360426 | 0.63604259 |
| 58 | -0.6335328 | 0.63353283 |
| 58.5 | -0.6309945 | 0.63099446 |
| 59 | -0.6284279 | 0.62842792 |
| 59.5 | -0.6258337 | 0.62583367 |
| 60 | -0.6232121 | 0.62321213 |
| 60.5 | -0.6205637 | 0.62056373 |
| 61 | -0.6178889 | 0.61788889 |
| 61.5 | -0.615186 | 0.61518801 |
| 62 | -0.6124615 | 0.61246149 |
| 62.5 | -0.6097097 | 0.60970971 |
| 63 | -0.6069331 | 0.60693307 |
| 63.5 | -0.6041319 | 0.60413193 |
| 64 | -0.6013067 | 0.60130665 |
| 64.5 | -0.5984576 | 0.5984576 |
| 65 | -0.5955851 | 0.59558512 |
| 65.5 | -0.5926896 | 0.59268956 |
| 66 | -0.5897713 | 0.58977126 |
| 66.5 | -0.5868305 | 0.58683054 |
| 67 | -0.5838677 | 0.58386772 |
| 67.5 | -0.5808831 | 0.58088313 |
| 68 | -0.5778771 | 0.57787706 |
| 68.5 | -0.5748498 | 0.57484983 |
| 69 | -0.5718017 | 0.57180174 |
| 69.5 | -0.5687331 | 0.56873307 |
| 70 | -0.5656441 | 0.56564411 |
| 70.5 | -0.5625351 | 0.56253514 |
| 71 | -0.5594064 | 0.55940643 |
| 71.5 | -0.5562583 | 0.55625827 |
| 72 | -0.5530909 | 0.5530909 |
| 72.5 | -0.5499046 | 0.5499046 |
| 73 | -0.5466996 | 0.54669961 |
| 73.5 | -0.5434762 | 0.54347619 |
| 74 | -0.5402346 | 0.54023458 |
| 74.5 | -0.536975 | 0.53697502 |
| 75 | -0.5336978 | 0.53369775 |
| 75.5 | -0.530403 | 0.530403 |
| 76 | -0.527091 | 0.527091 |

Fig. 9D

| SET VOLUME | ERROR | CORRECTION |
|---|---|---|
| 76.5 | -0.523762 | 0.52376198 |
| 77 | -0.5204161 | 0.52041614 |
| 77.5 | -0.5170537 | 0.51705372 |
| 78 | -0.5136749 | 0.51367491 |
| 78.5 | -0.5102799 | 0.51027994 |
| 79 | -0.506869 | 0.50686899 |
| 79.5 | -0.5034423 | 0.50344228 |
| 80 | -0.5 | 0.5 |
| 80.5 | -0.4965423 | 0.49654234 |
| 81 | -0.4930695 | 0.4930695 |
| 81.5 | -0.4895817 | 0.48958167 |
| 82 | -0.486079 | 0.48607901 |
| 82.5 | -0.4825617 | 0.48256173 |
| 83 | -0.47903 | 0.47902999 |
| 83.5 | -0.475484 | 0.47548397 |
| 84 | -0.4719238 | 0.47192385 |
| 84.5 | -0.4683498 | 0.46834978 |
| 85 | -0.4647619 | 0.46476194 |
| 85.5 | -0.4611605 | 0.46116049 |
| 86 | -0.4575456 | 0.45754559 |
| 86.5 | -0.4539174 | 0.4539174 |
| 87 | -0.4502761 | 0.45027608 |
| 87.5 | -0.4466218 | 0.44662177 |
| 88 | -0.4429546 | 0.44295463 |
| 88.5 | -0.4392748 | 0.43927481 |
| 89 | -0.4355824 | 0.43558245 |
| 89.5 | -0.4318777 | 0.43187769 |
| 90 | -0.4281607 | 0.42816068 |
| 90.5 | -0.4244315 | 0.42443155 |
| 91 | -0.4206904 | 0.42069044 |
| 91.5 | -0.4169375 | 0.41693749 |
| 92 | -0.4131728 | 0.41317283 |
| 92.5 | -0.4093966 | 0.40939659 |
| 93 | -0.4056089 | 0.40560889 |
| 93.5 | -0.4018099 | 0.40180986 |
| 94 | -0.3979996 | 0.39799963 |
| 94.5 | -0.3941783 | 0.39417833 |
| 95 | -0.3903461 | 0.39034606 |
| 95.5 | -0.3865029 | 0.38650295 |

Fig. 9E

| SET VOLUME | ERROR | CORRECTION |
|---|---|---|
| 96 | -0.3826491 | 0.38264911 |
| 96.5 | -0.3787847 | 0.37878467 |
| 97 | -0.3749097 | 0.37490973 |
| 97.5 | -0.3710244 | 0.37102441 |
| 98 | -0.3671288 | 0.38712881 |
| 98.5 | -0.3632231 | 0.36322305 |
| 99 | -0.3593072 | 0.35930723 |
| 99.5 | -0.3553815 | 0.35538146 |
| 100 | -0.3514458 | 0.35144584 |

Fig. 9f

BATTERY CHARGING LEVELS

| CHARGING LEVEL | Ton (ms) | Toff (ms) | PERIOD (ms) | DUTY CYCLE (%) | CURRENT (ma) | C RATE | VT (n) |
|---|---|---|---|---|---|---|---|
| PRE-CHARGE | 0.36 | 9.64 | 10 | 3.6 | 37 | 0.09 | 3 |
| 0 | 0.36 | 0.64 | 1 | 36.0 | 374 | 0.94 | 3.95 |
| 1 | 0.36 | 1.4 | 1.76 | 20.5 | 213 | 0.53 | 4.025 |
| 2 | 0.36 | 2.64 | 3 | 12.0 | 125 | 0.31 | 4.075 |
| 3 | 0.36 | 5.64 | 6 | 6.0 | 62 | 0.16 | 4.1 |
| 4 | 0.36 | 11.64 | 12 | 3.0 | 31 | 0.08 | 4.1 |
| 5 | 0.36 | 23.64 | 24 | 1.5 | 18 | 0.04 | 4.1 |

*Fig. 19*

BATTERY POWERED MICROPROCESSOR CONTROLLED HAND PORTABLE ELECTRONIC PIPETTE

RELATED APPLICATION

This is a continuation-in-part of U.S. patent application filed Mar. 5, 1999, Ser. No. 09/263,132, now abandoned.

FIELD OF THE INVENTION

The present invention relates to pipettes and more particularly to a battery powered microprocessor controlled hand portable electronic pipette which is light in weight and easily operated by a user over extended periods of time.

BACKGROUND

Since the first commercial introduction of a battery powered microprocessor controlled hand-holdable and easily transportable electronic pipettes by the Rainin Instrument Co., Inc., assignee of the present invention, it has been and continues to be the desire of all electronic pipette manufacturers to provide electronic pipettes which have the functional feel and operational capabilities of manual pipettes such as the world famous PIPETMAN pipette sold exclusively in the United States by the Rainin Instrument Co. for more than 25 years. Specifically in this regard, it continues to be the goal of all electronic pipette manufacturers to develop and produce electronic pipettes that are light in weight, easily holdable and transportable by a user and operational in several modes of operation over extended periods of time without creating physical stress and strain of the hands and forearms of the pipette user. The EDP electronic pipette of the Rainin Instrument Co. introduced in 1984 and its successor models addressed each of the foregoing design criteria. Following Rainin, other companies developing and manufacturing electronic pipettes have also addressed the same criteria and over the years electronic pipettes have become somewhat lighter in weight and more user friendly. However, the desire for an electronic pipette which closely approximates in feel and operational features those of the manual pipette have never been completely achieved. Accordingly, there continues to be a need for such an electronic pipette which is satisfied by the present invention.

SUMMARY OF THE INVENTION

Basically, the present invention satisfies the foregoing needs by providing an electronic pipette which is light in weight, comfortably holdable in either the right or left hand of a user and which is easily operated by the user to direct microprocessor controlled operation of the pipette through different user selected modes of operation for different user selected sample volume and speeds of operation. In providing such a user friendly electronic pipette, the present invention comprises a bilaterally symmetrical design described in detail in the concurrently filed U.S. patent application Ser. No. 09.263,131 which is incorporated herein by this reference. Basically, the design includes an axially elongated hollow housing having a vertically extending longitudinal axis and vertically extending and substantially coaxial upper and lower portions. The upper portion of the housing includes a forward compartment containing a forwardly facing alpha-numeric display adjacent a top of the housing. Thus located, the display is readily viewable by a user during all modes of operation of the pipette be the user right handed or left handed. In addition to the display, the forward compartment contains a plurality of columns of forwardly facing control keys as well as a plurality of forwardly facing trigger switches below the columns of control keys. The display, columns of control keys and trigger switches are bilaterally symmetrical relative to the longitudinal axis of the housing. In addition, the upper portion of the housing includes a rear compartment which contains a replaceable rechargeable battery for powering a microprocessor and linear actuator contained within the housing. The lower portion of the housing comprises a vertically elongated handle which is coaxial with the longitudinal axis of the housing. The handle has contiguous bilaterally symmetrical and vertically extending forward and rear portions for either right or left hand gripping by a user of the pipette. The forward portion of the handle extends forward of the upper portion of the housing and extends vertically downward to a lower end of the housing and in one embodiment internally contains and shields an upper portion of a pipette tip ejector. In the preferred embodiment of the design, the pipette tip ejector has a thumb actuated push button located at a top of the forward portion of the handle and a vertically moveable tip ejector arm extending below the housing and vertically along a pipette tip mounting shaft to encircle the shaft adjacent a lower end thereof. Thus configured, the pipette tip ejector is designed to eject a pipette tip from a lower end of the mounting shaft upon downward movement of the tip ejector arm. Such downward movement is in response to a downward thumb force exerted by the pipette user on the push button while the user is gripping the handle of the pipette. The rear portion of the handle extends rearward from the forward portion and has a hook extending rearward from a back of an upper end of the handle. The hook includes a downwardly curved lower surface for engaging an upper side of an index finger (or middle finger, if desired) of the user while the user is gripping the handle with the thumb of the user free to actuate any of the bilaterally symmetrical control keys, trigger switches and push button in any sequence desired. All this the user is free to do while clearly viewing the alpha numeric display as it responds to the actuation of the control keys and trigger switches. In this regard, the hook, forward and rear portion of the handle and pipette tip ejector including push button and ejector arm are all bilaterally symmetrical relative to the longitudinal axis of the housing. Thus arranged, the pipette of the present invention is easily and comfortably gripped by the user in either his or her left or right hand with the user's index finger under the hook at the rear of the handle. This leaves the user's thumb free to actuate as desired any of the control keys or trigger switches which regulate the various modes of operation of the electronic pipette as well as the volumes of liquid aspirated and dispensed thereby during the several modes of operation of the pipette. All this is accomplished comfortably by the user while exerting minimal thumb forces on the control keys, trigger switches and push button. Thus, the electronic pipette of the present invention is useable by the user over extended periods of time without unduly stressing the user's thumb, hand or forearm enabling accurate and repeatable operation of the pipette in all operational modes of pipette under control of the user.

The electronic pipette of the present invention also preferably incorporates a relatively simple electronic control circuit which enables the software controlled microprocessor to function as a microcontroller generating pulse width modulated (PWM) drive signals for the windings of a stepper motor included in the linear actuator. The PWM signals are generated in synchronism with clock pulses defining the stepping rate of the motor. This allows the PWM signals to be generated by the microcontroller without the control circuit requiring the use of conventional current sensing or feedback circuitry.

The electronic control circuit also minimizes the power requirements of the stepper motor thereby reducing power drain on the battery which powers the pipette. This, in turn, extends the operating life of the pipette between required recharging of the battery.

The electronic control circuit also compliments the user friendly control of the pipette enabling the user to easily switch between the various operating modes of the pipette and in each mode to select between a variety of operating speeds and operating features including cycle counting. When the cycle counting feature is selected by the pipette user, the user is continuously advised of the operational cycle of the pipette. This enables the user to interrupt a sequence of pipette operations without losing tract of the particular cycle of operation of the pipette.

Further, the electronic control circuit of the pipette of the present invention provides for a sequential recharging of a number of pipettes from a single source.

BRIEF DESCRIPTION OF DRAWINGS

FIG. 4*b* comprising FIGS. 4*b*-1 and 4*b*-2 is a numeric table illustrating four different power ranges for the motor drive pulse width modulation signals as a function of the motor microstep position.

FIG. 5 is a table illustrating the pulse width modulation motor drive signal repetition pattern of each microstep for each of the 10 operating speeds for the pipette.

FIG. 7 comprising FIGS. 7*a* through 7*f* is a table representing the numeric values for the motor drive microstep pulse width modulation repetition pattern for the acceleration/velocity ramp from zero to speed 10 that is graphed in FIG. 6 and FIG. 8.

FIGS. 9*a* through 9*f* illustrate a table of the 200 typical correction values depicted by the graph illustrated in FIG. 9 for each volume setting in a 100 microliter range pipette that is used in the graph illustrated in FIG. 9.

FIG. 19 is a table illustrating the timing of the pulse width modulation duty cycles for the various charging levels used to charge the battery powering the microprocessor and stepper motor included in the preferred electronic pipette of the present invention.

DETAILED DESCRIPTION OF INVENTION

Figure 1:
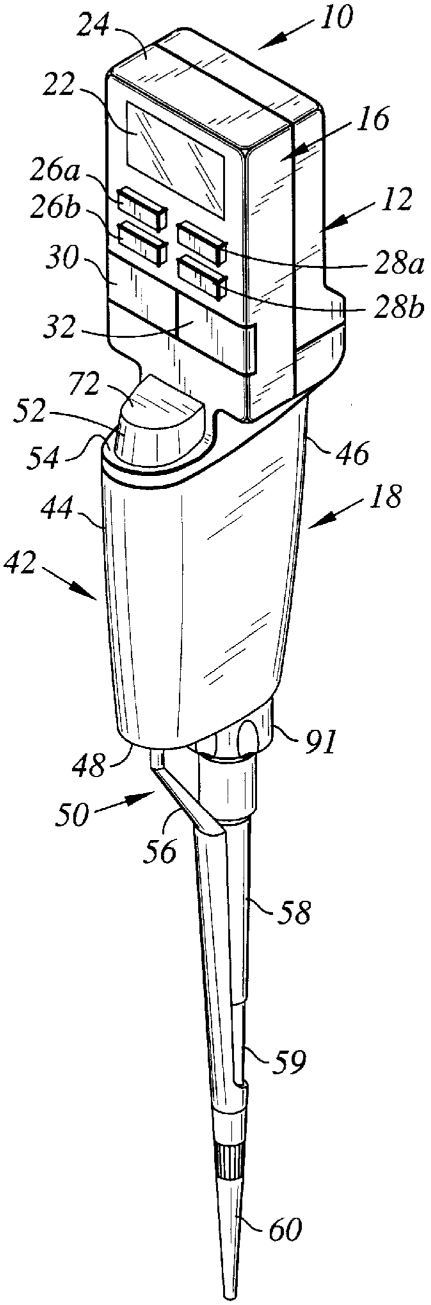
FIG. 1 is a perspective view of a preferred embodiment of the electronic pipette of the present invention.
Figure 2:
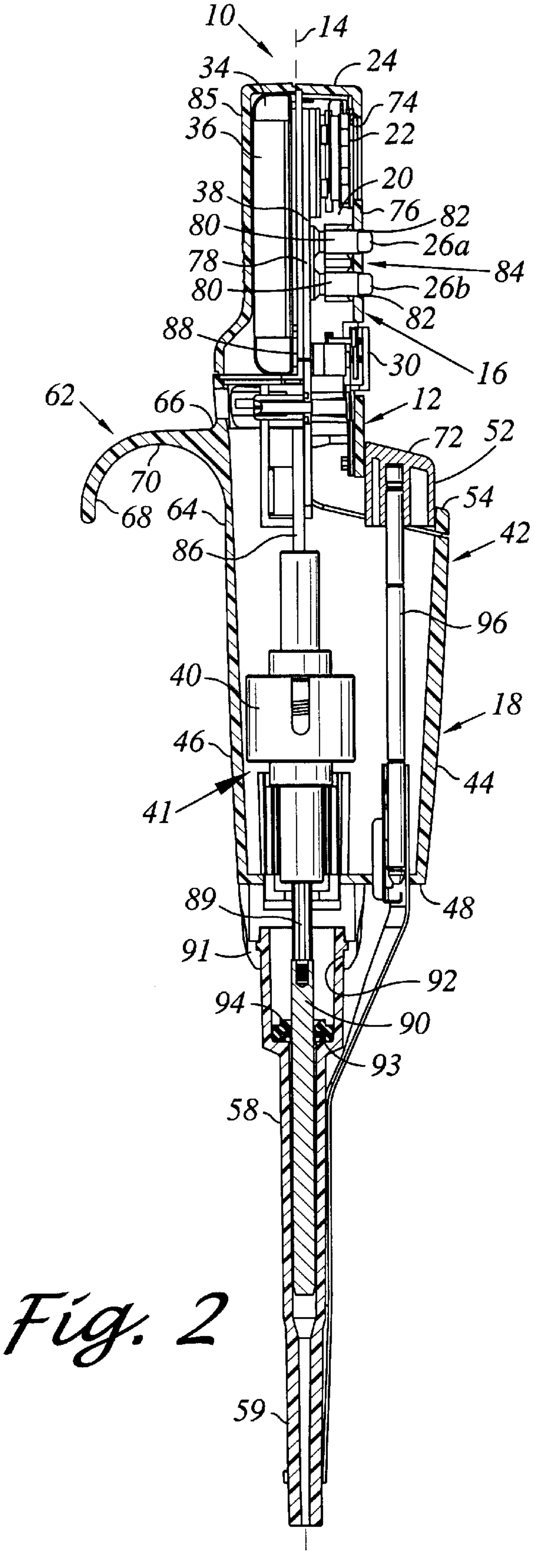
FIG. 2 is a cross sectional side view of the pipette of FIG. 1 showing the internal construction of the pipette and the component parts thereof.

The pipette 10 illustrated in FIGS. 1 and 2 of the drawings comprises a bilaterally symmetrical lightweight hand holdable battery powered microprocessor controlled electronic pipette. As illustrated, the pipette 10 includes an axially elongated hollow housing 12 having a vertically extending longitudinal axis 14. The housing 12 includes vertically extending and substantially coaxial upper and lower portions 16 and 18. The upper portion 16 of the housing includes a forward compartment 20. The compartment 20 contains and supports a forwardly facing alpha-numeric display 22 adjacent a top 24 of the housing. The display is a LCD display of conventional design. In addition, the forward compartment 20 contains and supports a plurality of columns (e.g.

two) of forwardly facing control keys located below the display and plurality of forwardly facing trigger switches one located immediately below each of the columns control keys. In the illustrated embodiment of the present invention, vertically spaced upper control key 26*a* and lower control key 26*b* comprise a first column of control keys spaced to the left of the longitudinal axis 14 of the housing 12. Similarly, vertically spaced upper control key 28*a* and lower control key 28*b* comprise a second column of control keys to the right of the longitudinal axis 14 a distance substantially equal to the spacing of the control keys 26*a*,26*b* from the axis. Also, a trigger switch 30 is supported in the compartment 20 to the left of the axis 14 below the column of control keys 26*a*,26*b* while a trigger switch 32 is supported in the compartment 20 to the right of the axis 14 below the second column of control keys 28*a*,28*b*. In fact, in the illustrated embodiment, the right side of the trigger switch 30 and the left side of the trigger switch 32 lie substantially on a vertical plane including the longitudinal axis 14.

In this regard, it is an important feature of the present invention that the display 22, the columns of control keys 26*a*,26*b* and 28*a*, 28*b* and the trigger switches 30 and 32 are bilaterally symmetrical relative to the longitudinal axis 14 of the housing 12 and as will be described hereinafter in close proximity to a pipette user's thumb while the user is gripping the pipette 10 in his right or left hand and viewing the display 22.

In addition to the foreword compartment 20, the upper portion 16 of the housing 12 includes a rear compartment 34. As illustrated, the rear compartment 34 contains and supports a replaceable battery 36 for powering a microprocessor 38 and a stepper motor 40 included in a linear actuator 41 supported within the housing 12.

The lower portion 18 of the housing 12, on the other hand, comprises a vertically elongated handle 42 coaxial with the longitudinal axis 14 of the housing. The handle 42 comprises contiguous bilaterally symmetrical and vertically extending forward and rear portions 44 and 46 for hand gripping by a user of the pipette 10.

As illustrated, the forward portion 44 of the handle 42 extends forward of the upper portion 16 of the housing 12. It also extends vertically downward to a lower end 48 of the housing 12 to internally contain and shield an upper portion of a pipette tip ejector 50 having a thumb actuated push button 52 located at a top 54 of the forward portion. In addition, the pipette tip ejector 50 includes a vertically moveable tip ejector arm 56 extending below the housing 12 and vertically along a pipette tip mounting shaft 58 to encircle a shaft adjacent a lower end 59 thereof. The pipette tip ejector 50 may be of conventional design such as included in the well known PIPETMAN pipette or may take the form illustrated and described in U.S. Pat. No. 5,614,153 issued Mar. 25, 1997, assigned to the assignee of the present invention and incorporated herein by this reference. As described fully in the patent and as is well known with respect to the PIPETMAN pipette, it is a function of the pipette tip ejector 50 to eject a pipette tip, such as tip 60, from the mounting shaft 58 in response to a downward thumb force exerted by user on the push button 52.

As illustrated, the rear portion 46 of the handle 42 extends rearward from the forward portion 44 and includes a hook 62 extending rearward from a back 64 of an upper end 66 of the handle. The hook preferably has a downwardly curved lower surface 68 for engaging an upper side of an index or middle finger of the pipette user while the user is gripping the handle in either his or her right or left hand. This leaves the thumb of the user free to actuate any of the bilaterally symmetrical and closely spaced control keys (26*a*,26*b*;28*a*, 28*b*), trigger switches (30,32) and push button (52) in any sequence desired while clearly viewing the alpha-numeric display 22 as it responds to the actuation of the control keys and trigger switches. In this regard, the hook 62, forward and rear portions of the handle 42 and the pipette tip ejector 50 including the push button 52 and ejector arm 54 are all bilaterally symmetrical relative to the longitudinal axis 14 of the housing. Further, it should be noted that an uppermost portion 70 of the lower surface of the hook 62 lies in substantially the same horizontal plane as a top 72 of the push button 52. This further enhances the positioning of the user's hand in gripping the handle 42 such that freedom of movement is afforded the user's thumb to actuate the various closely spaced control keys and trigger switches as well as the push button when it is desired to eject a pipette tip from the mounting shaft of the pipette.

In this regard, the control key 26*a* within the left side column preferably comprises a pipette mode of operation control key while the control key 26*b* in the same column is designed to reset or modify operation of the pipette all as described hereinafter.

Further, as illustrated, in the right side column of control keys, the control keys 28*a* and 28*b* control the numeric value displayed by the display 22 as also described in detail hereinafter. For example, actuation of the control key 28*a* may increase the volume setting or speed of operation setting for the pipette 10 as indicated on the display 22. On the other hand, actuation of the control key 28*b* may decrease the volume setting or speed of operation setting for the pipette 10 as indicated on the display 22.

Finally, as will be described hereinafter, in a "manual mode" of operation for the pipette, a first user pressed one of the trigger switches 30,32 may comprise an aspiration actuation or pick up trigger switch while the other one of the trigger switches may comprise a dispense actuation trigger switch. In all other modes of pipette operation, actuation of either trigger switch 30 or 32 may trigger the next programmed step in the user selected mode of operation of the pipette.

More particularly, in the preferred embodiment of the pipette of the present invention, the internal structure of the pipette provides a pipette having a center of gravity within the handle 42. This provides a balanced pipette which is neither top nor bottom heavy and is free of undesired tipping when the user releases his or her grip on the handle and depends upon the hook 42 for support of the pipette. Such balanced structure is represented most clearly in FIG. 2 which illustrates in cross section the internal structure of the electronic pipette.

In this regard, it should be noted that the display 22 is secured by conventional means such as a retaining plate directly behind and within an upper window 74 in a bezel 76 comprising a front face of the upper portion 16 of the pipette housing 12. The display is electrically connected to a printed circuit board 78 mounted vertically within the upper portion of the housing 12 to define the forward compartment 20 for containing the display 22, the control keys (26*a*,*b*;28*a*,*b*) and the trigger switches 30 and 32 as illustrated.

The control keys (26*a*,*b*;28*a*,*b*) are of conventional design and are each supported by a horizontal tube 80 within an opening 82 in a window 84 in the bezel 76 directly below the upper window 74 containing the display 22. The tubes 80 are moveable axially such that the user's thumb in pressing on a forward exposed end of a tube will move a rear end of the tube and a conductive element carried thereby against the printed circuit board 78 to actuate the microprocessor 38 housed on the printed circuit board 78 to (i) change or reset the mode of operation of the pipette or (ii) change the volumes of liquid to be handled by and/or the speed of operation of the pipette according to the user selected modes of operation and (iii) change the corresponding alpha-numeric displays on the display 22. In particular, the volumetric settings and speed of aspiration and dispensing indications displayed by the display 22 are controlled by the keys 28*a* and 28*b* and are reflected in modifications of the operation of the pipette in the various modes selected by actuation of the control key 26*a*, the control key 26*b* being a "reset" key.

The trigger switches 30,32 on the other hand are in circuit with the microprocessor and as described in the concurrently filed patent application are welded or otherwise connected to the bezel 76 such that a thumb actuation of one of the switches will actuate operation of the pipette, such as aspiration, while thumb actuation of the other of the trigger switches 30,32 will actuate a different operation of the pipette such as a dispensing of a liquid by the pipette.

Further, as illustrated, the battery 36 is contained in the rear compartment 34 between the printed circuit board 78 and a removable door 85 included in the upper portion 16 of the housing. The battery 36 powers the microprocessor 38 and the motor 40 by electrical connections through a power jack connected to the printed circuit board 78. The motor 40 is located in the handle 42 of the pipette 10 below the printed circuit board 78 and is vertically secured by a support rib 86 on a backbone support 88 within the housing. The motor 40 may be of conventional design and preferably is a stepper motor powered by the battery 36 and controlled by the microprocessor 38 in a manner described in detail hereinafter.

As illustrated, an output shaft 89 extends vertically from the stepper motor 40 and is connected in a conventional manner to a piston 90 such that rotation of a rotor within the motor produces axial movement of the output shaft 89 and corresponding axial movement of the piston 90 within the pipette tip mounting shaft 56. The pipette tip mounting shaft 58, in turn, is secured by a threaded nut 91 to a threaded collar 92 extending axially from a lower end of the handle 42. The piston 90 passes through a piston seal 93 which is secured in place around the piston by a spring loaded seal retainer 94 (the spring being removed for clarity of illustration).

Also removed for clarity of illustration is the return spring in the pipette tip ejector 50 shown in FIG. 2. The return spring extends around a rod 96 between the push button 52 and ejector arm 54 secured at opposite ends of the rod. Downward movement of the push button 52 is opposed by the return spring and upon a release of the push button, the return spring returns the push button and the rod 96 to their uppermost position.

In the operation of the pipette 10, axial motion of the output shaft 89 of the motor 40 produces controlled axial movement of the piston 90 in the pipette tip mounting shaft 56 to draw or dispense liquid into or from a pipette tip 60 secured to a lower end of the shaft. In all of the operations of the pipette 10, the user of the pipette grips the handle 42 in his or her right or left hand with his or her index or middle finger under the hook 62. This leaves the user's thumb free to operate the push button 52, the trigger switches 30,32 and/or control keys 26*a,b* or 28*a,b* in any sequence he or she desires while clearly viewing the display 22. The trigger switches and the control keys being bilaterally symmetrical relative to the longitudinal axis 14 of the pipette are easily actuated by the user's thumb without the exertion of forces which would lead to stress or strain of the user's thumb, hand or forearm. This allows the electronic pipette of the present invention to be operated in laboratories by technicians for long periods of time without resulting in fatigue or undesired strain on the thumb or hand of the user.

Figure 3A:
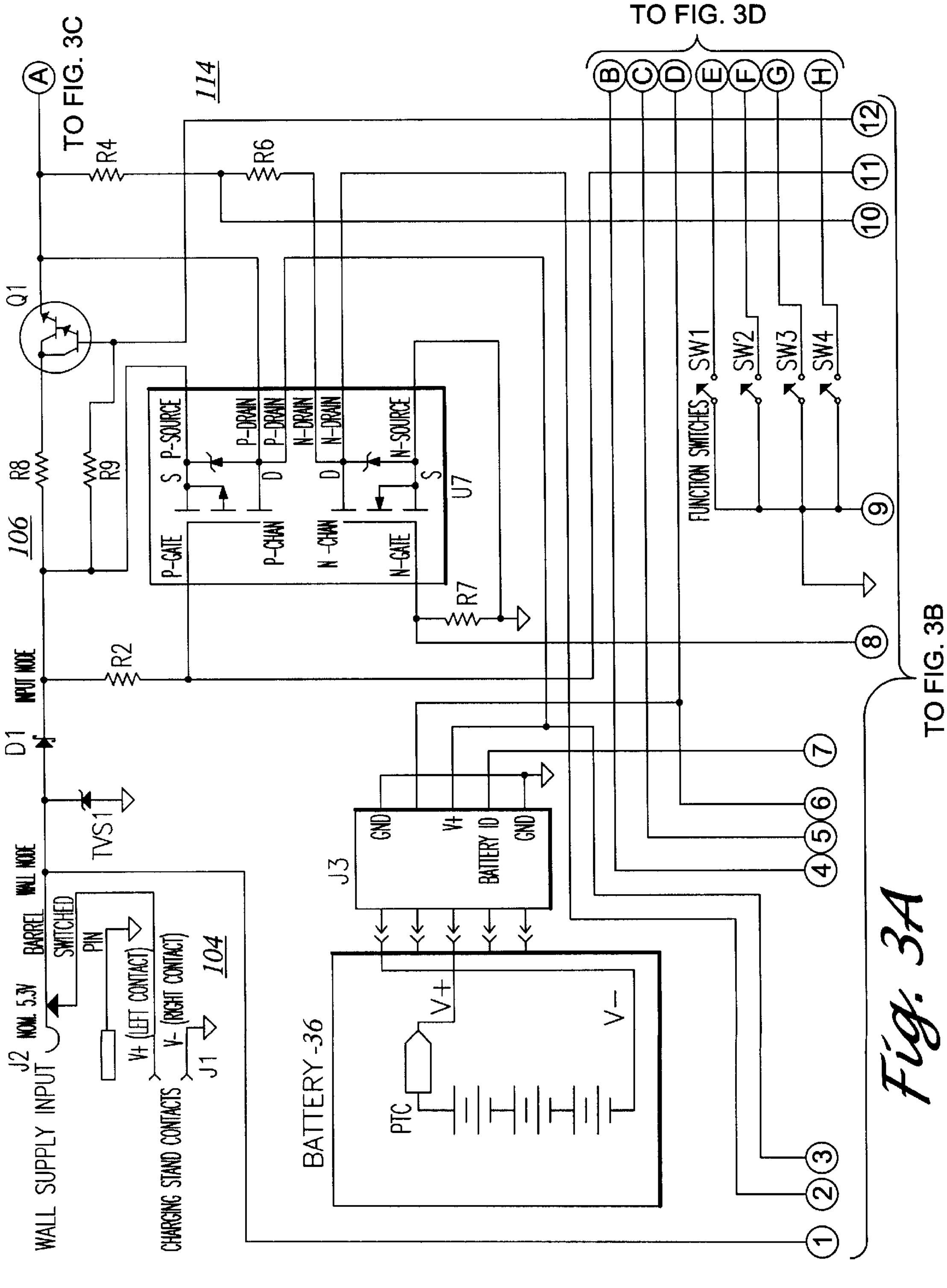
FIG. 3 comprising FIGS. 3A–3E combine to illustrated the electronic circuit of the pipette of the present invention.
Figure 3B:
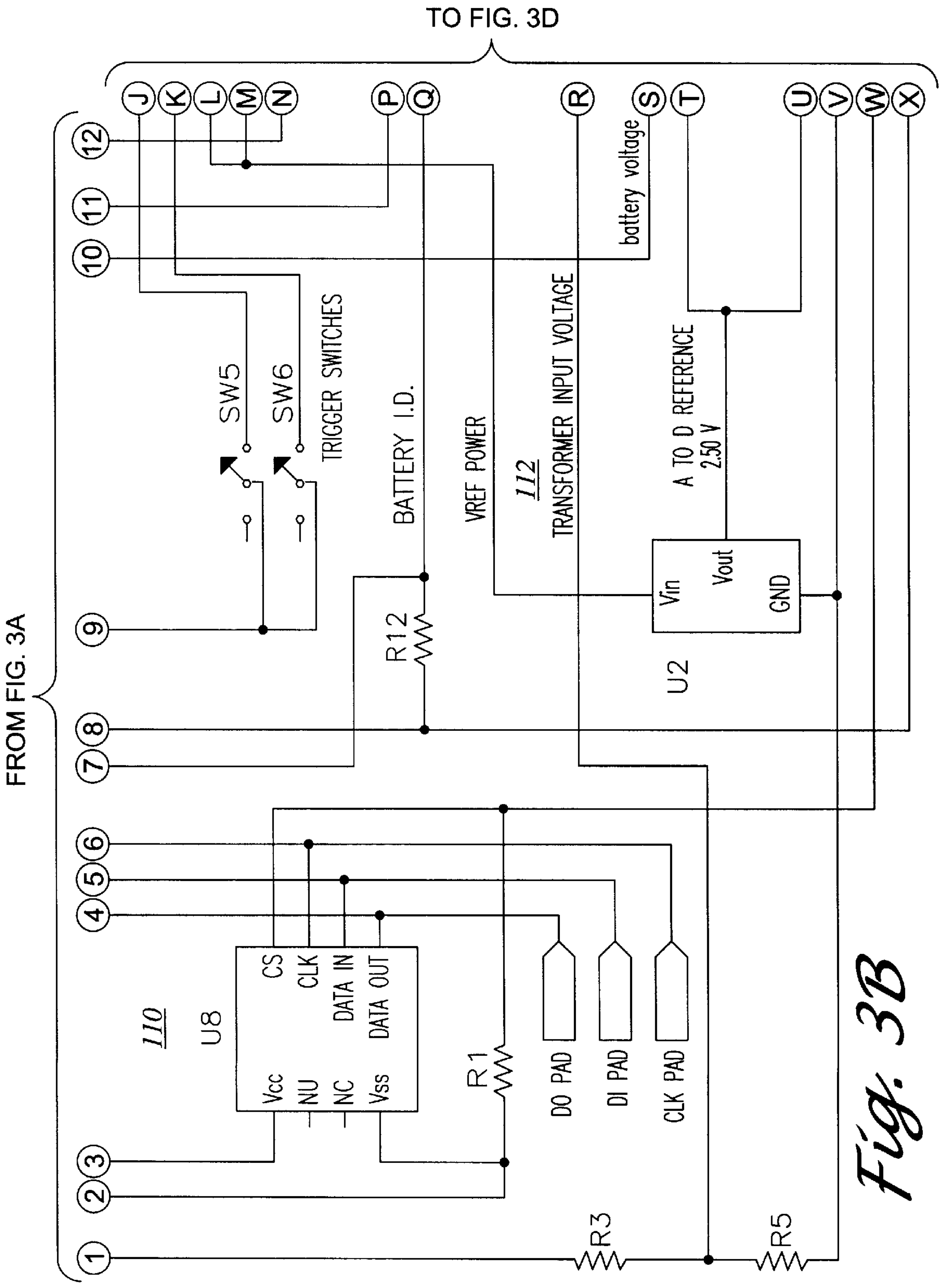
Figure 3C:
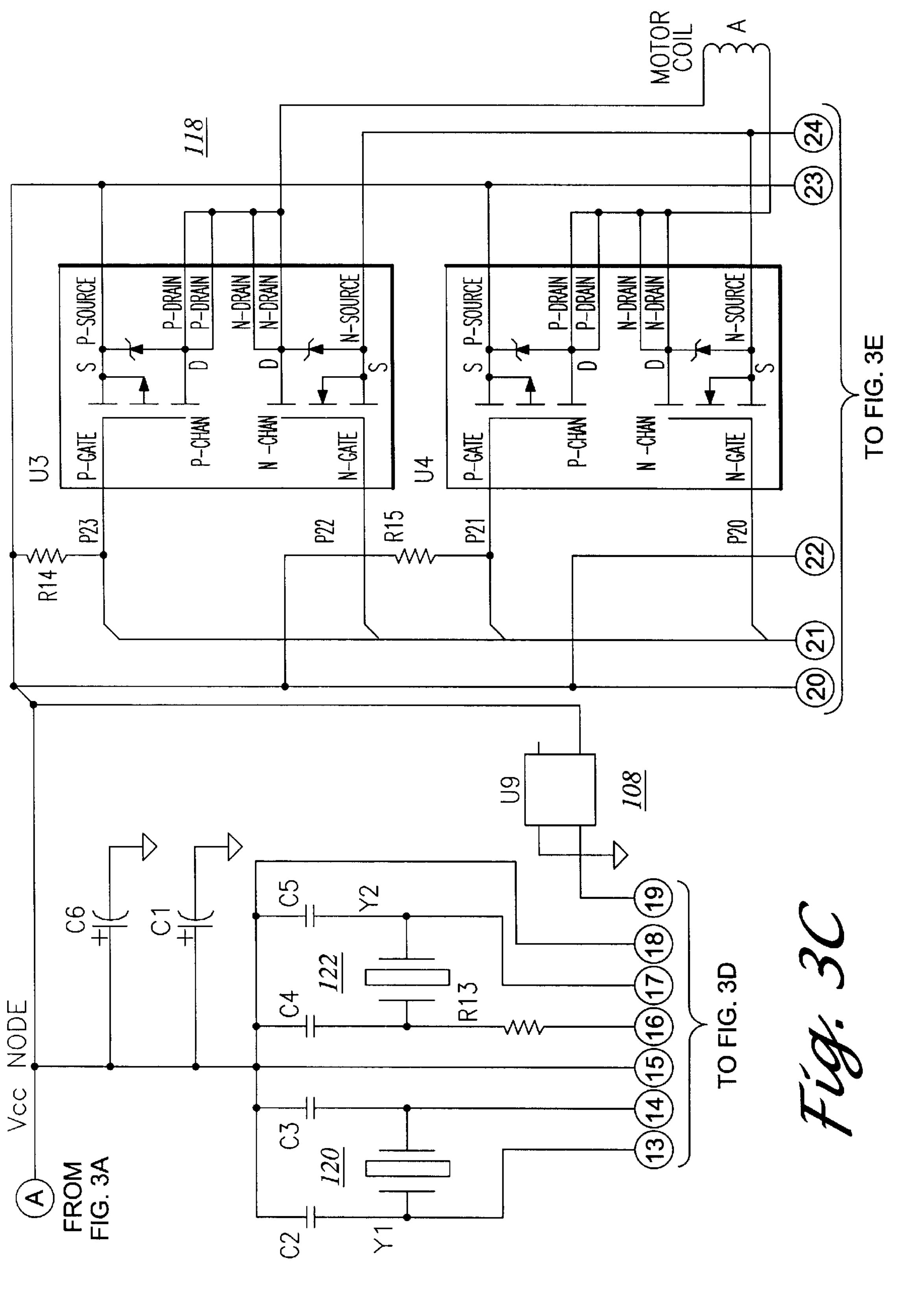
Figure 3E:
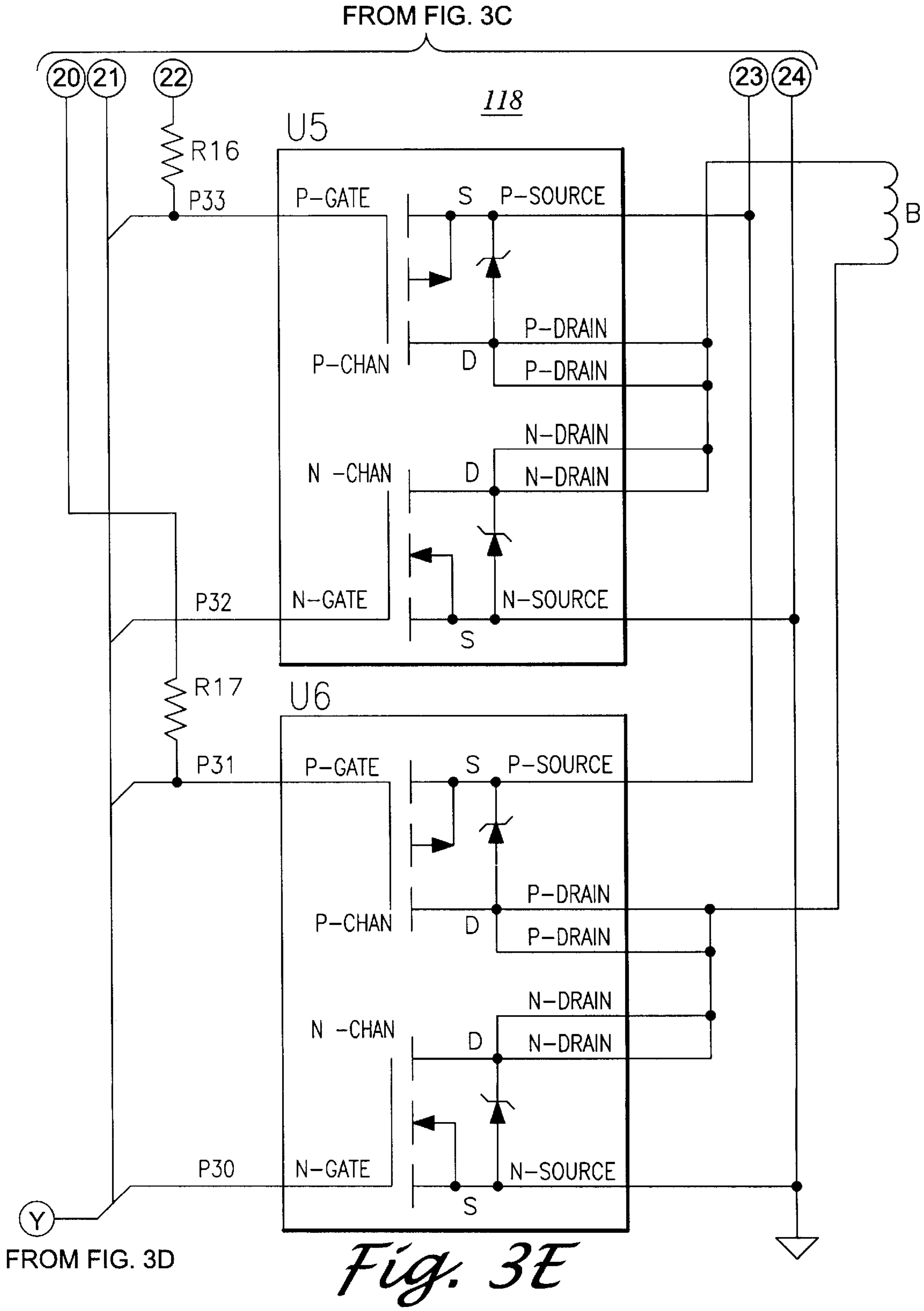

As illustrated in FIGS. 3A, 3B, 3C, 3D and 3E, which combine to form FIG. 3, the electronic control circuit for the pipette of the present invention is depicted generally by the number 100 and basically comprises the microprocessor 38 (FIG. 3D) with internal circuitry 102 and external support circuitry including the wall power supply (external power source) circuitry 104 (FIG. 3A), battery power management and recharge circuitry 106 (FIGS. 3A, 3B and 3D) external reset circuitry 108 (FIG. 3C), EEPROM memory circuitry 110 (FIG. 3B), reference voltage circuitry 112 (FIG. 3B), external analog to digital (A to D) converter circuits 114 (FIGS. 3A, 3B and 3D), the LCD display 22 (FIG. 3D), bias circuitry 116 (FIG. 3D) and motor drive circuitry 118 (FIGS. 3C and 3E).

As previously indicated, the control circuitry 110 derives power from the battery 36 or an external power source 37 (FIG. 22) to power the microprocessor 38 which in turn controls operation of the display 22 and stepper motor 40 included in the linear actuator 41. Such control is in response to user actuation of the control key 26*a*, 26*b*; 28*a*, 28*b* (indicated in FIG. 3A as "Function Switches SW1, SW2, SW3 and SW4 respectively) and trigger switches 30 and 32 (indicated as SW5 and SW6 respectively in FIG. 3B), the function switches and trigger switches defining a keyboard 120 for the pipette 10 as subsequently described. Such microprocessor control of the display 22 and stepper motor 40 is also based upon tables of data programmed into and stored in memory within the microprocessor 38 such as the data depicted in FIGS. 4*b*-1,4*b*-2, 5, 6, 7*a* –7*f*, 8 and 19 and/or tables of data programmed into and stored in the EEPROM memory circuitry 116 depicted in FIG. 3D such as the data depicted in FIGS. 9 and 9*a* –9*f*. The operation of the microprocessor 38 in various pipette modes of operation is also programmed by software routines and subroutines depicted in FIGS. 10A–16B and 21*a*–*c*.

In these regards, the stepper motor 40 includes the current receiving windings A and B depicted in FIGS. 3C and 3E respectively for receiving drive signals from the microprocessor 38 and the motor drive circuitry 118 for electromagnetically driving a rotor of the motor to impart the previously described lengthwise movements to a plunger comprising the piston 90 in the cylinder 92 (FIG. 2) to aspirate and dispense fluid into and from the pipette tip 60 (FIG. 1). Further in these regards, and as will be described in greater detail with respect to FIGS. 4, 4*a*, 4*b*-1, 4*b*-2, 5–7*f*, and 17–21*c*, under control of the software programs within the microprocessor 38, lengthwise movement of the plunger 38 is at user controlled speeds through a series of microsteps. Specifically, the microprocessor 38 is programmed to generate the drive signals for the stepper motor which are pulse width modulated (PWM) signals having duty cycles corresponding to different microstep positions for the stepper motor derived by the microprocessor from a first table of data stored in the internal memory included in the microprocessor and having a repetition pattern derived by the microprocessor from a second table of data stored in the memory to determine the speed of motor movement.

In this regard, the microprocessor 38 is further programmed so that the PWM drive signals have phases which do not overlap whereby there is no overlap of the PWM drive signals applied to the current receiving windings A and B of the stepper motor 40.

Microprocessor

By way of example only, the microprocessor 38 may comprise a single chip microcontroller or microprocessor, such as the μPD753036 4 Bit Single Chip Microcontroller manufactured by NEC. Electronics Inc., Santa Clara, Calif. designated as U1 in FIG. 3D. The processor can operate from voltages as low as 1.8 V and as high as 5.5V and may be characterized by an internal ROM or PROM of 16,384 by 8 bits, an internal RAM of 768 by 4 bits, a standby current of less than 100 μA and an operating current at 6.00 Mhz of less than 4.0 ma. Also the microprocessor has a large number of Input/Output pins which are arranged into groups called ports.

Many of the functions of the electronic pipette 10 are handled by the on-board or internal circuitry 102 of the microprocessor 38. The most important internal circuits with respect to the electronic pipette 10 operation are discussed below.

Internal Circuits and Ports

The microprocessor 38 is equipped with an internal reset circuit. When the external reset circuit 108 (FIG. 3C) forces the RESET pin of the microprocessor low, or when an internal watchdog timer times out, a reset sequence is started. This reset sequence triggers a delay. At 6.00 MHz the delay is 21.8 msec. This delay begins when the external reset line is released and is brought up to Vcc.

The microprocessor 38 also has two conventional oscillator circuits 120 and 122 termed "Main System Clock" and "Subsystem Clock". The "Main System Clock" 120 is a fast oscillator circuit which operates in the megahertz frequency range. The oscillator 120 can be stopped under microprocessor control to conserve power. Upon power-up or when the main clock is restarted after it has been stopped by the processor, there is a delay of 5.46 msec for the oscillator 120 before the frequency is guaranteed to be stable and the processor begins to actually execute instructions. Instruction execution times are dependent on the division ratio chosen by the program for the microprocessor, and can range from 0.67 μsec to 10.7 μsec.

"Subsystem Clock" 122 is a slow speed clock intended to be used for power conservation and time keeping purposes. The crystal for this clock is 32,768 Hz. This clock is always active but uses very little current (4 μA).

In addition to the crystal itself, two small capacitors C2, C3 and C4, C5 (22 pF) are necessary for operation of each oscillator. Furthermore, a 300 K resistor R13 is necessary for operation of the Subsystem Clock 122.

Several of the ports have characteristics important to the electronic pipette 10. Ports 6 (P60–P63) and 7 (P70–P73) contain software controllable pull-up resistors which are used to self-bias the circuits for the control keys and trigger switches 26*a, b;* 28*a, b;* 30 and 32 (SW1–SW6). Activation of which shorts the associated microprocessor input to ground. In addition, pins 60 and 61 of Port 6 power the voltage reference as hereinafter described.

Port 5 (P50–P53) is an open drain output which is able to withstand voltages up to 13 V. This is helpful in dealing with the presence of a voltage which are greater than Vcc and as will be described hereinafter greatly simplifies controlling a P-channel MOSFET switch in a conventional Dual Complementary MOSFET designated as U7 which regulates the battery charging power.

Port S (S12–S31) provides multiple drive levels for LCD segments of the display 22.

Port AN (AN0–AN7) is an analog input to an internal Analog to Digital (A to D) converter included in the microprocessor. The A to D converter preferably is an 8 bit successive approximation converter equipped with an internal sample and hold circuit. At 6.00 Mhz each conversion will take at least 28 μsec. Conversions are made with respect to a reference voltage appearing on port AVref. This reference voltage is supplied by a low-dropout micropower 3-terminal voltage reference fixed at 2.5 Volts and designated as U2. U2 may be the MAX 6125 available from Maxim Integrated Products.

The internal A to D converter serves two functions, measuring the Vcc Node voltage and measuring the Wall Node voltage (FIG. 3A). In both cases the voltage input to the internal A to D converter is reduced to 0.41 times the actual value by the action of the voltage dividers formed by R3–R5 and R4–R6 in the external A to D circuitry 114. At a clock frequency of 6.00 MHz a conversion will take 28 μsec. Because the input to the internal A to D converter is sampled and held, the signal does not have to be stable for the entire conversion period. However, the AVref input must be stable for the entire conversion. C8 decouple spikes generated by the display 22 the LCD bias circuitry 116.

SPI (Serial) (P00–P03) port is used to program and read a Serial EEPROM memory designated as U8. It can also serve as a communications port to the microcontroller 38 if the "DO Pad", "DI PAD", and "CLK PAD" inputs on the electronic pipette printed circuit board are utilized. This serial link provides high speed bi-directional communication to and from the processor.

The LCD (S12–S31 and COM0–COM3) port of the microprocessor 38 is a semi-autonomous peripheral circuit which transfers segment data stored in memory to the LCD segments of the display 22. It automatically outputs the multiple voltages necessary to control a multiplexed display. There are 20 segment lines and 4 common lines available. Through multiplexing, the four common lines (COM0–COM3) are able to control up to 80 individual LCD segments. All of the actual multiplexing circuitry is contained in the microprocessor 38. To activate an LCD segment on a display, a bit is written in memory. After choosing an operating mode, the microprocessor handles all of the actual display functions in a conventional manner.

Bias voltages for the LCD display are input to a VLC port (VLC0–VLC2) by dividing down the 2.5 reference voltage which is used for the internal A to D converter.

The Voltage Reference U2 used for the internal A to D converter Vref, is also used as the source of the bias voltage for the LCD display. VLC 0 receives the full 2.50 volt reference signal. This level is further divided down by R11 and R10 to provide a second voltage level, 1.25 V, for VLC1 and VLC2.

Display

The display 22 preferably is a non-backlit, liquid crystal type of display including a total of 57 annunciators, or individually switchable segments.

The annunciators describe the state of the unit at any given time as follows:

"8.8.8.8" Volume digits with individually addressable segments which indicate the volume. These are large and prominent relative to the other annunciators.

Also displays "FULL" when battery is fully charged as well as other messages.

"μl " Indicate the units of volume and are located immediately to the right of the forth volume display digit.

"88 X" Aliquot Number. Two digits of individually addressable segments followed by an "X". Used to indicate the number of aliquots which can be dispensed when in the Multi-dispense mode. Located to the left of or above the Volume digits so the display might read for example: 10×20 μL These digits are also used to indicate the cycle count.

"PICKUP" Indicates that the unit is at its "Home" position and ready to aspirate some liquid, or is in the process of doing so.

"DISPENSE" Indicates that the unit is ready to dispense some liquid, or is in the process of doing so.

"PIPET" Indicates the pipette is in the (default) pipet mode

"MULTI" Located to the left of "dispense", this annunciator indicates that the unit is in multi-dispense mode. As a consequence, when ready to dispense the display reads "Multi dispense".

"& MIX" To the right of "Pipet" this annunciator indicates that the unit has the "Mix" option activated.

"MANUAL" Indicates that the unit is in the Manual mode of operation.

"RESET" Flashes in the Multi-Dispense mode when the unit has finished dispensing all its aliquots and it is required that the user discard or return the residual volume. The reset annunciator is lit (steady) while a reset function (i.e. dispense, blow-out, and return to home position) is performed.

"SPEED" Indicates current speed setting when the Speed option is selected.

"'low bat' Icon" Indicates a low battery charge level. Appears when the battery needs charging "Lightning Bolt" Icon Indicates that the unit is connected to a charge source. In addition, the indicator flashes when the pipette battery is receiving a charge.

External Reset Circuitry

Reset to the microcontroller 38 is controlled by the reset circuitry 108 illustrated in FIG. 3C and may comprise a MAX821RUS (U9) available from Maxim Integrated Products. When power is first applied to the unit U9, the circuit holds reset low (to ground) for 100 msec after power has reached a 2.63 V threshold voltage. It will also take reset low (to ground) if the power dips below 2.63 V for a given length of time. The time required to initiate reset depends on both the amplitude of the dip below the 2.63 V level, and on how long it stays below that level. Supply current is 2.5 μA. Reset is guaranteed to be held low for voltages as low as 1.0V.

EEPROM Memory Circuitry 110

The EEPROM memory designated as U8 and illustrated in FIG. 3B is a non-volatile electrically erasable, programmable memory such as 93LC56ASN. It stores 256 words of 8 bits each, has self timed write and erase cycles and can operate down to 2.0 V. Further, it can undergo 1,000,000 erase—write cycles. Current during operation is 1 Ma while current in standby is 5 μA.

Data is transferred to and from the EEPROM memory 110 via the 3 wire SPI serial link. In addition a CS pin is provided which is active HIGH.

During normal operation of the electronic pipette, when programming of the EEPROM is not required, U8 is not powered. This is accomplished by taking the GND terminal, pin Vss, to the Vcc Node voltage. During normal operation when information is not being written to or read from U8, the U7 N channel MOSFET is not enabled, port bit P81 of the microprocessor being low. This action denies a power return path for U8. Also note that lines P03, P02 and P01 of the SPI port must also be held HIGH in order to bring all of the lines of U8 to the same voltage level.

Port bit P80 should also be held high during normal operation. This can be accomplished by one of three methods. The most preferable is to put the line in a tristate (floating) condition and let R1 of the EEPROM circuitry 110 pull the line up to the Vcc node voltage. Alternatively, the port bit P80 can be made an input and be passively pulled up by the actions of a software enabled internal pull-up resistor. Or finally, the line P80 can be actively driven to the high state, although this is the least desirable of the three options.

When it becomes necessary to read or write the EEPROM, port bit P81 is brought high. This action turns on the N-Channel MOSFET in U7 and provides a path to GND for the Vss pin on U8. If P80 is in a tristate condition, then this action will also pull the CS line low through the action of R1. If P80 is actively driven then it should be set to the low state immediately after or immediately before the Vss pin is taken to GND. If P80 is passively pulled up by the action of the internal pull-up resistor, then it should immediately be made an output, and driven low.

Pin CS of U8 is an active high input and as long as it is high, the chip is enabled. Once the chip U8 is powered up and in a stable idle state the CS, Data In, Data Out, and Clock lines can be used in a normal manner to read from and write to the chip. These lines follow the industry standard SPI protocol for data transmission.

The ideal sequence for powering down U8 is to put P80 in a tristate condition. It should be held in a low state by the action of R1. P02 and P01 should be set high. Lastly, P81 should be taken actively low. As the drain of the N-Channel MOSFET in U7 rises in voltage, R1 should pull the CS line up with the rest of the lines on the chip. In this way, the CS line never rises faster than the other lines and the EEPROM will therefore never be enabled.

The following parameters are stored into the EEPROM memory U8 through a connection to a personal computer or workstation via a battery connector J3 in FIG. 3A in a conventional manner:

a. Version # of EEPROM data set b. Full scale volume range of pipette (2, 10, 20, 100, 200, 1000, & 2000 μL)

c. Offset table (same table to be used in all modes.) Uses about 230 bytes of EEPROM memory. Each byte corresponds to a volume setting of the pipette and allows for ±254 microsteps of offset at each volume.

d. Multi-dispense residual value.

e. Multi-dispense overshoot value.

f. Multi-dispense overshoot pause duration.

g. Speed limit for Pipet and Multi-dispense modes.

h. Manual mode hysteresis (for backlash) to be added to motor move when changing directions of travel.

i. Trigger Double Click maximum delay time j. Long key press minimum time. This parameter is used to determine whether the Mode or Reset key has been pressed long enough for a "long press."

k. Default speed settings (set upon power up) for each mode.

Motor Drive Circuitry 118

The motor drive consists of four MMDF2C01HD Dual Complementary MOSFETs (U3–U6) in SOIC 8 pin packages. Each package contains both a P channel MOSFET and an N channel MOSFET. Each FET can handle 2 Amps at up to 12 V. Power dissipation for the package is 2 Watts. The drain to source resistance (Rds) for the N Channel is 0.045 ohms and for the P channel it is 0.18 ohms.

The MOSFETs are arranged in a classic H-Bridge configuration. Each FET is individually controlled by the microprocessor.

In order to prevent accidental conduction during reset, power up, or brown out conditions, each P channel FET is pulled up to the Vcc node voltage by a 51K pull-up resistor.

All 8 bits from ports 2 (P20–P23) and 3 (P30–P33) of the microprocessor 38 connect directly to the gates of complimentary FET pairs U3–U6. U3–U6 form two full H bridge drives for driving the two windings A and B of the stepper motor as shown in FIGS. 3C and 3E. The circuit is a simple, classical circuit with no current sensing or feedback from the motor. Such a simple circuit is usually associated with normal full step or half step drive to a stepper motor. It is not associated with micro stepping because it lacks the traditional motor winding current sense with feedback to a comparitor and associated circuitry for forming a pulse width modulation (PWM) drive to force the motor current to track control signals from a microstep controller. In a traditional microstep drive circuit the frequency or period of the PWM signal is asynchronous from the motor stepping rate from the microstep controller.

Microstep control of a stepper motor is desirable over simple full or half stepping because it gives finer control of the motor positioning as well as allows the motor to run more efficiently at high speeds (i.e.; more power output from the motor for a given power input to the motor.) Both of these characteristics are important in a battery powered electronic pipette.

Figure 4:
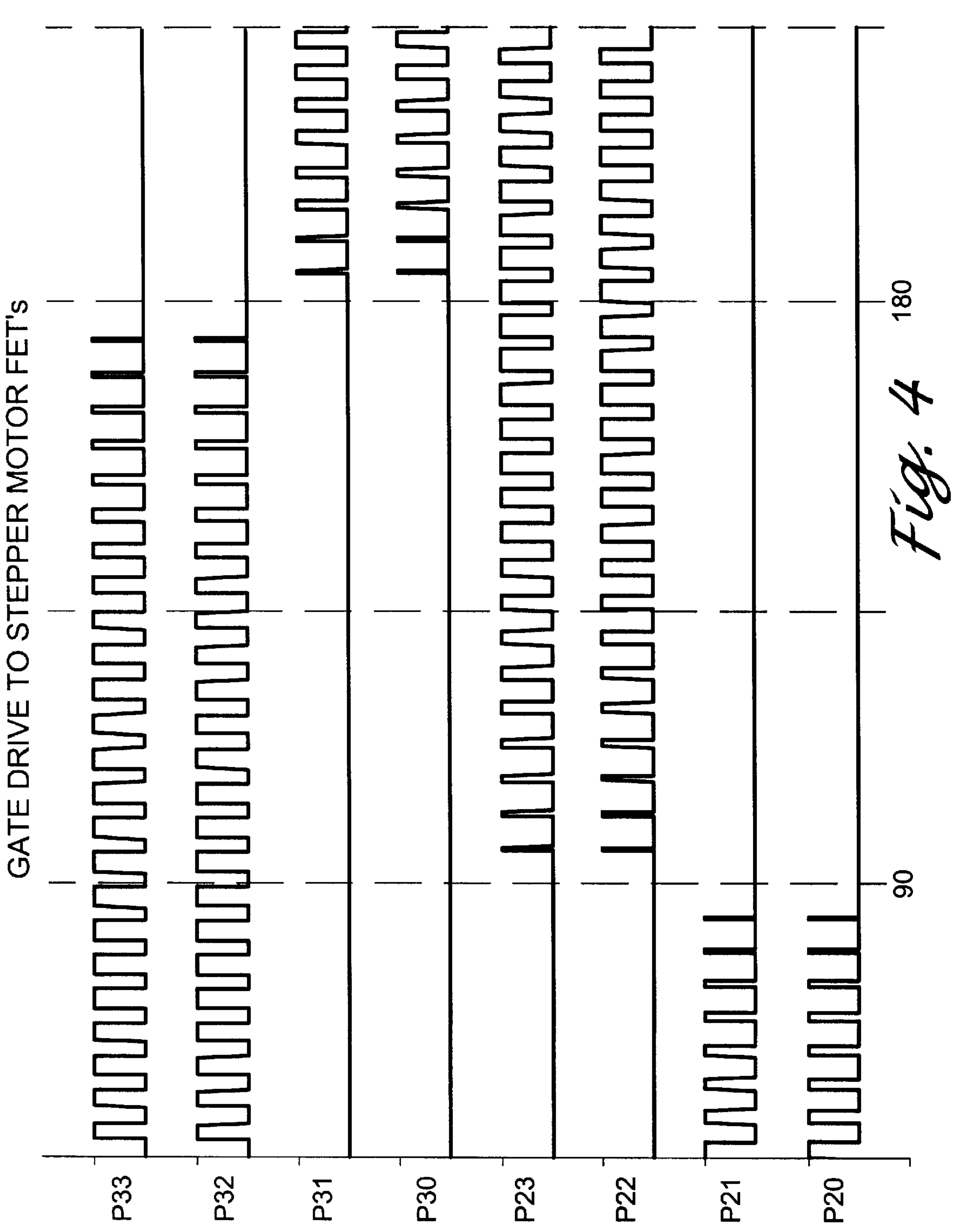
FIG. 4 is timing diagram of the PWM drive signals applied to the gate of the field effect transistors ("FETs") driving the coils of the stepper motor of the preferred form of the electronic pipette of the present invention.
Figure 4A:
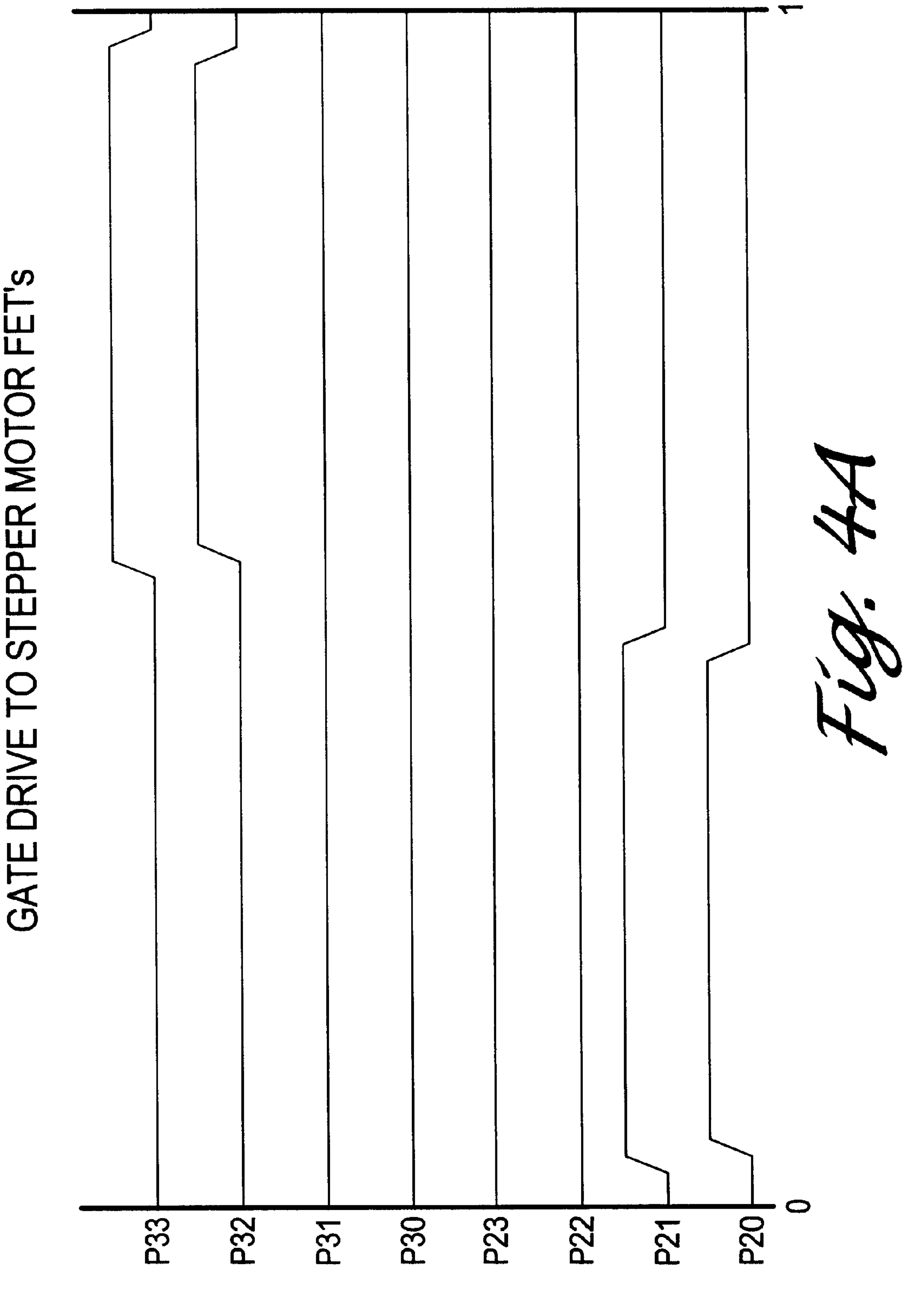
FIG. 4*a* is a timing diagram illustrating one pulse width modulation period of the motor drive signals to the control gates of two motor H-bridges in the drive circuitry for the motor.

Microstep control of the motor is achieved with the simple circuit shown in FIG. 3 if the PWM period is synchronized with the stepping rate. This is accomplished by having the microcontroller 38 generate the PWM signals to the two H bridges, and have each microstep correspond to an integer number of PWM periods. At the highest motor speed each PWM period would correspond to a new microstep. FIG. 4 illustrates a timing chart for the H bridge gate drive over a 17 microstep period of time running at the maximum speed (i.e.; a 1:1 correspondence between PWM period and microstep.) Each PWM period has a different duty cycle corresponding to the desired drive current to a motor winding for a given microstep.

The microprocessor 38 divides a full step into 16 microsteps. Therefore, a full 360 degrees of electrical rotation (i.e.; 4 full steps) contains 64 microsteps. FIG. 4 shows the gate drive signals going from an electrical position of 45 degrees to 135 degrees at full speed. The duty cycles to each motor winding correspond to a sin and cosine function that are advanced in 5.625 degree increments. Period 1 corresponds to 45 degrees of electrical rotation where both motor windings receive an equal current. Winding A, cosine function, is driven from Port 2 (P20 through P23) and winding B, sin function, is driven from Port 3 (P30 through P33.) Both Ports have an equal duty cycle at 45 and 135 degrees. The seventeenth period (microstep) corresponds to an electrical position of 135 degrees. The PWM period is equal to approximately 188 microseconds which corresponds to a PWM drive frequency of approximately 5.32 kHz to each motor winding. At full speed, where one PWM period corresponds to one microstep, the stepping rate is 332 full steps per second (5.32 kHz divided by 16 periods per full step.)

The P channel FET's are usually keep on by keeping the gate drive low (P21, P23, P31, and P33.) The only time a P channel FET is turned off (gate goes high) is when the corresponding N channel FET is turned on (gate is driven high by P20, P22, P30, and P32.) The FET's used are low threshold, high speed FET's so a small guard band is added to each switching edge of the P channel FET's to guarantee that they are off before a corresponding N channel FET is turned on. This avoids current spikes from flowing through a complimentary FET pair during switching transitions. The guard bands can easily be seen in FIG. 4*a* which illustrates only the first period of FIG. 4. At the beginning of period 1, P21 goes high first turning the P channel FET off. Approximately one machine cycle later on the microcontroller (2.67 microseconds) P20 goes high turning the N channel FET on. About 77 microseconds later P20 goes low turning the N channel FET off 2.7 microseconds before P21 turns the P channel FET back on. The other side of winding A is keep connected to the supply rail by the P channel FET driven by P23. During the remainder of period 1 both sides of winding A are keep tied to the supply rail allowing the current in the winding to circulate with minimum external losses.

Winding B is driven by Port 3 in a similar fashion to winding A except that the "on" portion is at the end of the first period rather than at the beginning as would be expected from prior art PWM circuits. The advantage of driving the two windings at different ends of the PWM period is that it is possible to avoid having both windings on at the same time provided that the peak PWM duty cycle of the sin function doesn't exceed approximately 70% so that at the 45 degree point the sine and cosine PWM duty cycles do not exceed 50% each. Allowing for the P channel guard bands and microcontroller processing times a practical peak duty cycle is closer to 60% (rather than 70%) resulting in a duty cycle of approximately 42% at the 45 degree points for each winding. A PWM peak duty cycle less than 60% guarantees that both winding are never on at the same time. The advantage of not having both windings on at the same time is that it significantly reduces current variations (ripple) from the supply thereby reducing supply voltage ripple. The reduced current ripple allows for the use of a smaller value bypass capacitor on the supply rail (C1 and C6) to keep the voltage ripple within acceptable limits. Also, an even more serious restraint is caused by the fact that the wall power supply 37 (FIG. 22) used for powering the unit and charging the battery has a hard, fast current limit action at the battery 2.6 C rate (1.04 Amperes.) If the motor were to try and draw more than 1.04 amperes from the wall supply the supply voltage will drop quickly as only the bypass capacitors (C1 and C6) will supply the current in excess of the current limit point. This potential problem is easily avoided by not allowing both windings to be on at the same time.

It is an important feature of the preferred embodiment of the present invention that the motor can be run at slower speeds by having a PWM period repeat the same duty cycle that is by microcontroller control of the duty cycle of successive drive pulses. If every microstep duty cycle were to be used for two PWM periods then the motor speed would be one-half of the maximum speed (i.e.; a 2:1 correspondence between PWM period and microstep.) If every step were to be used for three PWM periods (3:1 ratio) then the motor speed would be one-third the full speed and so on. For finer speed control not every microstep needs to be repeated the same amount. For example, if every 16th microstep is repeated once and the other 15 are not repeated then the resulting speed would be 94.12% of the maximum speed (16/17); likewise, if every eighth microstep is repeated once the resulting speed would be 88.89% of full speed (8/9). Speeds closer to the maximum speed can also be attained by repeating a microstep less often than once every sixteenth step. The ten different pipette speeds basically use an appropriate repeat pattern to give the motor speed desired. The table of FIG. 5 illustrates the feature of the present invention with a corresponding table of data being stored in microprocessor memory.

Figure 8:
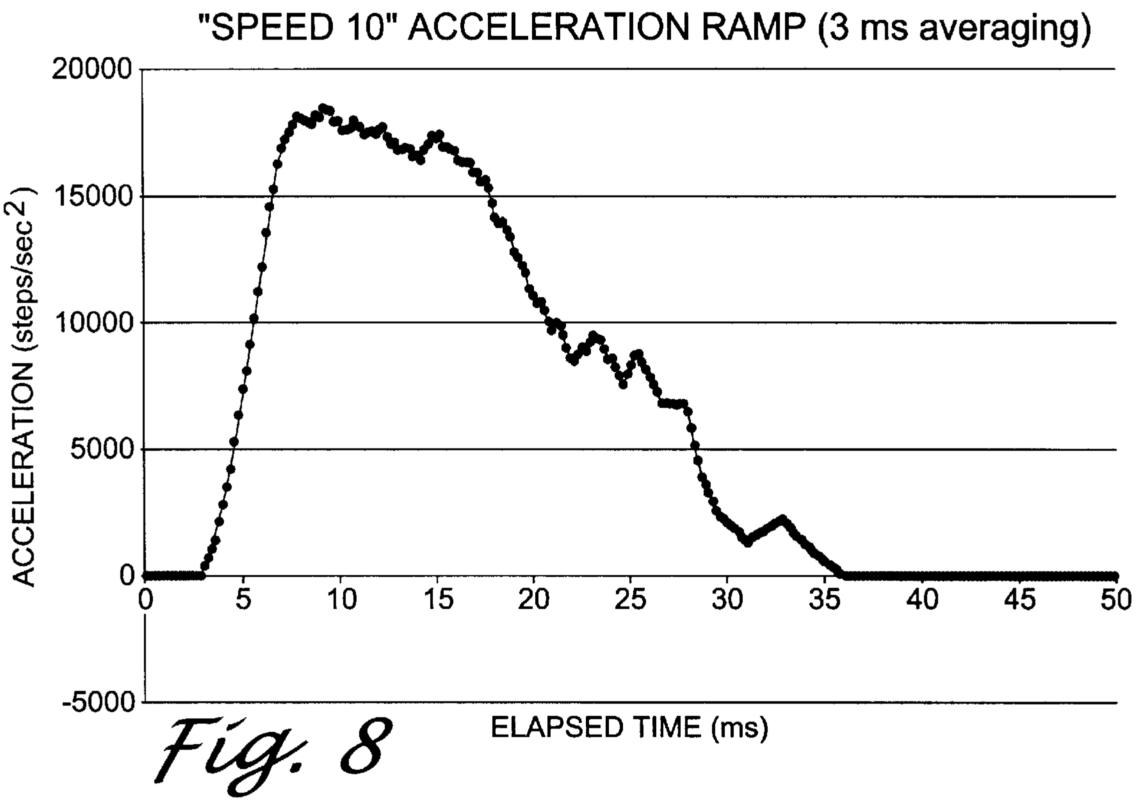
FIG. 8 is a graph illustrating motor acceleration as a function of time as the pipette ramps from zero to speed 10.
Figure 6:
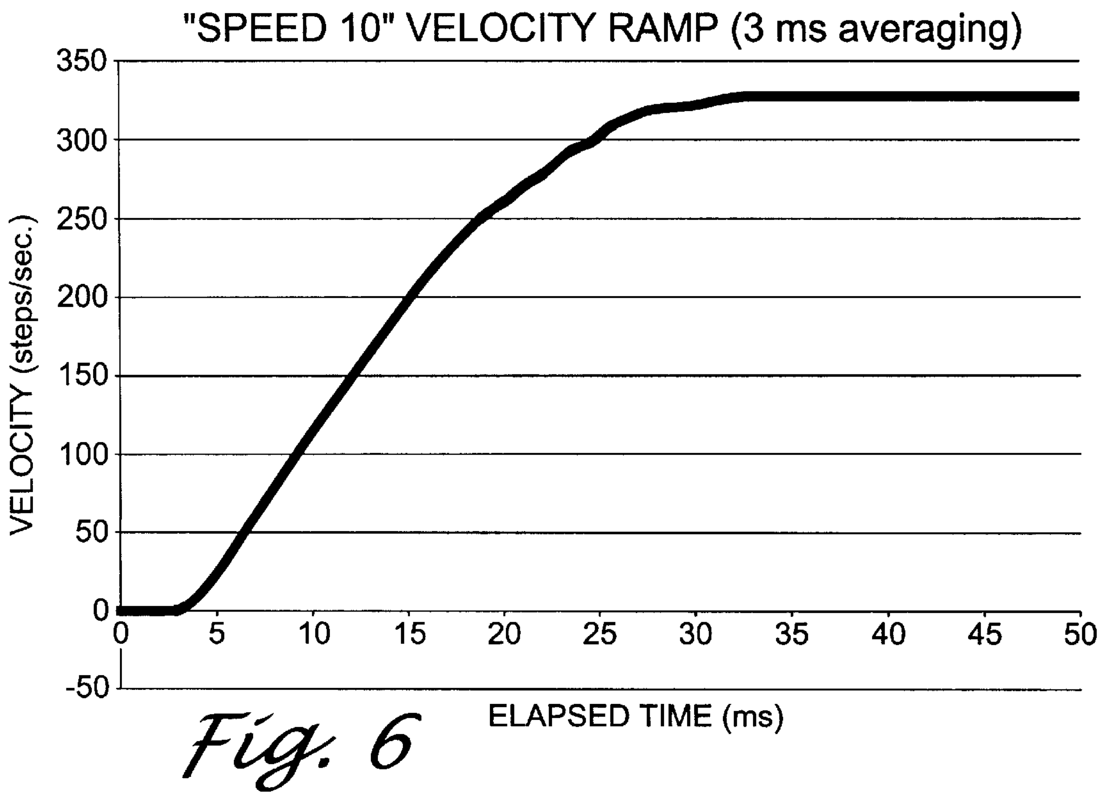
FIG. 6 is a graph illustrating motor velocity as a function of time as the pipette ramps from zero to speed 10.
Figure 9:
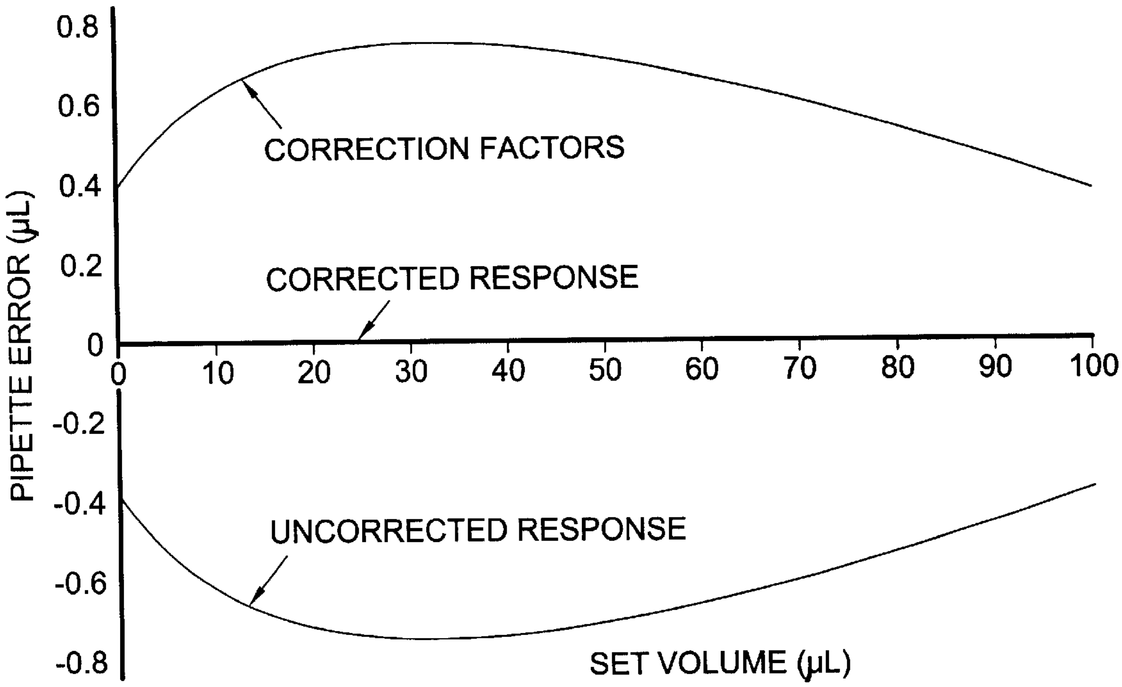
FIG. 9 is a graph illustrating a typical pipette response before and after it is corrected by application of the correction factors for air pressure and liquid surface tension effects and the like stored in memory and microprocessor selected in response to each different volume setting for the pipette.

When accelerating from a stop to the specified pipetting speed an acceleration table, similar to that shown in FIGS. 7_a_–7_b_, is used that defines the pattern in which the microstep duty cycles are repeated in a PWM period such that the speed asymptotically approaches the specified running speed. FIG. 6 and FIG. 8 are graphs which depict that data. The acceleration ramp (which is also run in reverse to decelerate) defines and limits the acceleration. The acceleration is reduced as the motor speed approaches its maximum speed by making successively finer speed changes. A corresponding table of data is stored in the microprocessor to allow the microcontroller to provide such control over the operation of the stepper motor.

The resulting motor current from the simplified microstep control circuit and method outlined above is not independent of supply voltage as it is in a traditional, prior art PWM drive circuit. Rather it is supply voltage dependent. The battery voltage from the Li-ion battery 36 used in the present invention varies from 3.2 volts, when the battery is nearly depleted, to 4.1 volts, when it is charged to full capacity. If the same amplitude (i.e.; peak duty cycle) sin/cosine tables are used through out this voltage range, the power to the motor will vary by the square of the voltage ratio over the voltage range (i.e.; 64% more power at 4.1 volts than at 3.2 volts.) When the pipette is used while powered from a wall supply, the supply voltage is typically 5.3 volts causing early three times as much power to be driven to the motor compared to 3.2 volts if the same tables are used. The microcontroller used has the ability to measure supply voltage with the microprocessor analog to digital converter as previously described. The above disadvantage can be greatly reduced by dividing the supply voltage into different ranges and using a different amplitude sin/cosine table for each range; this makes it possible to normalize the motor current for the different ranges. The microprocessor of the present invention is programmed to break the supply voltage into four ranges and has four different amplitude sin/cosine tables that normalize the motor current between the different ranges. This is depicted in the tables of FIG. 4_b_-1 and FIG. 4_b_-2 and has the effect of reducing the motor current and hence power variations to a much smaller value over the total supply voltage range. The ranges used are: 3.200 to 3.476, 3.476 to 3.775, 3.775 to 4.1, and 5.0 to 5.6. For the battery voltage range this reduces the power variation from 64%, if just one range were to be used, to less than 18% with the three ranges used, the fourth range being used for wall current. Using the different power ranges as a function of supply voltage has the effect of reducing unnecessary battery drain and thereby increases battery life significantly. It also eliminates the possibility of exceeding the motor power rating when running off of a wall supply.

Pipette Modes of Operation

Figure 12:
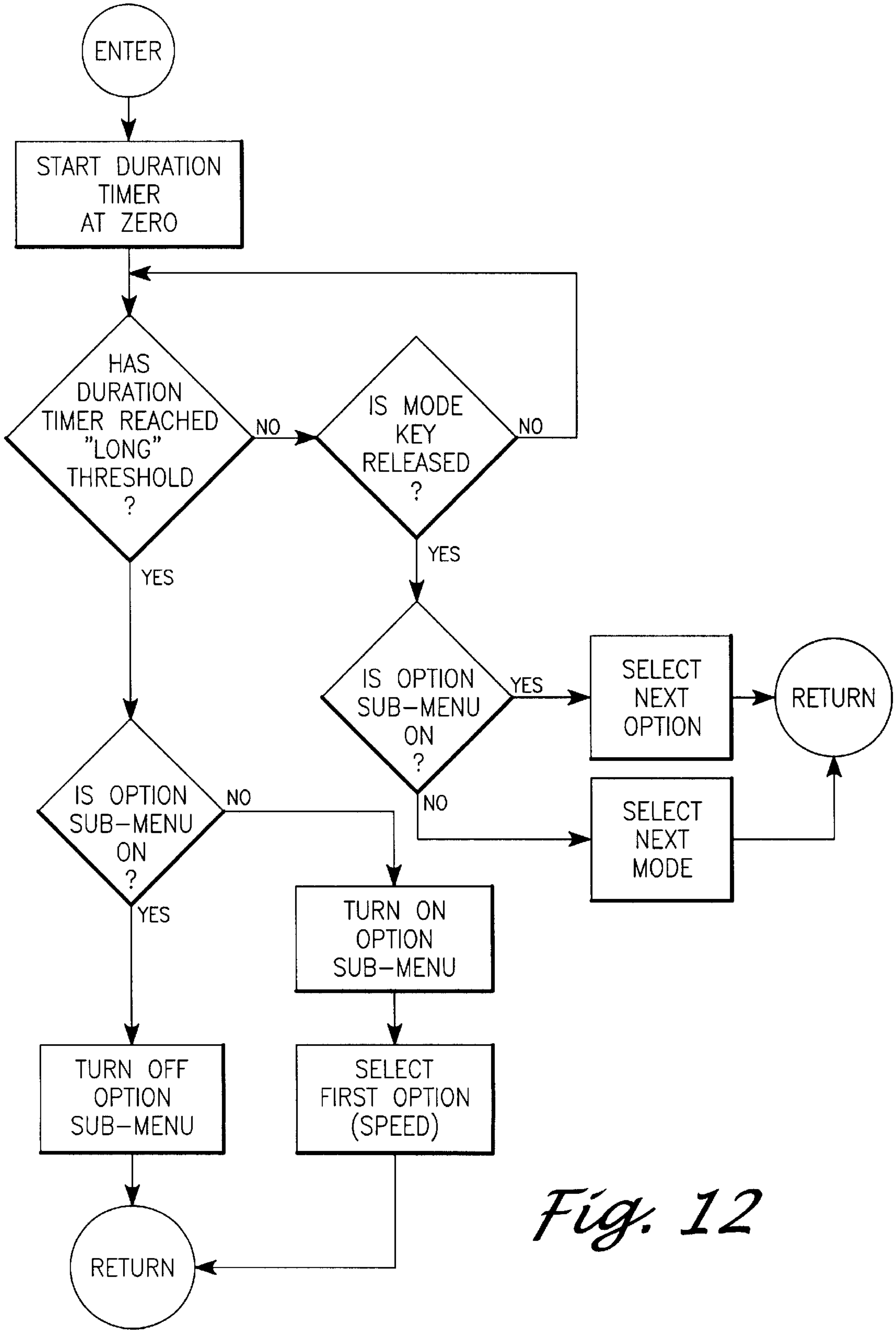
FIG. 12 is a software flow diagram illustrating the mode key routine included in the operation of the pipette in the manual, pipette and multi modes of operation of the pipette of the present invention.
Figure 13:
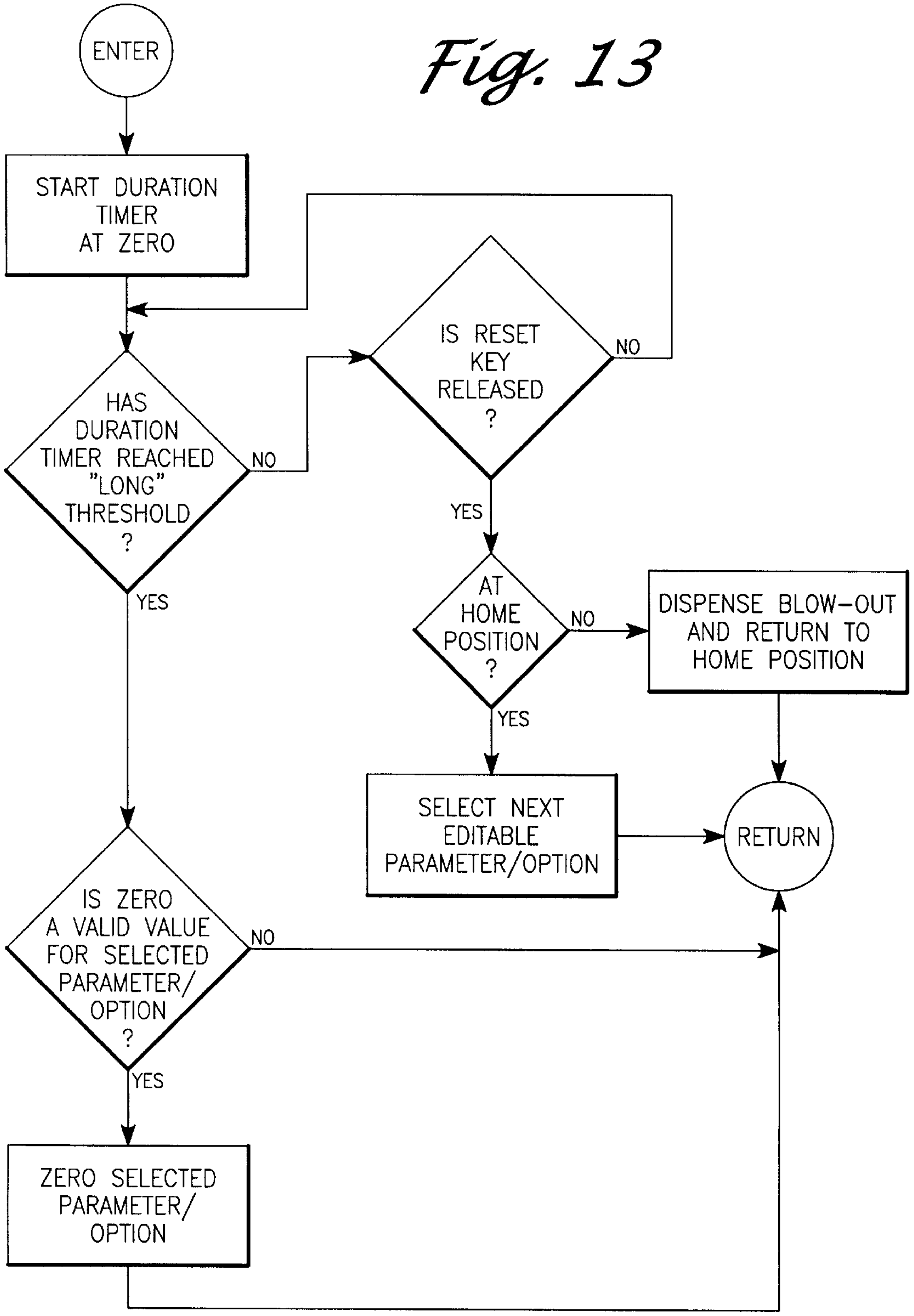
FIG. 13 is a software flow diagram illustrating the reset key routine included in the operation of the pipette in the manual, pipette and multi modes of operation of the pipette of the present invention.

In the illustrated embodiment of the present invention, and as previously described, control key 26 comprises a "mode" control key in a keyboard for the pipette. The "Mode" key toggles or rotates through three regular pipette modes of operation. The software routine of the microprocessor 38 for the Mode key is depicted in FIG. 12 ("Mode Key Routine"). As illustrated, entry into the Mode Key Routine starts an internal timer within the microprocessor. The timer has a preset duration stored in the EEPROM memory 110. If the mode key is pressed for a period of time equal to or greater than the preset duration, a "long press" of the Reset key has occurred which activates an Options menu for any given mode and further presses of the Mode key rotates through the available options for the given mode; Another long press will deactivate the Options menu allowing further presses to select the modes.

Modes:

1. Pipet
2. Manual
3. Multi-Dispense

Figure 14:
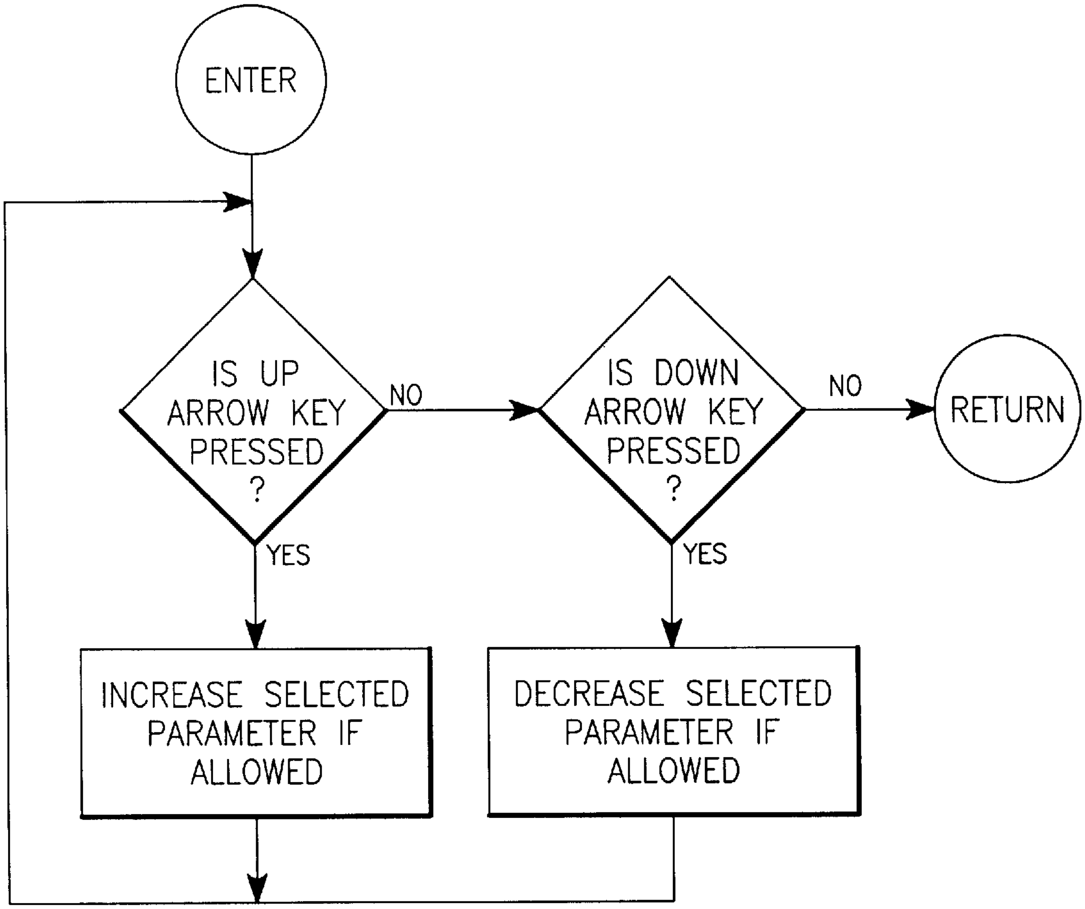
FIG. 14 is a software flow diagram illustrating the arrow key routine included in the operation of the pipette in the manual, pipette and multi modes of operation of the pipette of the present invention.

The up, and down "arrow" keys 28_a_ and 28_b_ are used to edit or change any selected parameter such as volume or speed settings according to the microprocessor software routine depicted in FIG. 14.

The fourth key 26_b_, "Reset" has two primary functions depending whether the unit is at its Home position or not. If the pipette is not at Home (i.e.; is ready to dispense or has finished dispensing all of its aliquots in the Multi-Dispense mode) pressing the Reset key will cause the pipette to dispense, do a blow-out and return to Home position according to the microprocessor software routine depicted in FIG. 13. When the device is at Home, ready for a pickup, the Reset key 26_b_ is used to toggle or rotate through the various parameters that can be edited in the selected mode. For example; in the Multi-Dispense mode it is used to toggle between the number of aliquots and the dispense volume so that either one can be edited.

In each of the following modes of operation for the pipette 10, it comprises the motor 40 with current receiving windings A and B for electromagnetically driving a rotor to impart the lengthwise movement to the plunger 90 in the cylinder 92 and a control circuit 110 including the microprocessor 38 programmed to generate the drive signals for the motor. In each such operations mode, the control circuit 110 comprises the display 22; the user actuateable control keys 26_a_, 26_b_, 28_a_, 28_b_ electrically connected to the microprocessor for generating within the microprocessor pipette mode of operation, liquid pick up volume, liquid dispense, pipette speed of operation and pipette reset signals for controlling operation of the pipette and alpha-numeric user readable displays on the display; a memory having tables of data stored therein and accessible and useable by the microprocessor to control operations of the pipette; and at least one user actuateable switch 30, 32 for triggering pipette operations selected by user actuation of the control keys. In each such operating mode the microprocessor is further programmed to sequentially enter successive user selected modes of operation in response to successive user actuation of a first one of the control keys defining a "mode"-key and in each selected mode to control operation of the pipette so that (a) a second actuation of the mode key or another of the control keys defining an option key causes the microprocessor to control the display to display a first operational option for the selected mode only, (b) a second one of the control keys defines an "up" key, actuation of which causes the microprocessor to control the display to indicate an activation or deactivation of the operational option or an increasing value for a numeric display associated with the operational option, and (c) a third one of the control keys defines a "down" key, actuation of which causes the microprocessor to control the display to indicate an activation or deactivation of the operational option or a decreasing value for the numeric display, and (d) subsequent user actuations of the trigger switch actuates the motor to drive the plunger in the selected mode augmented by the operational option in an up direction to pick up liquid into the tip, and then in a down direction to dispense liquid from the tip.

Also, the microprocessor is further programmed so that in each selected mode successive user actuations of the option key causes the microprocessor to control the display to sequentially display successive operational options for the selected mode only, each controllable pursuant to (b) and (c) above. Still further, the microprocessor 38 is preferably programmed so that the mode key functions as the option key to step between successive operational options in response to an initial sustained pressing of the mode key for a period of time longer than a momentary pressing of the mode key followed by successive momentary pressings of the mode key. Also, the microprocessor 38 is preferably further programmed to control the display to exit the display of the operational options while remaining in the selected mode in response to user actuation of a fourth one of the control keys defining a "reset" key and or a subsequent sustained pressing of the mode key.

Still further, the microprocessor 38 is preferably further programmed so that the reset key forces a displayed parameter in the display to read zero in response to an initial sustained pressing of the reset key for a period of time longer than a momentary pressing of the reset key and is further programmed to enter a "blow out" operation in response to a momentary user actuation of the reset key to drive the plunger in the cylinder to blow fluid from the pipette tip. Also, the microprocessor 38 is preferably further programmed so that each successive momentary user actuation of the reset key causes the microprocessor to control the display 22 to sequentially display different one of a plurality of successive operational parameters for editing by user actuation of the up or down keys and is further programmed to count and to control the display to distinctly display to the pipette user different displays for successive cycles of operation of the pipette in the selected mode of pipette operation thereby enabling the user to determine the operating cycle of the pipette for any period of pipette operation.

As will be described hereinafter, one of the operational modes for the pipette 10 is a manual mode. In that mode, the pipette utilizes two user actuateable switches (30, 32) for triggering pipette operations selected by user actuation of the control keys. In the manual mode, the microprocessor 38 is further programmed to enter the manual mode of operation selected by user actuation of the mode key and in the manual mode to control operation of the pipette so that (a) a first one of the trigger switches actuated by the user defines an "up" trigger actuation of which causes the microprocessor to control the motor to drive the plunger in a up direction to pick up liquid into the tip and (b) a second one of the trigger switches actuated by the user defines a "down" trigger actuation of which causes the microprocessor to control the motor to drive the plunger in a down direction to dispense liquid from the tip and to control the display to indicate the volume of liquid in the tip. Further, in the manual mode, the microprocessor 38 is further programmed to control operation of the pipette so that while at a home position with the plunger at a location ready to begin aspiration or pick up of liquid the display displays the maximum volume that can be picked up and, (a) "up" key actuation causes the microprocessor to control the display to indicate an increasing value for a selected maximum volume of liquid to be picked up by the tip as the "up" key is actuated by the user and (b) a "down" key actuation causes the microprocessor to control the display to indicate a decreasing value for the selected maximum volume of liquid to be picked up by the tip. Still further in the manual mode, the microprocessor 38 is further programmed to increase the speed of liquid pick up and dispense as the up trigger and down trigger respectively are actuated by the user.

As will be described hereinafter, in the manual mode, one of the tables of data stored in the memory accessible by the microprocessor 38 comprises correction factors for a maximum pick up volume associated with the pipette tip for reducing liquid volume errors associated with the pick up and dispensing of liquids by the pipette and the correction factors are added to pick up and dispense movements of the motor to correct for the volume errors. Further, in the manual mode, the microprocessor 38 is further programmed to count and to control the display to distinctly display to the pipette user different displays for successive cycles of operation of the pipette in the manual mode of pipette operation thereby enabling the user to determine the operating cycle of the pipette for any period of pipette operation.

As will be described in greater detail hereinafter, in a pipet mode of operation for the pipette 10, the microprocessor 38 is further programmed to control operation of the pipette so that (a) "up" key actuation causes the microprocessor to control the display to indicate an increasing value for a selected volume of liquid to be picked up by the tip and (b) "down" key actuation causes the microprocessor to control the display to indicate a decreasing value for the selected volume of liquid to be picked up by the tip and (c) first user actuation of any of the trigger switches actuates the motor to drive the plunger in a up direction to pick up the selected volume of liquid into the tip and (d) second user action of any of the trigger switches actuates the motor to drive the plunger in a down direction to dispense the selected volume of liquid from the tip. Further, in the pipet mode, one of the tables of data stored in the memory comprises instructions for controlling the drive signals applied to the linear actuator to control the speed of operation of the motor in accordance with speed of operation settings selected by user actuation of the control keys and another of the tables of data stored in the memory comprises correction factors for various of the liquid pick up volume settings selected by user actuation of the control keys to control and eliminate liquid volume errors associated with the pick up and dispensing of liquids by the pipette. Like the manual mode, in the pipet mode, the microprocessor 38 is programmed to count and to control the display to distinctly display to the pipette user different displays for successive cycles of operation of the pipette in the pipet mode of operation thereby enabling the user to determine the operating cycle of the pipette for any period of pipette operation. Distinct to the pipet mode, the microprocessor 38 is further programmed to (i) pick up a second selected volume of liquid when the plunger reaches the home position in response to user actuation of one of the trigger switches as the plunger approaches a home position to dispense the selected volume of liquid and (ii) dispense and mix the second selected volume of liquid with the selected volume of liquid.

As will be described in greater detail hereinafter, in a multi-dispense mode of operation, the microprocessor 38 is further programmed to control operation of the pipette so that (a) up key actuation causes the microprocessor to control the display to indicate an increasing value for a selected volume of liquid to be dispensed up by the tip and (b) down key actuation causes the microprocessor to control the display to indicate a decreasing value for the selected volume of liquid to be dispensed by the tip and (c) a third of the control keys defines a "reset" key, actuation of which causes the microprocessor to control the display to indicate a number corresponding to the number of aliquots of liquid of the selected volume the pipette can dispense which number is adjustable by actuation of the "up" and "down" keys and (d) as described hereinafter under "Multiple Dispense Mode", a first user actuation of any of the trigger switches actuates the motor to drive the plunger in a up direction to pick up into the tip a volume of liquid in excess of a volume equal to the selected aliquot volume times the number of aliquots and (e) second user actuation of any of the trigger switches actuates the motor to drive the plunger in a down direction to dispense the selected volume of liquid from the tip which is repeated for each second actuation of any of the trigger switches until the number of aliquots has been dispensed by the pipette. As in the manual and pipet modes, in the multi-dispense mode, one of the tables of data stored in the memory comprises instructions for controlling the drive signals applied to the linear actuator to control the speed of operation of the motor in accordance with speed of operation settings selected by user actuation of the control keys and another of the tables of data stored in the memory comprises correction factors for various of the selected liquid volume settings selected by user actuation of the control keys to control and eliminate liquid volume errors associated with the pick up and dispensing of liquids by the pipette. Further, in the multi mode the microprocessor 38 is further programmed to control the motor to enter a "blow out" mode wherein the motor drives the plunger beyond a home position for the plunger to blow out liquid remaining in the tip after the plunger reaches the home position.

Pipet Mode

Figure 11A:
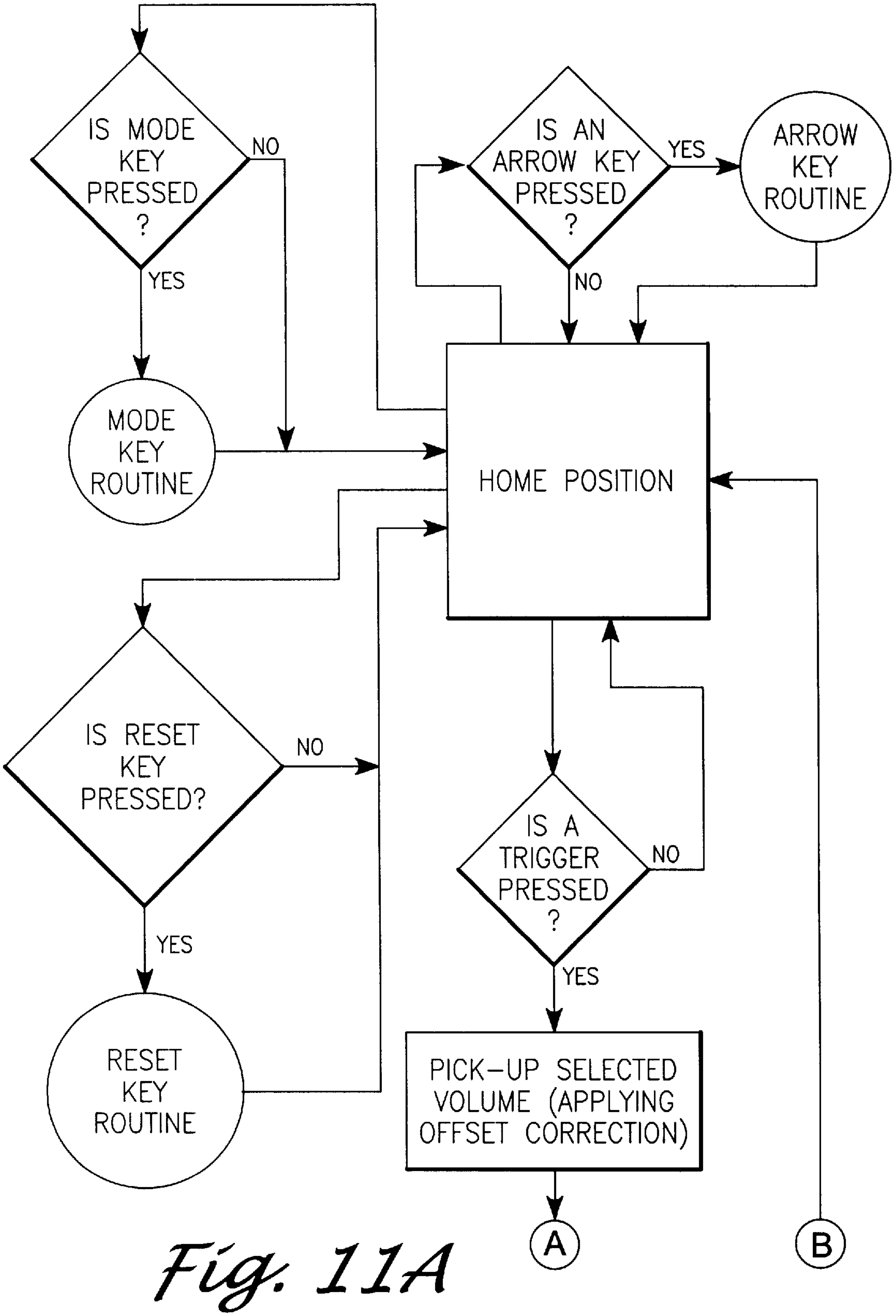
FIG. 11 comprising FIGS. 11A and 11B comprise a software flow diagram illustrating the pipette mode of operation of the pipette of the present invention.
Figure 11B:
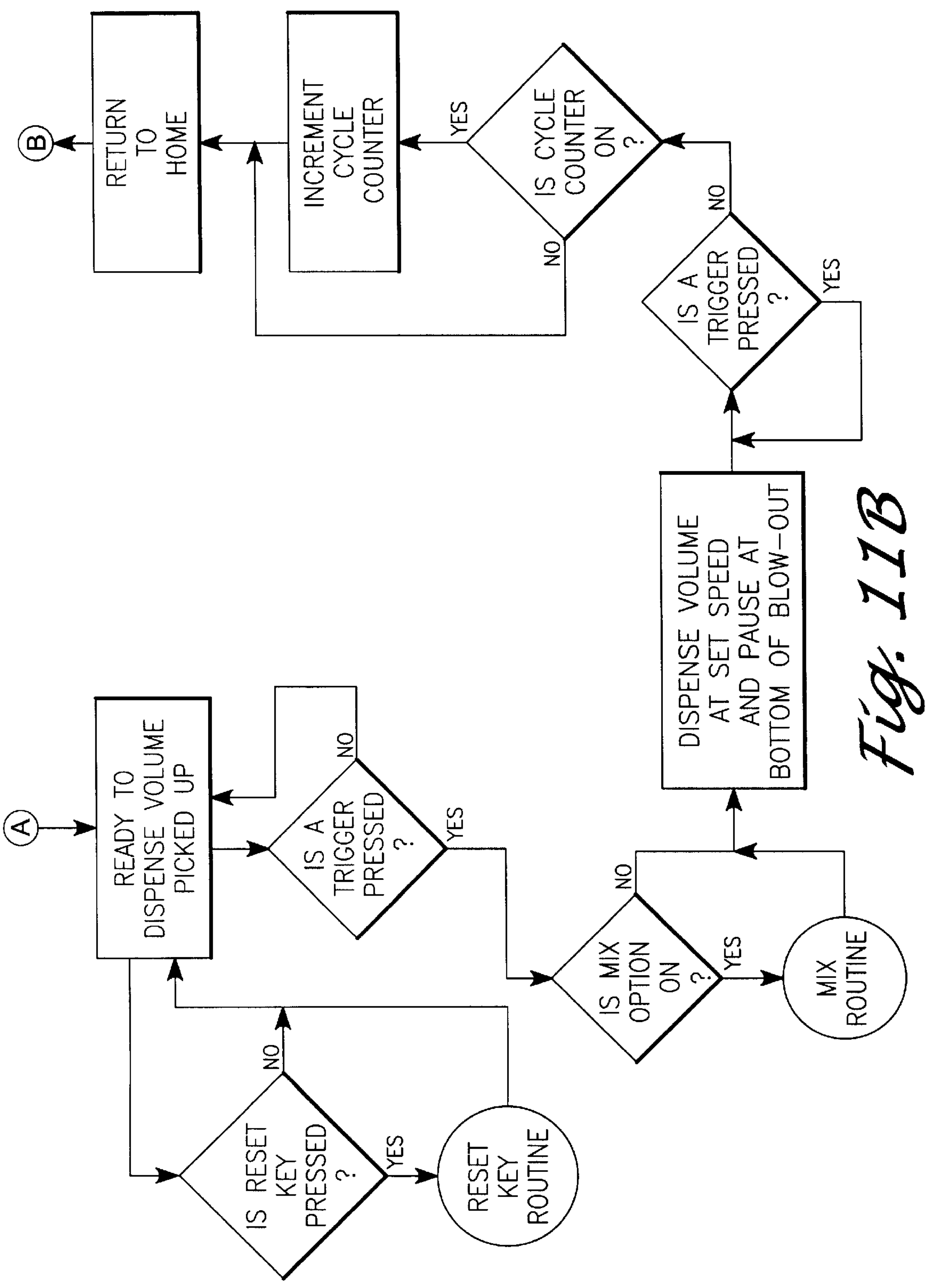

Pipet mode is depicted by the software flow diagram of FIGS. 11A and 11B and is indicated by the lit "Pipet" annunciator on the display 22. The up and down arrow keys 28*a* and 28*b* are used to change the volume. The arrow keys are only active when the pipette is in its home position indicated by the "pickup" annunciator being on. When either trigger 30 or 32 is pressed the pipette aspirates the indicated volume at a motor speed corresponding to the speed setting. As indicated in the software flow diagram of FIG. 11A, when the pipette 10 is in its pipet mode, each pick up of a user selected volume of liquid by activation of a trigger switch (30, 32) adds offset steps to the motor movement to correct for fluid effects which would otherwise result in the aspirated volume being less than the selected volume. Such errors are depicted by the lower curve in FIG. 9 while the correction factors for each selected volume are depicted by the upper curve in FIG. 9. FIGS. 9*a*–9*f* depict in chart format a table of such correction factors for the various user selected or "set" volumes for the pipette 10. A table of such data is stored in the EEPROM memory U8 and is accessed by the microprocessor 38 to add pulses as microsteps to the train of pulses comprising the drive signal to the windings A and B of the motor 40. This results in the adding of offsets to the lengthwise movement of the plunger 90 in the cylinder to draw into the tip 60 the selected volumes of liquid.

At the completion of aspiration the dispense annunciator turns on at the same time the pickup annunciator turns off. When either trigger is pressed the pipette dispenses its entire volume at a speed according to the speed setting, goes through the blowout stroke to bottom of blowout, pauses one second there, and returns to the home position. The pipette will pause before entering the blowout stroke for a period of time determined by the speed setting (generally longer for slower speeds). If the trigger is depressed when the pipette reaches bottom of blow out the pipette stays at the bottom of blow out until the trigger is released.

Pipet Mode Options:

As depicted in FIG. 12, if the Mode key is pressed for a long duration (over 1 second) the Options menu for the Pipet mode will be activated. The first item displayed will be the last item displayed from the previous access of the Options menu (Speed is the default option after initialization.) Succeeding normal presses of the Mode key will toggle through the available options for the Pipet mode which are listed below:

a. Speed b. & Mix c. Cycle Counter

When Speed is selected the "Speed" annunciator will be lit and the Speed setting will be flashing in the first digit of the volume display. The up/down arrows keys can be used to change the speed setting. The speed setting is unique for each mode. The default setting that is selected upon initial power up is determined by what is programmed into the EEPROM U8; this typically would be the fastest speed available for the Pipet and Multi-Dispense modes and a medium speed for the Manual mode. The selectable speeds will be numbered 1 through 10. The following tables indicate the times effected by the speed setting for each mode of operation:

Pipet Mode:

| Speed Setting | (ms) Full Scale Move | (ms) Pause At home | (ms) Blow Out | (ms) Hold At end |
|---|---|---|---|---|
| 10 | 706 | 0 | 126 | 1090 |
| 9 | 1010 | 420 | 215 | 985 |
| 8 | 1470 | 585 | 300 | 1060 |
| 7 | 1940 | 805 | 375 | 1050 |
| 6 | 2410 | 860 | 500 | 980 |
| 5 | 2800 | 1080 | 320 | 1040 |
| 4 | 3190 | 1460 | 580 | 1050 |
| 3 | 3820 | 1730 | 690 | 1060 |
| 2 | 4460 | 1900 | 800 | 1060 |
| 1 | 5280 | 2540 | 1040 | 920 |

-continued

| Manual Mode: | |
| --- | --- |
| Speed Setting | (sec.) Full Scale Move |
| 10 | 2.2 |
| 9 | 3.0 |
| 8 | 4.2 |
| 7 | 5.8 |
| 6 | 8.1 |
| 5 | 11.2 |
| 4 | 15.5 |
| 3 | 21.5 |
| 2 | 29.7 |
| 1 | 41 |

Pressing either trigger will pickup the Pipet mode volume at the selected speed and exit the Option menu. A long press of the Mode key or a press of the Reset key will exit the Option menu. A normal press of the Mode key will toggle to the Mix Option.

Figure 15:
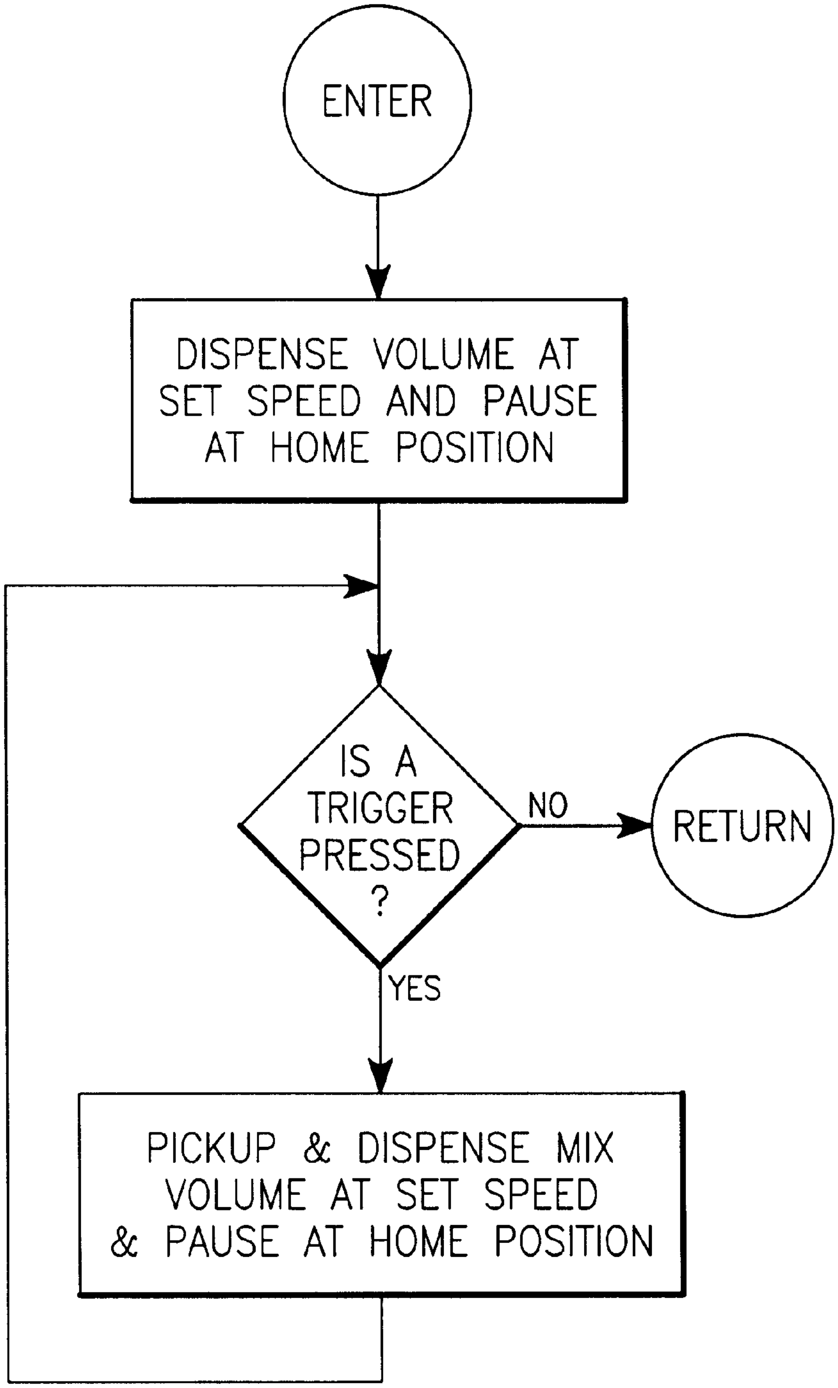
FIG. 15 is a software flow diagram illustrating the mix key routine included in the operation of the pipette in the pipette mode of operation of the pipette of the present invention.

As depicted by the software flow diagram of FIG. 15, when the Mix option is selected in the Option menu the "& Mix" annunciator will be lit and the volume digit displays will read: "OFF" or "On". The up/down arrow keys can be used to set the Mix option to either state. When the Mix option is left on the "& Mix" annunciator is also left on when exiting the Option menu.

Operation with the Mix option on is similar to when it is off except that mixing can be performed at the conclusion of the dispense cycle.

Mixing will occur as follows:

1. A mixing cycle (aspirate mixing volume from home position and return to home position) will be performed if the trigger is depressed when the piston nears the home position.
2. Additional mixing cycles will occur until the piston nears the home position and the trigger is not depressed.
3. Lifting and re-depressing of the trigger in mid-stroke will have no effect as long as the trigger is depressed when home position is neared.
4. If upon the piston nearing the home position (either after a pipetting stroke or a mix cycle) the trigger is not depressed, the pipette will pause, a blowout stroke will be performed, the pipette piston will pause at the bottom of blow out, and will return to home position (end of cycle). Therefore, mixing can be skipped while operating with the mix option on should the user desire.
5. The "pickup" and "dispense" LCD annunciators will be activated during the each corresponding part of a Mix cycle. (i.e. pickup during aspiration and dispense during dispense)

The mix volume (the volume aspirated and dispensed during a mix cycle) for the pipette 10 is always the same as the set volume to be pipetted. The mix speed will be the same motor speed as programmed in the speed option.

When the Cycle Counter is selected from the Pipet mode Option menu the digits display will read either "CC OFF" or "CC On". The up/down arrow keys can be used to toggle between the two states. When exiting the Option menu with the Cycle Counter on the two digits to the left of the volume display will indicate the cycle count. Initially it will read 00. Each time a pipette cycle is completed the counter will increment by one. When it reaches 99 it will roll over to 00.

When the cycle counter is active, pressing the Reset key while at home will alternately select the cycle counter count or the pickup volume. The up/down arrow keys can edit the selected parameter to any setting. A long duration press of the Reset key is a quick way to zero the cycle counter.

The following is a summary of the key press actions in the Pipet mode:

At the Home position:

"Arrows" Adjust pickup volume or the cycle counter count, whichever is selected.

"Reset" Normal duration press selects pickup volume or cycle counter count, if on, otherwise it does nothing. Long duration press zeros cycle counter, if on, otherwise it does nothing.

"Mode" Normal duration press toggles to next mode. Long duration press activates (or deactivates) the Option menu display.

After a Pickup:

"Arrows" Do nothing.

"Reset" Normal duration press dispenses, blows out, pauses, and returns to home position. Long duration press does nothing.

"Mode" Does nothing.

Manual Mode

Figure 10A:
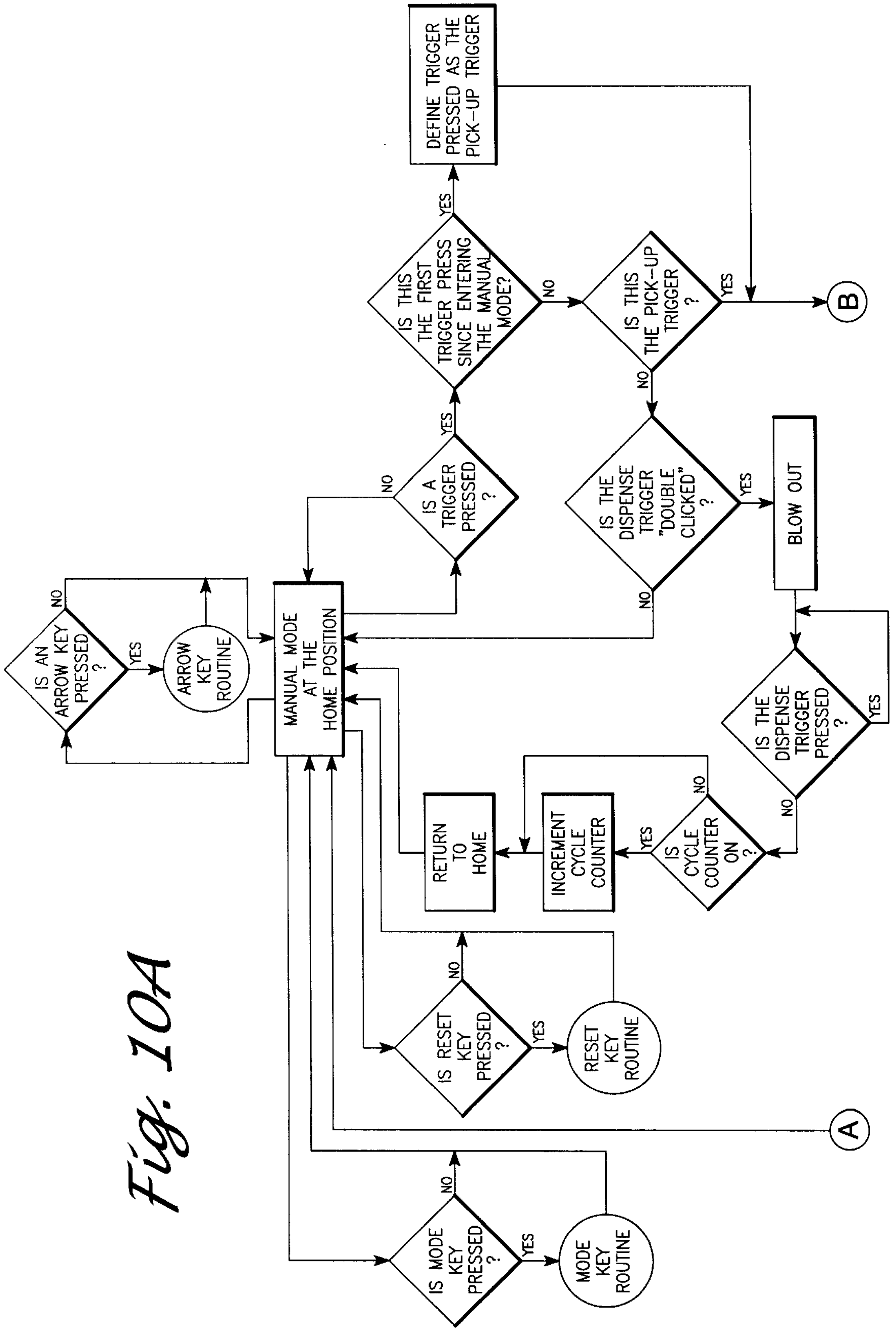
FIG. 10 comprising FIGS. 10A and 10B comprise a software flow diagram illustrating the manual mode of operation of the electronic pipette of the present invention.
Figure 10B:
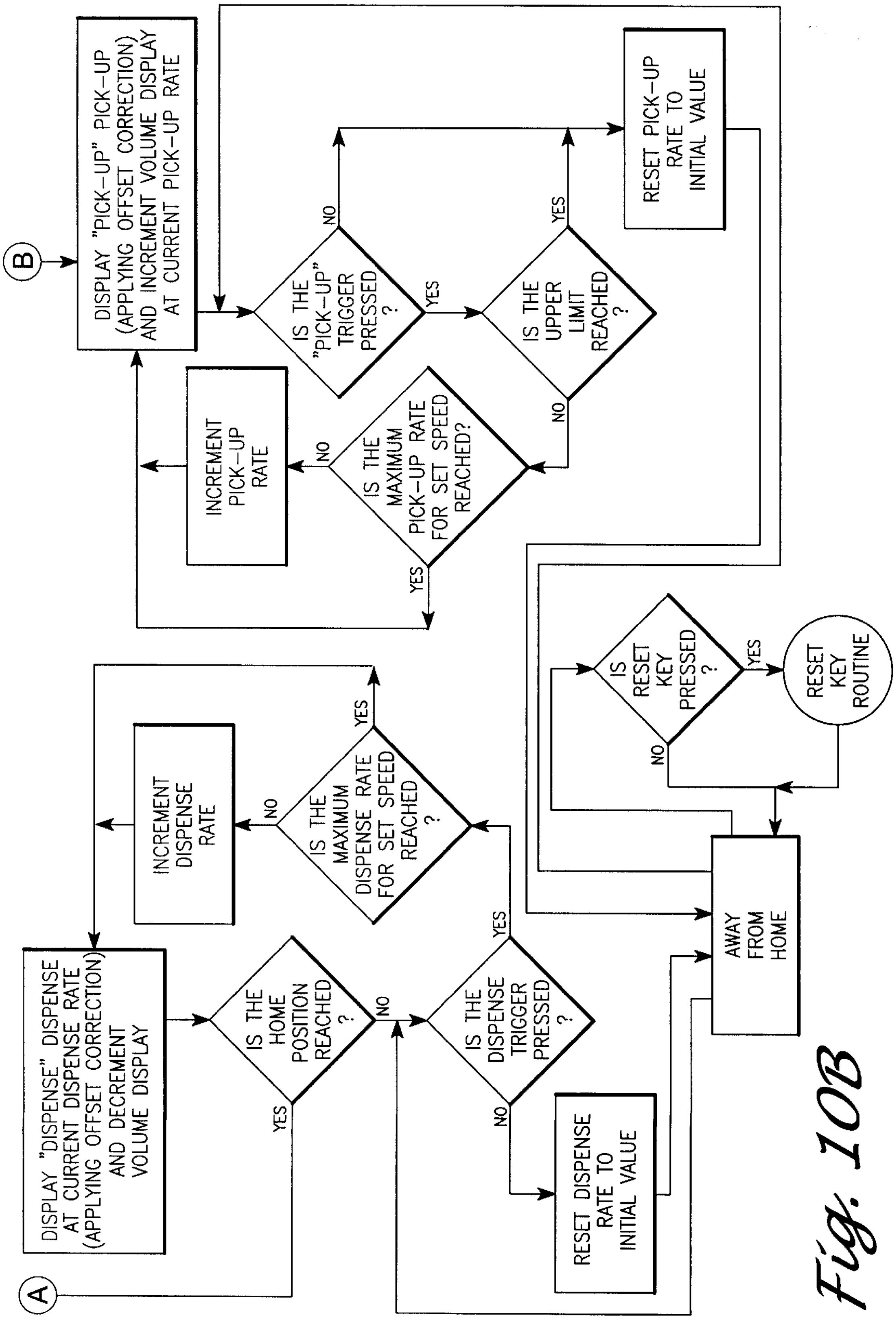

The microprocessor 38 software flow diagram for the manual mode of operation is depicted in FIGS. 10A and 10B. In the manual mode the volume displayed is the default (full scale) volume unless a smaller volume ("pickup limit") has been set. This determines the maximum volume of liquid that can be picked up.

The first trigger (30 or 32) pressed upon entering the Manual mode becomes the "up" trigger and the other becomes the "down" trigger by default.

Pressing the "up" trigger causes the display to stop displaying the maximum pick up limit and starts picking up liquid, slowly at first, then at a faster and faster rate. The display indicates the amount of liquid picked up so far. The maximum rate is controlled by the set speed selected by use of the Speed option as previously described according to the routines set forth in FIGS. 13 and 14.

Letting-up on the "up" trigger stops the motor. If that same trigger is pressed again it continues to pickup, slowly at first, and then at a faster and faster rate as above. Thus, by repeatedly pressing and releasing the trigger before it ramps up to a high speed, one can achieve very fine control of the pick-up (or dispensing) of liquid.

The display continues to show the total liquid picked up from the home position. If the reset button is pressed for a long duration, the display is reset to zero and the display then will indicate the volume picked up, or dispensed (depending on which trigger is pressed next), after the display was reset. If the reset button is pressed for a normal duration the unit dispenses, goes through "blow-out", pauses at bottom of blow out, and returns to home position and the volume displayed reverts to the pickup limit that was last set.

Pressing the "down" trigger causes the liquid to be dispensed, slowly at first then at a faster and faster rate as above. Whenever a change from pickup to dispense occurs (or vice-versa), offset steps are added so that the motor movement offsets fluid and mechanical backlash effects. The number of offset steps depends on the volume range of the instrument and is stored as microprocessor accessible data in the EEPROM memory U8. This is data in addition to the correcting factor table referred to relative to fluid effects correction for the Pipet Mode of operation.

While dispensing, the display decrements to indicate the amount of liquid in the tip (picked-up from home position) unless the display has been reset. This allows one to overshoot and then return to the desired amount.

If the display has been reset (by pressing the reset button for a long duration) the display afterwards indicates as a positive number the amount of liquid either picked up from that point, or as a negative number the amount dispensed from that point. The center crossbar of the rightmost aliquot digit forms the "minus" symbol. As noted above, with any change in motor direction, the proper amount of offset steps are added for that volume range.

Continued pressing of the dispense trigger will cause liquid to be dispensed until reaching the "home" position. At this point the motor will stop. This prevents the user from accidentally going into blow-out, and best emulates a manual pipette (user could manually mix, etc.) At "home" position a "double click" of the dispense trigger causes the unit to blow out and return to home.

Manual Mode Options:

Upon activating the Options menu with a long duration press of the Mode key the following options can be selected with normal duration Mode key presses:

a. Speed b. Cycle Counter

These Options can be edited as described under the Pipet mode of operation.

A summary of the key press actions in the Manual mode follows:

At the Home position:

"Arrows" Adjust pickup volume or the cycle counter count, whichever is selected.

"Reset" Normal duration press selects pickup volume or cycle counter count, if on, otherwise it does nothing. Long duration press zeros cycle counter, if on, otherwise it does nothing.

"Mode" Normal duration press toggles to next mode. Long duration press activates (or deactivates) the Option menu display.

After a Pickup:

"Arrows" Do nothing.

"Reset" Normal duration press dispenses, blows out, pauses, and returns to home position Long duration press zeros volume display.

"Mode" Does nothing.

Multiple Dispense Mode

Figure 16A:
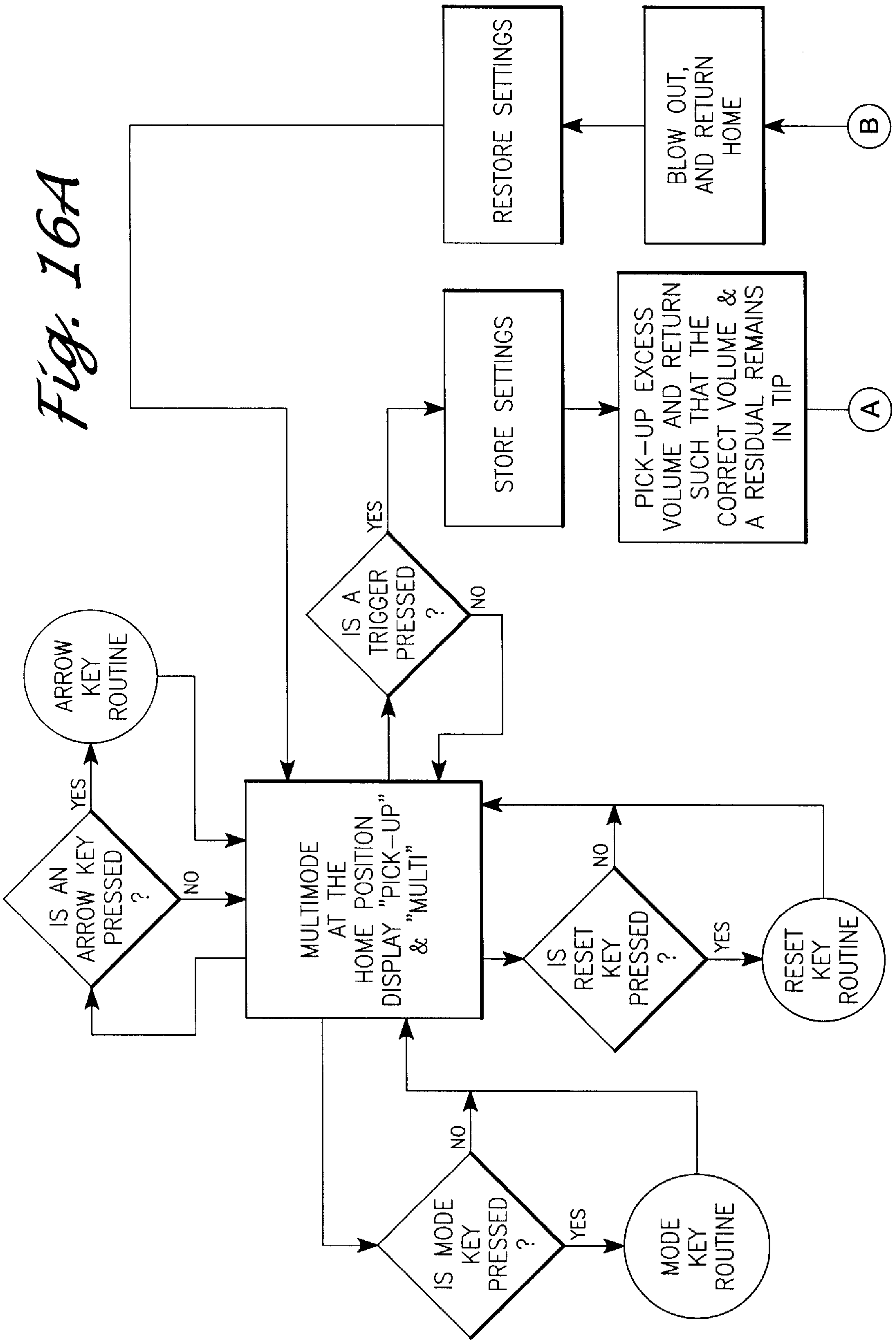
FIG. 16 comprising FIGS. 16A and 16B comprise a software flow diagram illustrating the multi mode of operation of the pipette of the present invention.

The microprocessor 38 software flow diagram for the Multiple Dispense Mode of pipette operation is depicted in FIGS. 16A and F16B. When toggling to this mode by activating the Mode key, the dispense volume is active and can be edited with the arrow keys 28*a*, 28*b*. The dispense volume can be changed when the unit is at "Home" as well as while the unit is waiting to dispense. When the dispense volume is changed the number of aliquots is recalculated and displayed on the display 22 in the two small, dedicated digits adjacent to the "X" symbol. If the pipette is at "Home", the number of aliquots is calculated to be the largest it can be and still have a sufficiently large residual volume (i.e.; a full scale pickup). The residual volume can be easily changed since it is stored in the EEPROM memory U8. If the dispense volume value is changed while dispensing then the number of aliquots, "X", is recalculated to represent the remaining aliquots in the tip (assuming the dispense volume remains unchanged for the remaining aliquots.) The volume can be changed at any and all pause points while in the dispense phase (within the limits of the remaining volume left in the tip.) After each dispense volume is dispensed the number of aliquots decrements by one so that the display always shows how many aliquots are remaining in the tip. When "X" reaches zero the display flashes the "reset" symbol to remind the user to press the "reset" key.

If the user does not want to aspirate a full scale load in the tip then he can decrease the calculated number of aliquots while still at "Home" before pickup. To do this the user presses the "Reset" key which activates the number of aliquots field for editing. The number of aliquots digits and the "X" symbol flash indicating that the arrow keys will change the number of aliquots. The number of aliquots field remains activated until either the "Reset" key is pressed again, or a trigger is pressed, in either case the dispense volume becomes activated (but, if the trigger was pushed liquid is also aspirated). While at the "Home" position pressing the "Reset" key alternately activates the dispense volume and the number-of-aliquots field. If the "X" value has been reduced from the default calculation then it remains unchanged until the user either changes it again or changes the dispense volume; changing the mode (or pressing reset) will not change the settings. Whenever the dispense volume in the Multiple Dispense Mode is changed then a new, full scale "X" value will be automatically calculated.

As depicted in FIG. 16A, when the pipette has been preset by activation of the arrow and reset keys as described above and using the previously described Arrow Key and Reset Key routines, the user activates one of the trigger switches (30, 32). While the presettings are stored, the microprocessor 38 controls the motor 40 to pick up into the tip 60 a volume of liquid in excess of volume equal to the aliquot volume times the number of aliquots (selected total volume). The motor reverses to dispense some of the liquid leaving in the tip the correct selected total volume and a residual volume of liquid. At that point, the arrow keys can be activated to modify the aliquot volume if so desired accompanied by any necessary microprocessor recalculation of the number of aliquots. Activation of the Reset key 26*b* will then cause the pipette to dispense all liquid in the tip overriding the multi-mode operation of the pipette.

Figure 16B:
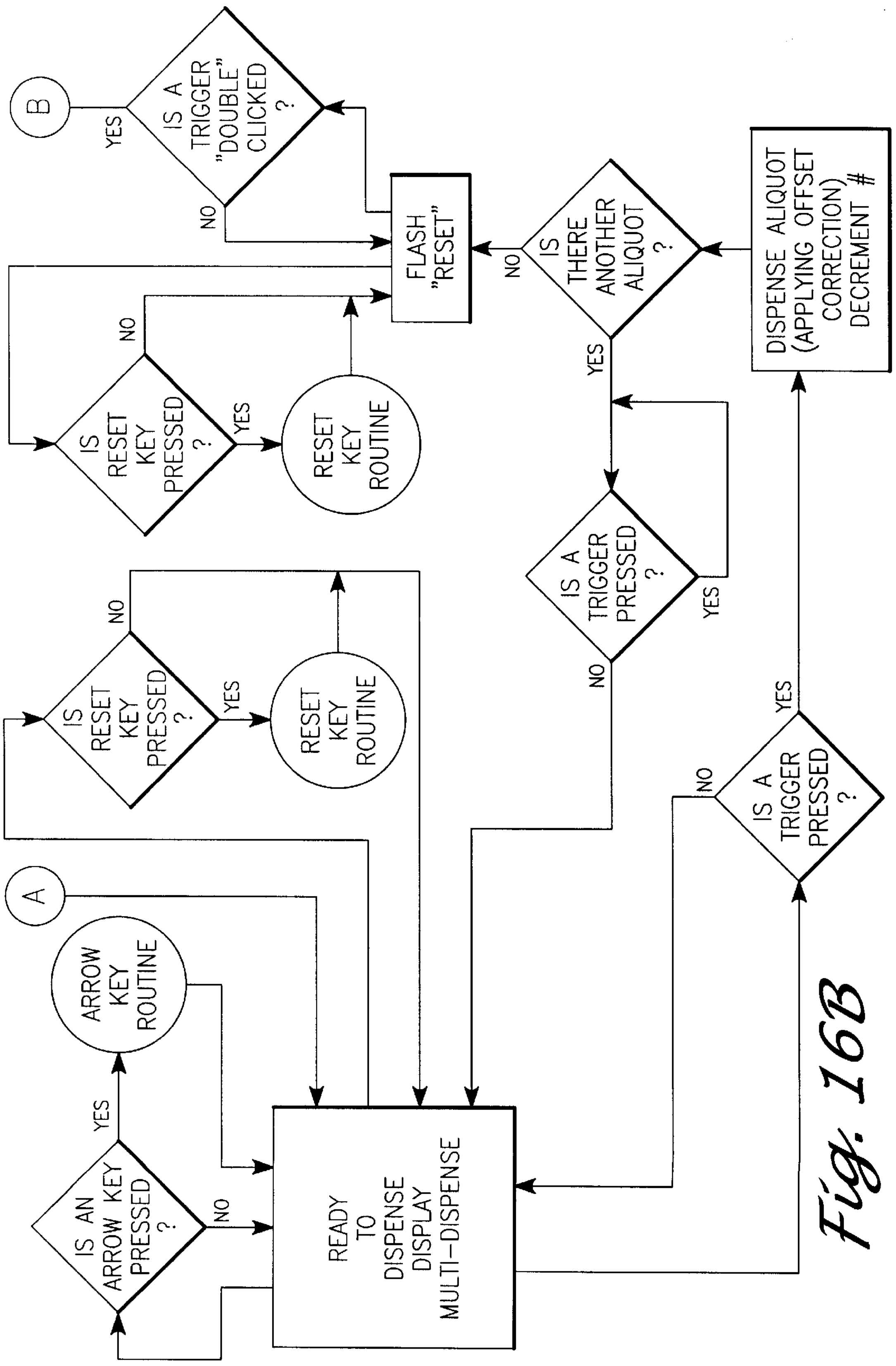
Figure 17:
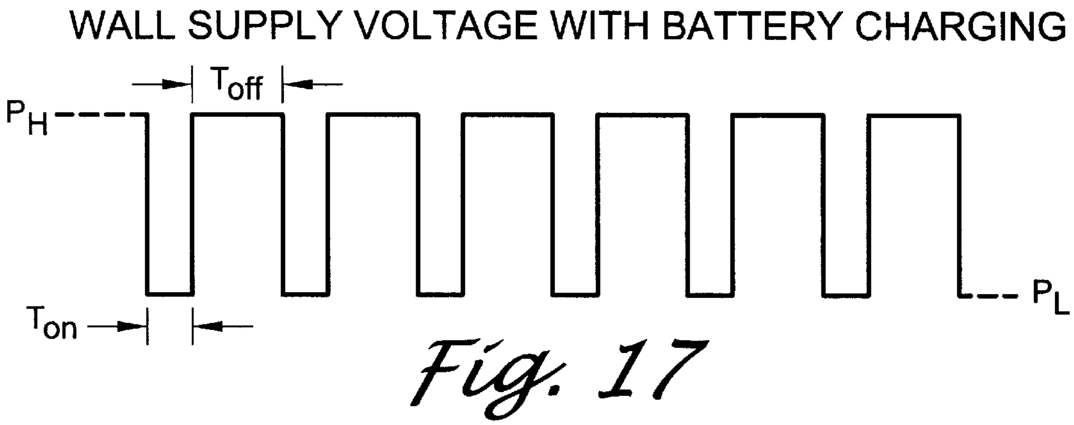
FIG. 17 is a graph of the voltage, as a function of time, from a power source being used to charge the battery powering the microprocessor and stepper motor included in the preferred electronic pipette of the present invention.
Figure 18:
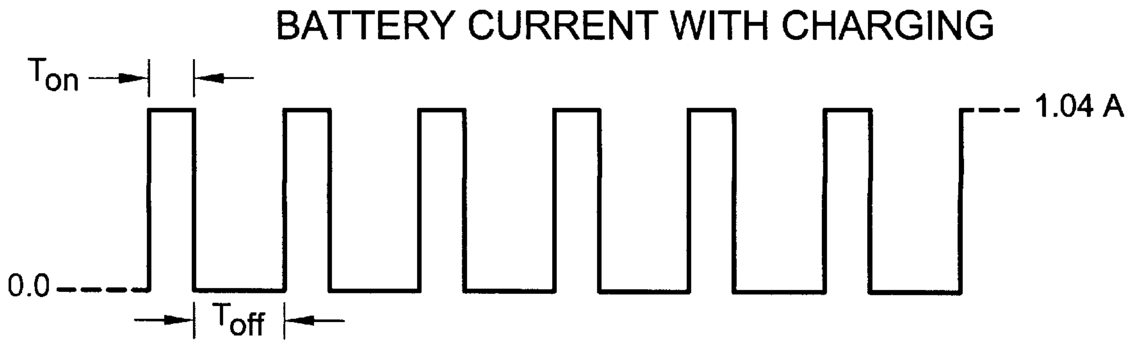
FIG. 18 is a graph of the current, as a function of time, from the power source used to charge a battery powering the microprocessor and stepper motor included in the preferred electronic pipette of the present invention.
Figure 20:
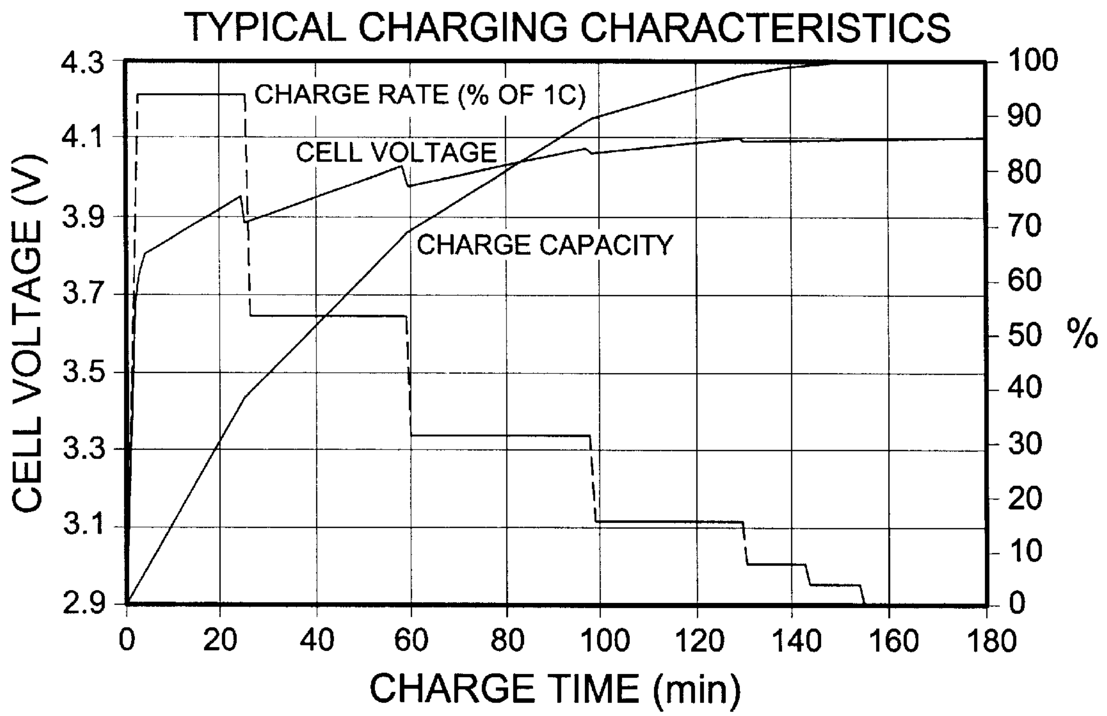
FIG. 20 is a graph which illustrates the charge rate, open circuit battery voltage, and charge capacity as a function of time for a battery being charged by the preferred method of the pipette of the present invention.

In response to activation of one of the trigger switches, however, the pipette enters the microprocessor controlled dispense routine depicted in FIG. 16B with the microprocessor introducing offset corrections according to data stored in the EEPROM memory U8 such as correction data similar to the correction curve and tables of FIGS. 9 and 9*a*–9*f* as described for the Pipet Mode of pipette operations. This operation is repeated for each subsequent activation of a trigger switch until all aliquots have been dispensed. At that point, either activation of the Reset Key or a double click of the trigger switch will cause the microprocessor to drive the motor into a blow out routine in which the plunger 90 is driven past "home" to blow all residual liquid from the tip and the plunger is returned to "home" and the presettings are restored readying the pipette for a second multiple dispense operation.

In the Multiple Dispense mode, the only option on the Option menu is the speed setting which operates in the manner previously described.

Therefore, to sum-up:

At the Home position:

"Arrows" Adjust dispense volume or the aliquot number, whichever is selected.

"Reset" Normal duration press selects dispense volume or the aliquot number. Long duration press does nothing.

"Mode" Normal duration press toggles to next mode. Long duration press activates (or deactivates) the Option menu display allowing the speed setting to be adjusted.

After a Pickup:

"Arrows" Adjust volume & remaining aliquots are recalculated.

"Reset" Normal duration press dispenses, blows out, pauses, and returns to home position Long duration press does nothing.

"Mode" Does nothing.

When last aliquot has been dispensed (and user is prompted to reset):

"Arrows" Perform reset as below:

"Reset" Normal duration press dispenses, blows out,

"Reset " pauses, and returns to home position (volume setting and aliquot number are returned to the values last set by the arrows by the user in the home position in multi-dispense.)

"Mode" performs reset, as above, and then toggles to next mode.

Battery Power Management and Recharge Circuitry 106

Figure 22:
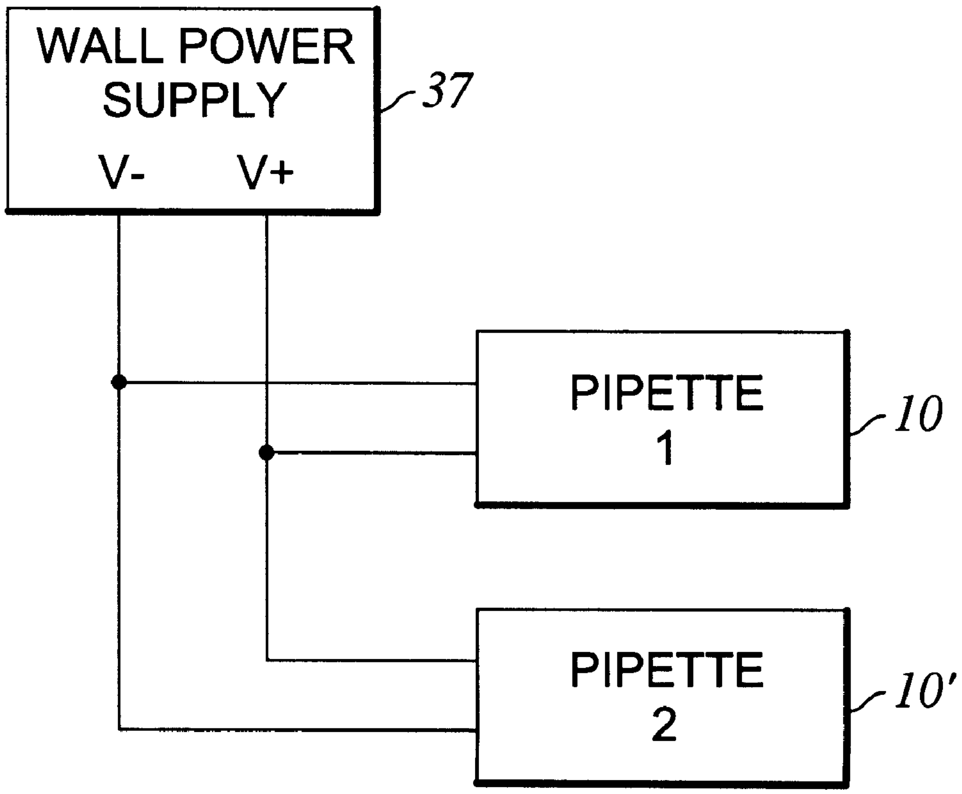
FIG. 22 is a block diagram showing two pipettes of the present invention connected to a power source for sequential charging of the batteries therein according to the battery charging routine of the present invention.

The battery 36 included with the pipette 10 is a lithium-ion battery having a 400 ma-hour rating. Thus, the average charging current to the battery should be limited to a maximum of 400 ma (i.e.; a 1 C rate) to avoid potential damage to the battery. The motor 40 draws a maximum current of more than 800 ma during operation. Since it is desired that the pipette 10 be able to operate from a wall power supply 37 (FIG. 22) without a battery installed in the device, the wall power supply must be capable of supplying more than 800 ma without excess voltage ripple occurring. It is also desired that the same wall power supply be used to charge a battery, installed in the pipette 10 when the wall power supply is plugged into the pipette. Further, as depicted in FIG. 22, it is desired that the same wall power supply 37 be used to power an optional charge stand (not shown) which can to be used to store two or three pipettes (10, 10') and to automatically charge any pipette which is placed on the charge stand with a battery that needs to be charged.

The small space available in the pipette does not allow for any significant heat dissipation to take place in the pipette other than what the motor will dissipate during pipette operation The available current from the wall power supply is considerably more than the maximum charge current allowed to the battery. A traditional method that might be used to limit the charging current is to place a linear current source between the wall power supply and the battery to limit the current to the 1 C rate (400 ma) while charging the battery. However, such a circuit would need to be located in the pipette so it could be assured that it was only limiting the current when a battery was being charged and not limiting the current when the motor was being used without a battery. Typically, such a circuit would have 2 to 3 volts drop across it, and, with 400 ma flowing through it, would produce approximately 1 watt of power dissipation. To dissipate 1 watt of heat in the pipette electronics, while the battery is being charged for up to one hour, would require a heat sink larger than the space available in a compact pipette with the dimensions of an electronic pipette. In addition, the heat would raise the temperature of the pipette body and battery to an undesirable level.

However, in the pipette 10 of the present invention, a switching circuit is used to overcome the heat dissipation problem associated with a linear current limiting circuit as described above. The switching circuit comprises the P channel FET in U7 (FIG. 3A) controlled on an "on" time versus the "off" time basis by a pulse width modulated (PWM) switch control signal from Port P50 of the microprocessor in the pipette. The current limit from the wall power supply 37 multiplied by the duty cycle of the PWM signal represents the average charging current to the battery. If the frequency of the PWM switch control signal is high enough, then the "on" pulse of current from the wall power supply to the battery will be of a short duration so that the peak magnitude will not be as important as the average of the "on" time and "off" time which is averaged by the battery. The lithium-ion 36 battery used in the pipette of the present invention has a built in protection circuit which opens up (disconnects) the battery if it is accidentally overcharged. The built in protection circuit in the battery 36 is standard for lithium-ion batteries and is a rather sophisticated circuit which protects against over voltage and current charging as well as excess current loads and under voltage conditions. The peak current into or out of the battery used in the pipette 10 cannot exceed about 2 amps without the built in protection circuit tripping. The wall power supply must have a fast enough current limit so that when the wall supply FET (P channel FET in U7) is turned on, the current limits immediately at its rated value (i.e.; 1.04 amps) resulting in an immediate voltage drop from the wall supply so that the battery is not exposed to large current spikes. Commercially available wall power supplies with current limiting in general do not limit their output current fast enough. Most off the shelf power supplies have relatively large output filter capacitors in their circuits which produce a large current spike when a load (battery) is suddenly switched across the supply output. The large current spike may not drop to the current limit value for up to a millisecond or so. Such power supplies are unacceptable for use in a PWM controlled switch to charge the battery.

Accordingly, the wall power supply 37 used with the pipette 10 is designed to have rapid current limiting at nominally 1.04 amps and to be void of current overshoot when the battery is charged by a 1 kHz rate PWM controlled switch (PWM switch) comprising the P channel FET in U7 (FIG. 3A). When charging at a 1 C rate the PWM duty cycle is set to approximately 36% "on" time (360 $\mu$s on and 640 $\mu$s off) such that the battery sees an average charging current just below 400 ma. The regulated wall power supply voltage is nominally 5.6 volts. The no load battery voltage is less than or equal to 4.1 volts. Therefore, when the PWM switch is turned "on", the wall power supply voltage (measured at the wall node) will drop to the battery voltage plus the drop across the PWM switch and the diode, D1, as well as the voltage drop across the internal resistance of the battery due to the charging current. All together the wall power supply voltage measured at the wall node in FIG. 3A and input to the microprocessor 38 at Port AN2 is typically about 0.4 to 0.5 volts above the no load battery voltage when the PWM switch is turned on. As illustrated in FIGS. 3A, 3B and 3D, the measured battery voltage is input to the microprocessor at Port ANO. The wall power supply voltage immediately returns to the regulated 5.6 volts when the PWM switch is turned "off". The voltage at the wall node (Port AN2) will look like that illustrated in FIG. 17 when the battery is being charged at the 1 C rate. $P_H$ is the regulated voltage (typically 5.6 volts) and $P_L$ will typically be between 3.4 to 4.6 volts when a battery is being charged which corresponding to a no load battery voltage of 3.0 to 4.1 volts.

Manufacturers of rechargeable lithium-ion batteries generally recommend charging a single, 4.1 volt, cell battery which is below 3.0 volts with a pre-charge current at a C/10 rate. Above 3.0 volts but below 4.1 volts the battery can be charged with a current not to exceed a 1 C rate. At 4.1 volts (measured with a charge current), the current should be reduced gradually such that the voltage does not exceed 4.1 volts. This is known as the constant voltage phase of charging. If this voltage limit is exceed by a given amount the built in battery protection circuitry will open circuit the battery. The constant voltage charging phase should continue until the charge rate has dropped to less than a C/10 to C/20 rate or 4 hours of charging has elapsed, whichever occurs first. The final charging voltage limit (4.1 volts) needs to be determined with about 1 percent accuracy. Regulating the wall power supply voltage to this voltage and precision would add unnecessary expense.

As previously described, the microcontroller 38 in the pipette 10 has an A to D converter built in which uses U2 as a precision voltage reference with the required 1 percent accuracy. By using the on board A to D converter, the wall power supply 37 can supply a higher voltage than is needed for charging the battery and the 4.1 volt charging limit can be monitored and controlled by the microcontroller and its A–D converter.

Figure 21A:
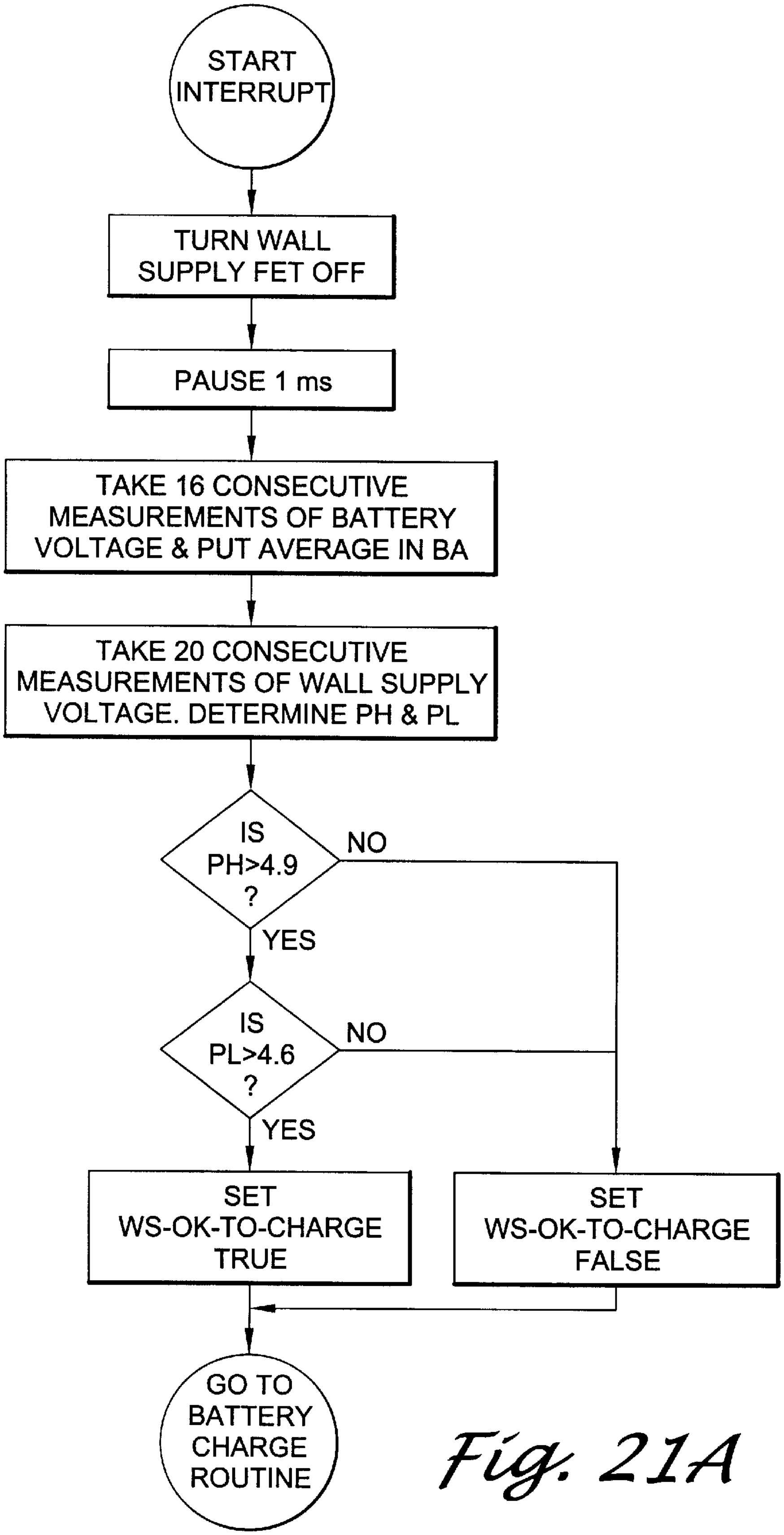
FIG. 21 comprising FIGS. 21*a* through 21*c* comprise a software flow diagram illustrating the battery charging portion of the power management operation of the pipette of the present invention.

In particular, the microcontroller 38 is programmed to simulate an analog constant voltage charging phase by using multiple voltage thresholds to determine when to switch to a smaller charging current. The microcontroller 38 thereby measures the battery (Port AN0) and wall power supply (Port AN2) voltage with the A to D converter once per second in a power management routine when the motor is not running. The power management routine programmed into the microprocessor 38 is depicted in FIGS. 21*a*, b and c. As illustrated, the measurements are taken while the PWM switch (wall supply FET) is turned off so that the battery voltage is representative of the no load battery voltage and the wall power supply voltage is its regulated value assuming that no other pipettes are connected to it and charging. The average increase (due to the internal impedance of the battery) on the battery voltage while it is being charged at the 1 C is approximately 0.15 volts. Therefore, the first threshold voltage is set to 3.95 volts. When the open circuit voltage is measured at 3.95 volts the average voltage on the battery while charging at the 1 C rate is 4.1 volts. At this point the charging current is decreased by reducing the PWM duty cycle to approximately 20% (this represents the beginning of constant voltage phase of charging). The charge pulse on time is left constant at 0.36 milliseconds while the period is adjusted to 1.75 milliseconds by changing the off time.

To approximate a constant voltage analog charging circuit, which accounts for the average voltage increase on the battery due to the average charging current, several threshold levels are required. A chart of the battery charging levels for particular "on" and "off" times, periods, duty cycles, currents, charging rates and voltage thresholds as set forth in FIG. 19. The typical charging characteristics for the battery 36 over time depicted in FIG. 20 for each of 5 levels. As indicated, the threshold for the first shift (PWM duty cycle level 0 to level 1; i.e., 1 ms to 1.75 ms period) is set to 3.950 volts. Level 1 charging is then continued to 4.025 volts before shifting to level 2 charging (3.2 ms period). Level 2 charging continues to 4.075 volts before shifting to level 3 (approximately a 6 ms period) and level 3 and above charging goes to 4.100 volts for the remaining level shifts. These multiple voltage threshold levels prevent the built in battery protection circuitry from tripping while approximating a constant voltage charging phase. Level 5 is the smallest and last charging level and has a PWM duty cycle of about 1.5% (a 24 ms period.)

At each level change a 2 minute minimum charging time is used before cutting back on the duty cycle for voltages of 4.100 volts or below. At and below 4.100 volts there is no maximum charging time limit on any duty cycle except for the overall charging time limit of 240 minutes measured from the start of rapid charge.

If the filtered battery voltage measurement goes higher than 4.125 volts then the charging duty cycle is increased one level within 5 seconds, rather than the minimum 2 minutes delay which is used at the lower transition voltages (4.025 to 4.100 volts.) If the voltage remains at 4.125 volts or higher after reducing the duty cycle then the duty cycle should be reduced again and again (with less than 5 second charging time on each duty cycle) until the voltage drops back down below 4.125 volts or charging turns completely off (after level 5.)

Charging is continued until either of the following conditions is met then it is terminated:

The charging duty cycle has been reduced to 1.5% (level 5), and the battery voltage reaches 4.1 VDC.

Elapsed time from beginning of Rapid Charging has reached 240 minutes ("Time-out").

Another unit on a charge stand is detected to be charging.

The battery will not charge again until either it is discharged to 3.95 VDC or it self-discharges to this level.

Figure 21B:
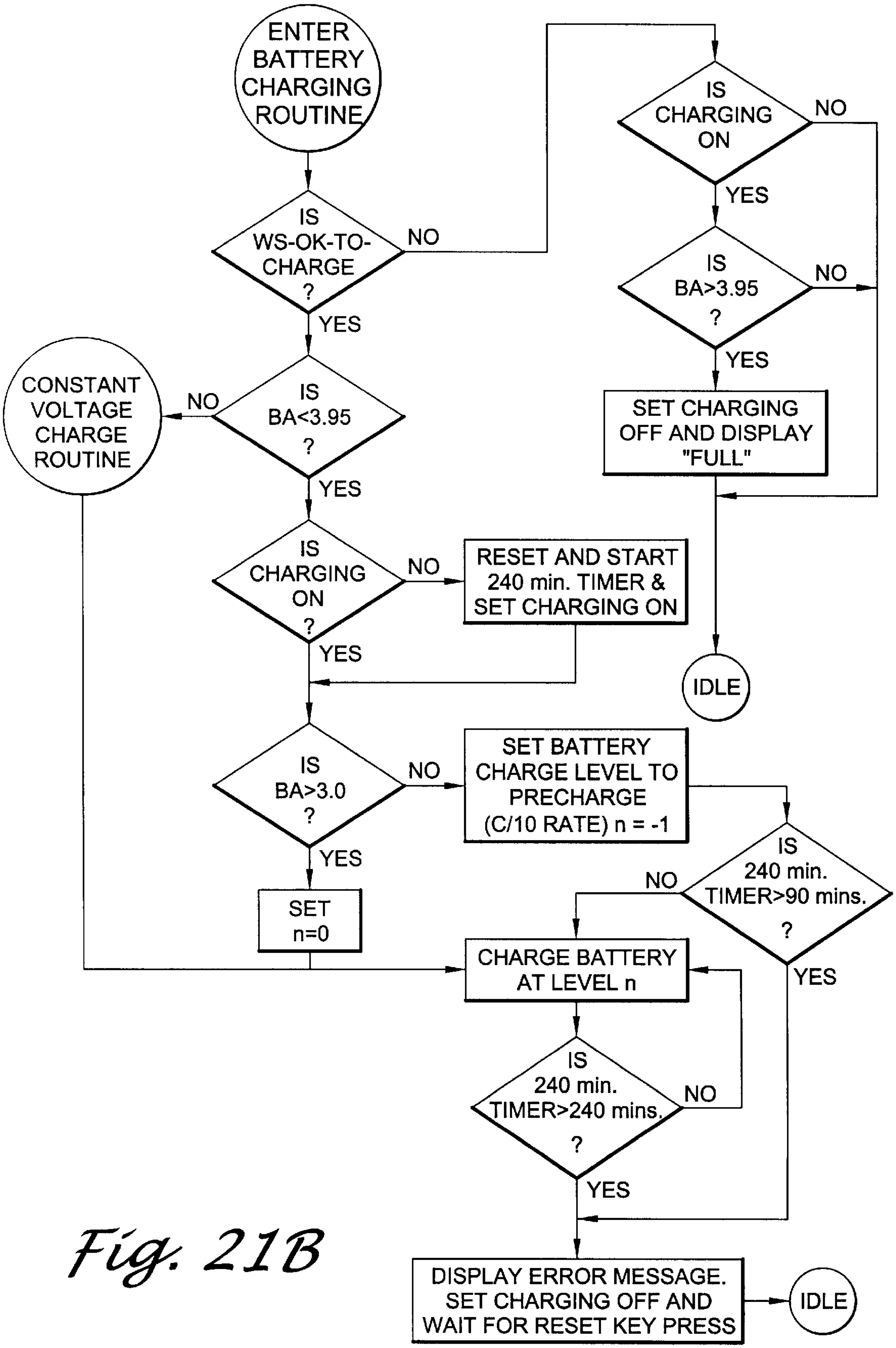
Figure 21C:
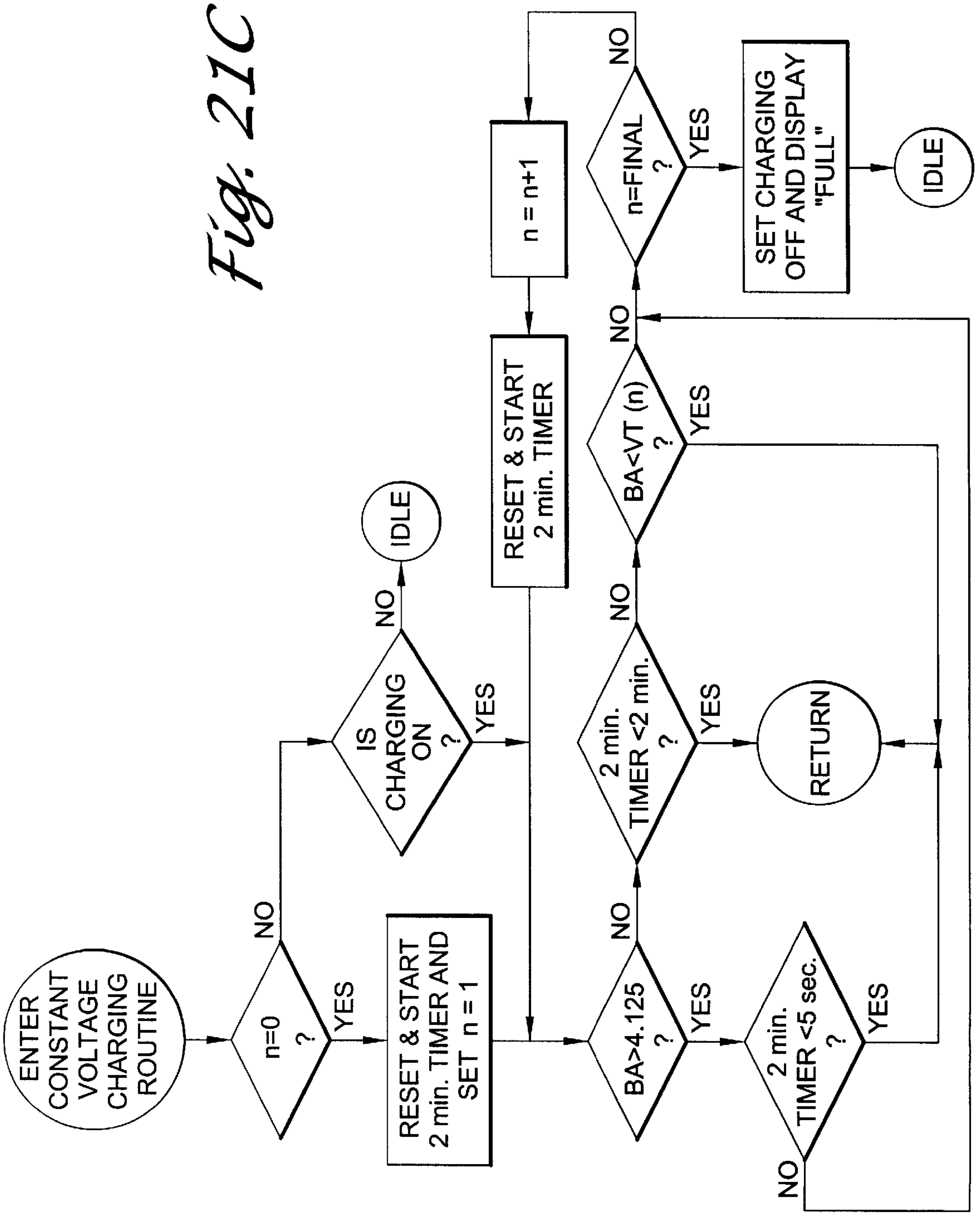

The power management routine depicted in FIGS. 21*a–c* takes voltage measurements once per second when the motor is not running and the PWM switch (wall supply FET) is turned off. The battery voltage is measured at least 16 times and the calculated average is stored to a memory location "BA" in the microprocessor 38.

Twenty consecutive measurements, each second, on the wall power supply voltage are taken. A sample and hold circuit in the microcontroller samples and holds the voltage at the beginning of each measurement. Each measurement takes 256 microseconds so 20 consecutive measurements takes about 5 milliseconds to complete. The highest of the 20 measurements is stored in memory and is called "$P_H$" and the lowest reading is stored and called "$P_L$".

When a pipette 10, which is charging its battery, is on a shared charge stand (not shown) with a shared wall power supply as in FIG. 22,then it is guaranteed that $P_L$ will be measured each second to be less than 4.6 volts by any other pipette (e.g. 10') on the shared charging stand provided that the charging pipette has not progressed beyond level 2 in its constant voltage phase of charging. Since level 3 charging has a 6 millisecond charging period it is possible that $P_L$ will not be measured to be less than 4.6 volts in any one 5 millisecond measuring period.

If two or more pipettes are placed on a shared charge stand, and each has a battery which is in need of being charged, the firmware in each pipette, in conjunction with its $P_H$ and $P_L$ measurements, will normally allow only one pipette to charge its battery at a time. The first pipette placed on a shared stand will start charging its battery first. A second and third pipette (e.g. 10') placed on the stand will detect that a unit is already charging by the fact that it measures a $P_L$ value at or below 4.6 volts (and a $P_H$ value above 4.9 volts, indicating that a wall power supply is indeed connected.) The firmware is coded so that a pipette will not charge its own battery if it detects a $P_L$ at or below 4.6 volts. When a pipette measures a $P_L$ above 4.6 volts it assumes that it is permissible to start charging its own battery. After it starts charging the power management routine will cause it pause charging briefly once per second to look again at $P_L$, $P_H$ and BA to see if another unit is charging. If it detects that another unit is charging it stops charging and waits until $P_L$ goes above 4.6 volts before it resumes charging. The units checks once per second based on an internal interrupt timer set to interrupt once per second. The unit that first determines it is okay to start charging will start charging its battery while the other units on the same stand will be automatically locked out from charging because they will detect that a unit is charging on the stand. It is highly unlikely that the interrupt timers in two separate pipettes on a stand are interrupting at the same time (within 0.25 milliseconds of each other.) If this is the case then both units can start to charge at the same time. The unit with the lowest battery voltage will take most of the current from the wall unit until it charges up to a voltage that matches the second unit charging. As the two battery voltages start to equal each other the current will split between the two batteries taking about twice as long to charge as would be the case if only one unit were charging. For this condition to happen two independent timers with separate clocks would need to be synchronized in their state and remain synchronized for a long period of time which would be highly unlikely (perhaps less than 1 chance in 10,000); but, no harm would be done if that were to happen. Normally, the sharing algorithm described above behaves in a polite manner in that the pipettes take turns charging to a full charge and only charges one at a time.

A waiting pipette will usually start charging and hence terminate the first pipette's charging cycle when the first pipette is in level 3 of its constant voltage phase. At this point the first pipette's battery is nearly at full charge (over 90% and probably about 95% of full charge.) If the detection parameters for another unit charging were made to be more sensitive to allow a first unit to finish through level 5 of its constant voltage phase (allowing for a 100% full charge) the waiting pipette would have to wait for another 30 minutes or more. The detection parameters ($P_L$ and the 5 millisecond sampling time duration) were chosen as a compromise between getting a full battery charge and the total time for all pipettes placed on a shared charge stand to be charged up and ready for use again. A pipette battery which is completely discharged can be charged to over 90% of full capacity in approximately one hour whereas the last 10% could take upwards to another hour.

While a particular preferred embodiment of the present invention has been described in detail herein, it is appreciated the changes and modifications may be made in the illustrated embodiment without departing from the spirit of the invention. Accordingly, the invention is to be limited in scope only by the terms of the following claims.

What is claimed is:

1. An electronic pipette, comprising:

a linear actuator for driving a plunger lengthwise in a cylinder to aspirate and dispense fluid into and from a pipette tip, the linear actuator comprising a motor with current receiving windings for electromagnetically driving a rotor to impart the lengthwise movement to the plunger; and a control circuit for the pipette including a user controllable microprocessor programmed to generate drive signals for the motor, the control circuit further comprising a display electrically connected to the microprocessor, user actuateable control keys electrically connected to the microprocessor for generating within the microprocessor pipette mode of operation, liquid pick up volume, liquid dispense, pipette speed of operation and pipette reset signals for controlling operation of the pipette and alpha-numeric user readable displays on the display, a memory having tables of data stored therein and accessible and useable by the microprocessor to control operations of the pipette, and at least one user actuateable trigger switch for triggering pipette operations selected by user actuation of the control keys, the microprocessor being further programmed to cause the pipette to sequentially enter successive user selected modes of operation in response to successive user actuation of only a first one of the control keys defining a "mode"-key and in each selected mode to control operation of the pipette so that (a) actuation of an option key, defined by either a second distinctive actuation of the mode key or actuation of another of the control keys, causes the microprocessor to control the display to display at least a first operational option for the selected mode only, with subsequent actuations of the option key causing the display to sequentially display any other operational option for the selected mode only, (b) actuation of a second one of the control keys defining an "up" key causes the microprocessor to control the display to indicate an activation or deactivation of the operational option as displayed by the display or an increasing value for a numeric display associated with the operational option in response to data from the tables stored in the memory, and (c) actuation of a third one of the control keys defining a "down" key causes the microprocessor to control the display to indicate an activation or deactivation of the operational option as displayed by the display or a decreasing value for the numeric display associated with the operational option in response to data from the tables stored in the memory, and (d) subsequent user actuations of the trigger switch actuates the motor to drive the plunger in the selected mode augmented by the operational options pursuant to (b) and (c) above and in an up direction to pick up liquid into the tip, and then in a down direction to dispense liquid from the pipette tip.

2. The pipette of claim 1 wherein the microprocessor is further programmed so that in each selected mode successive user actuations of the option key causes the microprocessor to control the display to sequentially display successive operational options for the selected mode only, each controllable pursuant to (b) and (c) of claim 1.

3. The pipette of claim 1 wherein the microprocessor is programmed so that the mode key functions as the option key to step between successive operational options in response to an initial sustained pressing of the mode key for a period of time longer than a momentary pressing of the mode key followed by successive momentary pressings of the mode key.

4. The pipette of claim 1 wherein the microprocessor is further programmed to control the display to exit the display of the operational options while remaining in the selected mode in response to user actuation of a fourth one of the control keys defining a "reset" key and or a subsequent sustained pressing of the mode key.

5. The pipette of claim 1 wherein the microprocessor is programmed so that a fourth one of the user actuateable control keys defines a "reset"-key.

6. The pipette of claim 5 wherein the microprocessor is further programmed so that the reset key forces a displayed parameter in the display to read zero in response to an initial sustained pressing of the reset key for a period of time longer than a momentary pressing of the reset key.

7. The pipette of claim 5 wherein the microprocessor is further programmed to enter a "blow out" operation in response to a momentary user actuation of the reset key to drive the plunger in the cylinder to blow fluid from the pipette tip.

8. The pipette of claim 5 wherein the microprocessor is further programmed so that each successive momentary user actuation of the reset key causes the microprocessor to control the display a to sequentially display different one of a plurality of successive operational parameters for editing by user actuation of the up or down keys.

9. The pipette of claim 1 wherein the microprocessor is further programmed to count and to control the display to distinctly display to the pipette user different displays for successive cycles of operation of the pipette in the selected mode of pipette operation thereby enabling the user to determine the operating cycle of the pipette for any period of pipette operation.

10. The pipette of claim 1 with a plurality of user actuateable trigger switches for triggering pipette operations selected by user actuation of the control keys, wherein the microprocessor is further programmed to enter a manual mode of operation selected by user actuation of the mode key and in the manual mode to (i) control operation of the pipette so that (a) a first one of the trigger switches actuated by the user defines an "up" trigger actuation of which causes the microprocessor to control the motor to drive the plunger in a up direction to pick up liquid into the tip and (b) a second one of the trigger switches actuated by the user defines a "down" trigger actuation of which causes the microprocessor to control the motor to drive the plunger in a down direction to dispense liquid from the tip and (ii) to control the display to indicate the volume of liquid in the tip.

11. The pipette of claim 10 wherein the microprocessor is further programmed in the manual mode to, (i) control operation of the pipette so that while at a home position with the plunger at a location ready to begin aspiration or pick up of liquid the display displays the maximum volume that can be picked up and, (a) "up" key actuation causes the microprocessor to control the display to indicate an increasing value for a selected maximum volume of liquid to be picked up by the tip as the "up" key is actuated by the user and (b) a "down" key actuation causes the microprocessor to control the display to indicate a decreasing value for the selected maximum volume of liquid to be picked up by the tip.

12. The pipette of claim 10 wherein the microprocessor is further programmed to increase the speed of liquid pick up and dispense as the up trigger and down trigger respectively are actuated by the user.

13. The pipette of claim 10 wherein one of the tables of data stored in the memory comprises correction factors for a maximum pick up volume associated with the pipette tip for reducing liquid volume errors associated with the pick up and dispensing of liquids by the pipette and wherein the correction factors are added to pick up and dispense movements of the motor to correct for the volume errors.

14. The pipette of claim 10 wherein the microprocessor is further programmed to count and to control the display to distinctly display to the pipette user different displays for successive cycles of operation of the pipette in the manual mode of pipette operation thereby enabling the user to determine the operating cycle of the pipette for any period of pipette operation.

15. The pipette of claim 10 wherein the microprocessor is further programmed to control the motor to enter a "blow out" wherein the motor drives the plunger beyond a home position to blow out liquid remaining in the tip after the plunger reaches the home position.

16. The pipette of claim 15 wherein the microprocessor is programmed to enter "blow out" in response to user actuation of one of the control keys or multiple actuation of the dispense trigger.

17. The pipette of claim 16 wherein the microprocessor is programmed to enter "blow out" operation in response to a momentary user actuation of a fourth one of the control keys defining a "reset" key.

18. The pipette of claim 17 wherein the microprocessor is further programmed so that the reset key forces the volume display to read zero in response to an initial sustained pressing of the reset key for a period of time longer than a momentary pressing of the reset key when the pipette is not at its home position, wherein further up movement of the plunger from the position where the display is zeroed increases the volume reading and further down movement of the plunger from the zeroed position causes a negative volume to be displayed.

19. The pipette of claim 1 with a plurality of user actuateable trigger switches for triggering pipette operations selected by user actuation of the control keys, wherein the microprocessor is further programmed to enter a pipet mode of operation selected by user actuation of the mode key and in the pipet mode to (i) control operation of the pipette so that (a) up key actuation causes the microprocessor to control the display to indicate an increasing value for a selected volume of liquid to be picked up by the tip and (b) down key actuation causes the microprocessor to control the display to indicate a decreasing value for the selected volume of liquid to be picked up by the tip and (c) first user actuation of any of the trigger switches actuates the motor to drive the plunger in a up direction to pick up the selected volume of liquid into the tip and (d) second user actuation of any of the trigger switches actuates the motor to drive the plunger in a down direction to dispense the selected volume of liquid from the tip.

20. The pipette of claim 19 wherein one of the tables of data stored in the memory comprises instructions for controlling the drive signals applied to the linear actuator to control the speed of operation of the motor in accordance with speed of operation settings selected by user actuation of the control keys.

21. The pipette of claim 19 wherein another of the tables of data stored in the memory comprises correction factors for various of the liquid pick up volume settings selected by user actuation of the control keys to control and eliminate liquid volume errors associated with the pick up and dispensing of liquids by the pipette.

22. The pipette of claim 19 wherein the microprocessor is programmed to count and to control the display to distinctly display to the pipette user different displays for successive cycles of operation of the pipette in the pipet mode of operation thereby enabling the user to determine the operating cycle of the pipette for any period of pipette operation.

23. The pipette of claim 19 wherein the microprocessor is further programmed to (i) pick up a second selected volume of liquid when the plunger reaches a home position for the plunger and in response to user actuation of one of the trigger switches as the plunger approaches the home position during dispensing of the selected volume of liquid and (ii) dispense and mix the second selected volume of liquid with the selected volume of liquid.

24. The pipette of claim 23 wherein the microprocessor is further programmed to repeat (i) and (ii) until none of the trigger switches are activated when the plunger nears the home position and to thereafter drive the motor to extend the plunger beyond the home position to blow out liquid from the tip.

25. The pipette of claim 1 with a plurality of user actuateable trigger switches for triggering pipette operations selected by user actuation of the control keys, wherein the microprocessor is further programmed to enter a multi mode of operation selected by user actuation of the mode key and in the multi mode to (i) control operation of the pipette so that (a) up key actuation causes the microprocessor to control the display to indicate an increasing value for a selected volume of liquid to be dispensed by the tip and (b) down key actuation causes the microprocessor to control the display to indicate a decreasing value for the selected volume of liquid to be dispensed by the tip and (c) a third one of the control keys defines a "reset" key, actuation of which causes the microprocessor to control the display to indicate a number corresponding to the number of aliquots of liquid of the selected volume that the pipette can dispense which number is adjustable by actuation of the "up" and "down" keys and (d) first user actuation of any of the trigger switches actuates the motor to drive the plunger in a up direction to pick up into the tip a volume of liquid in excess of a volume equal to the selected volume times the number of aliquots of liquid to be dispensed by the pipette and (e) second user actuation of any of the trigger switches actuates the motor to drive the plunger in a down direction to dispense the selected volume of liquid from the tip which is repeated for each second actuation of any of the trigger switches until the number of aliquots has been dispensed by the pipette.

26. The pipette of claim 25 wherein one of the tables of data stored in the memory comprises instructions for controlling the drive signals applied to the linear actuator to control the speed of operation of the motor in accordance with speed of operation settings selected by user actuation of the control keys.

27. The pipette of claim 25 wherein another of the tables of data stored in the memory comprises correction factors for various of the selected liquid volume settings selected by user actuation of the control keys to control and eliminate liquid volume errors associated with the pick up and dispensing of liquids by the pipette.

28. The pipette of claim 25 wherein the microprocessor is further programmed to control the motor to enter a "blow out" mode wherein the motor drives the plunger beyond a home position for the plunger to blow out liquid remaining in the tip after the plunger reaches the home position.

29. The pipette of claim 25 wherein the microprocessor is programmed so that step (a) and/or step (b) may be actuated prior to step (d) and/or after step (d) and prior to step (e) and/or after any actuation pursuant to step (e).

30. A microprocessor controlled hand held portable electronic pipette, comprising:

a hand holdable housing supporting a plunger, a cylinder, and a linear actuator for driving the plunger lengthwise in the cylinder to aspirate and dispense fluid into and from a pipette tip extending from the housing;

the linear actuator being powered by a battery contained in the housing or an external power source and comprising a stepper motor with current receiving windings for receiving drive signals for electromagnetically driving a rotor to impart the lengthwise movement to the plunger at controlled speeds through a series of microsteps; and a control circuit for the pipette including a user controllable microprocessor powered by the battery or external power source and programmed to generate the drive signals for the stepper motor which are pulse width modulated (PWM) signals having duty cycles corresponding to different microstep positions for the stepper motor derived by the microprocessor from a first table of data stored in a memory included in the control circuit and having a repetition pattern derived by the microprocessor from a second table of data stored in the memory to determine the speed of motor movement, the control circuit further comprising a display supported by the housing and electrically connected to the microprocessor, user actuateable control keys supported by the housing and electrically connected to the microprocessor for generating within the microprocessor pipette mode of operation, liquid pick up volume, liquid dispense, pipette speed of operation and pipette reset signals for controlling operation of the pipette and alphanumeric user readable displays on the display, the memory having tables of data including the first and second tables stored therein and accessible and useable by the microprocessor to control operations of the pipette, and a user actuateable switch supported by the housing for triggering pipette operations selected by user actuation of the control keys.

31. The pipette of claim 30 wherein the microprocessor is programmed so that the PWM drive signals have phases which do not overlap whereby there is no overlap of the PWM drive signals applied to the current receiving windings of the stepper motor.

32. The pipette of claim 30 wherein the battery or external power source develop a supply voltage, and the microprocessor is programmed to respond to the supply voltage in its selection of which of the tables of data stored in the memory it derives the duty cycles of the PWM drive signals.

33. A battery powered, microprocessor controlled hand held portable electronic pipette, comprising:

a hand holdable housing supporting a battery, a plunger, a cylinder and a linear actuator for driving the plunger lengthwise in the cylinder to aspirate and dispense fluid into and from a pipette tip extending from the housing;

the linear actuator being powered by the battery and comprising a motor with current receiving windings for receiving drive signals for electromagnetically driving a rotor to impart the lengthwise movement to the plunger; and a control circuit for the pipette including a user controllable microprocessor powered by the battery and programmed to generate the drive signals for the motor, the microprocessor being further programmed to (i) enter a power management routine on a periodic bases to check charge states of the battery and a power source for charging the battery having a current limit equal to or greater than a maximum charging current for the battery, and (ii) open and close a switch between the power source and the battery, the closed switch passing current at the current limit from the power source to the battery to charge the battery while a voltage generated by the power source is below a regulated value.

34. The pipette in claim 33 wherein the microprocessor is further programmed to generate a pulse width modulated switch control signal for opening and closing the switch such that the battery is charged with an average current equal to the duty cycle of the pulse width modulated control signal times the current limit from the power source.

35. The pipette in claim 34 wherein the microprocessor is further programmed to control the duty cycle of the pulse width modulated switch control signal to a value determined by the charge state of the battery.

36. The pipette of claim 33 defining a first pipette in combination with a second pipette as defined by claim 32 connected to the same power source having a current limit equal to or greater than the maximum charging current of the battery in the first and second pipettes wherein the microprocessor in each of the first and second pipettes is programmed to measure the power source voltage and determine its highest value ($P_H$) and its lowest value ($P_L$) during defined time intervals while the switch thereof is open and wherein each pipette while in its power management routine compares its measured $P_L$ and $P_H$ values to threshold values stored in its microprocessor to determine if it can charge its battery from the power source.

37. The pipettes in claim 36 where the charging to the batteries thereof can not take place unless the values of $P_H$ and $P_L$ therefor are greater than the respective threshold values.

38. The pipettes in claim 37 where the batteries are lithium ion batteries and the thresholds for $P_L$ and $P_H$ are greater than 4.6 and 4.9 volts respectively for battery charging to be allowed.

39. The pipettes in claim 38 where the time interval for determining $P_L$ and $P_H$ is greater than 1 ms but less than 100 ms.

* * * * *